(12) United States Patent
Kim et al.

(10) Patent No.: US 12,461,007 B2
(45) Date of Patent: Nov. 4, 2025

(54) CD34 STEM CELL MIMICS

(71) Applicant: Slingshot Biosciences, Inc., Emeryville, CA (US)

(72) Inventors: Jeffrey Kim, Berkeley, CA (US); Anh Tuan Nguyen, San Francisco, CA (US); Subhanip Biswas, Emeryville, CA (US); Kanwal Palla, Oakland, CA (US)

(73) Assignee: Slingshot Biosciences, Inc., Emeryville, CA (US)

( * ) Notice: Subject to any disclaimer, the term of this patent is extended or adjusted under 35 U.S.C. 154(b) by 0 days.

(21) Appl. No.: 18/817,528

(22) Filed: Aug. 28, 2024

(65) Prior Publication Data

US 2025/0076175 A1 Mar. 6, 2025

Related U.S. Application Data

(60) Provisional application No. 63/535,233, filed on Aug. 29, 2023.

(51) Int. Cl.
 *G01N 15/10* (2024.01)
 *G01N 33/58* (2006.01)

(52) U.S. Cl.
 CPC ....... *G01N 15/1012* (2013.01); *G01N 33/582* (2013.01); *G01N 2015/1014* (2024.01); *G01N 2333/70589* (2013.01); *G01N 2333/70596* (2013.01)

(58) Field of Classification Search
 None
 See application file for complete search history.

(56) References Cited

U.S. PATENT DOCUMENTS

| | | |
|---|---|---|
| 3,822,095 A | 7/1974 | Hirschfeld |
| 3,872,312 A | 3/1975 | Hirschfeld |
| 3,916,205 A | 10/1975 | Kleinerman |
| 3,937,799 A | 2/1976 | Lewin et al. |
| 3,947,564 A | 3/1976 | Shannon et al. |
| 3,975,084 A | 8/1976 | Block |
| 4,271,123 A | 6/1981 | Curry et al. |
| 4,295,199 A | 10/1981 | Curry et al. |
| 4,389,491 A | 6/1983 | Hanamoto et al. |
| 4,409,335 A | 10/1983 | Hanamoto et al. |
| 4,448,888 A | 5/1984 | Bleile et al. |
| 4,511,662 A | 4/1985 | Baran et al. |
| 4,704,891 A | 11/1987 | Recktenwald et al. |
| 4,774,189 A | 9/1988 | Schwartz |
| 4,857,451 A | 8/1989 | Schwartz |
| 5,073,498 A | 12/1991 | Schwartz et al. |
| 5,093,234 A | 3/1992 | Schwartz |
| 5,244,799 A | 9/1993 | Anderson |
| 5,283,079 A | 2/1994 | Wang et al. |
| 5,395,688 A | 3/1995 | Wang et al. |
| 5,820,879 A | 10/1998 | Fernandez et al. |
| 5,841,139 A | 11/1998 | Sostek et al. |
| 5,871,722 A | 2/1999 | Nacht et al. |
| 5,888,823 A | 3/1999 | Matsumoto et al. |
| 6,043,506 A | 3/2000 | Heffelfinger et al. |
| 6,107,365 A | 8/2000 | Bertozzi et al. |
| 6,108,082 A | 8/2000 | Pettipiece et al. |
| 6,214,539 B1 | 4/2001 | Cosand |
| 6,280,618 B2 | 8/2001 | Watkins et al. |
| 6,372,813 B1 | 4/2002 | Johnson et al. |
| 6,586,176 B1 | 7/2003 | Trnovsky et al. |
| 6,657,030 B2 | 12/2003 | Vanderbilt |
| 6,762,055 B2 | 7/2004 | Carver et al. |
| 6,806,058 B2 | 10/2004 | Jesperson et al. |
| 6,872,578 B2 | 3/2005 | Watkins et al. |
| 6,897,072 B1 | 5/2005 | Rich et al. |
| 7,045,366 B2 | 5/2006 | Huang et al. |
| RE39,542 E | 4/2007 | Jain et al. |
| 7,205,156 B2 | 4/2007 | Rich et al. |
| 7,294,503 B2 | 11/2007 | Quake et al. |
| 7,314,584 B2 | 1/2008 | Tsutsui et al. |
| 7,465,538 B2 | 12/2008 | Watkins et al. |
| 7,479,631 B2 | 1/2009 | Rich et al. |
| 7,482,161 B2 | 1/2009 | Carver et al. |
| 7,482,167 B2 | 1/2009 | Sammak et al. |
| 7,531,357 B2 | 5/2009 | Carver et al. |
| 7,569,399 B2 | 8/2009 | Watkins et al. |

(Continued)

FOREIGN PATENT DOCUMENTS

| | | |
|---|---|---|
| CN | 1158997 A | 9/1997 |
| CN | 101214217 A | 7/2008 |

(Continued)

OTHER PUBLICATIONS

Atkin-Smith et al., "Isolation of cell type-specific apoptotic bodies by fluorescence-activated cell sorting," Scientific Reports, vol. 7, No. 1, Feb. 1, 2017, pp. 1-7.
Bele, Marjan, Olavi Siiman and Egon Matjevic, "Preparation and flow cytometry of uniform silica-fluorescent dye microspheres." Journal of colloid and interface science 254(2):274-282 (2002).
Chen, M., et al., "Initiator caspases in apoptosis signaling pathways", Apoptosis (London), Aug. 1, 2002, pp. 313-319, DOI: 10.1023/A:1016167228059.
Co-pending U.S. Appl. No. 18/731,774, inventors Kim; Jeffrey et al., filed Jun. 3, 2024.
Dharmesh et al., NaNo. silicate-hydrogel microspheres formed by aqueous two-phase separation for sustained release of small molecules, Front. Biomater. Sci., Apr. 2023. vol. 2:1157554, p. No. 1-16.

(Continued)

*Primary Examiner* — Teresa E Knight
(74) *Attorney, Agent, or Firm* — Wilson Sonsini Goodrich & Rosati

(57) ABSTRACT

Hydrogel beads with quantifiable attached biomolecules and their use as cell mimics in cytometric applications are described. The cell mimics described herein are selectively tunable to have at least one optical property substantially similar to the at least one optical property of a target cell (e.g., CD34+ stem cell). The disclosure further relates to methods of using the disclosed cell mimics as enrichment controls in cytometric applications.

28 Claims, 11 Drawing Sheets

Specification includes a Sequence Listing.

(56) References Cited

U.S. PATENT DOCUMENTS

| | | |
|---|---|---|
| 7,588,942 B2 | 9/2009 | Ho et al. |
| 7,601,539 B2 | 10/2009 | Kawate |
| 7,776,927 B2 | 8/2010 | Chu et al. |
| 7,842,498 B2 | 11/2010 | Um et al. |
| 8,030,095 B2 | 10/2011 | Harriman |
| 8,105,845 B2 | 1/2012 | Notcovich et al. |
| 8,114,580 B2 | 2/2012 | Carver et al. |
| 8,187,885 B2 | 5/2012 | Purvis, Jr. |
| 8,415,161 B2 | 4/2013 | Yan et al. |
| 8,415,173 B2 | 4/2013 | Harriman |
| 8,451,450 B2 | 5/2013 | Heng |
| 8,580,530 B2 | 11/2013 | Buffiere et al. |
| 8,580,531 B2 | 11/2013 | Buffiere et al. |
| 8,603,828 B2 | 12/2013 | Walker et al. |
| 8,609,363 B2 | 12/2013 | Heng et al. |
| 8,704,158 B2 | 4/2014 | Haberstroh et al. |
| 8,748,183 B2 | 6/2014 | Durack et al. |
| 9,012,167 B2 | 4/2015 | Dallenne et al. |
| 9,110,050 B2 | 8/2015 | Likuski et al. |
| 9,175,421 B2 | 11/2015 | Notcovich et al. |
| 9,176,154 B2 | 11/2015 | Darmstadt et al. |
| 9,213,034 B2 | 12/2015 | Walker et al. |
| 9,217,175 B2 | 12/2015 | Regan et al. |
| 9,228,898 B2 | 1/2016 | Kiani et al. |
| 9,417,190 B2 | 8/2016 | Hindson et al. |
| 9,476,101 B2 | 10/2016 | Pregibon et al. |
| 9,658,220 B2 | 5/2017 | King et al. |
| 9,696,257 B2 | 7/2017 | Fox et al. |
| 9,714,897 B2 | 7/2017 | Kim et al. |
| 9,804,149 B2 | 10/2017 | Darmstadt et al. |
| 9,816,931 B2 | 11/2017 | Abate et al. |
| 9,915,598 B2 | 3/2018 | Kim et al. |
| 10,067,135 B2 | 9/2018 | Kaul et al. |
| 10,180,385 B2 | 1/2019 | Fox et al. |
| 10,191,039 B2 | 1/2019 | King et al. |
| 10,328,160 B2 | 6/2019 | Trogler et al. |
| 10,343,167 B2 | 7/2019 | Esmail et al. |
| 10,344,100 B1 | 7/2019 | Vashist et al. |
| 10,392,557 B2 | 8/2019 | Chan |
| 10,416,070 B1 | 9/2019 | Handique |
| 10,429,291 B2 | 10/2019 | Fox et al. |
| 10,481,068 B2 | 11/2019 | Kim et al. |
| 10,494,607 B2 | 12/2019 | Edinger et al. |
| 10,508,990 B2 | 12/2019 | Fox et al. |
| 10,732,189 B2 | 8/2020 | Buffiere et al. |
| 10,753,846 B2 | 8/2020 | Kim et al. |
| 10,942,109 B2 | 3/2021 | Kim et al. |
| 11,047,845 B1 | 6/2021 | Barry, Jr. et al. |
| 11,085,036 B2 | 8/2021 | Norberg et al. |
| 11,118,217 B2 | 9/2021 | Xue et al. |
| 11,155,809 B2 | 10/2021 | Lebofsky |
| 11,180,752 B2 | 11/2021 | Wu et al. |
| 11,186,862 B2 | 11/2021 | Lebofsky et al. |
| 11,213,490 B2 | 1/2022 | Shoichet et al. |
| 11,231,355 B2 | 1/2022 | Handique |
| 11,274,337 B2 | 3/2022 | Xue et al. |
| 11,300,496 B2 | 4/2022 | Handique |
| 11,313,782 B2 | 4/2022 | Kim et al. |
| 11,479,816 B2 | 10/2022 | Lebofsky et al. |
| 11,506,655 B2 | 11/2022 | Hunsley et al. |
| 11,598,768 B2 | 3/2023 | Kim |
| 11,603,556 B2 | 3/2023 | Lebofsky |
| 11,663,717 B2 | 5/2023 | Barnes et al. |
| 11,686,661 B2 | 6/2023 | Kim et al. |
| 11,726,023 B2 | 8/2023 | Kim et al. |
| 11,747,261 B2 | 9/2023 | Kim et al. |
| 11,761,877 B2 | 9/2023 | Kim et al. |
| 11,927,519 B2 | 3/2024 | Kim et al. |
| 12,038,369 B2 | 7/2024 | Kim et al. |
| 12,066,369 B2 | 8/2024 | Kim et al. |
| 12,130,285 B2 | 10/2024 | Ahn et al. |
| 2001/0008217 A1 | 7/2001 | Watkins et al. |
| 2001/0054580 A1 | 12/2001 | Watkins et al. |
| 2002/0106730 A1 | 8/2002 | Coyle et al. |
| 2002/0115116 A1 | 8/2002 | Song et al. |
| 2003/0013116 A1 | 1/2003 | Song et al. |
| 2003/0022157 A1 | 1/2003 | Zauderer et al. |
| 2003/0064403 A1 | 4/2003 | Song et al. |
| 2003/0124371 A1 | 7/2003 | Um et al. |
| 2003/0132538 A1 | 7/2003 | Chandler |
| 2003/0190749 A1 | 10/2003 | Surber et al. |
| 2003/0198995 A1 | 10/2003 | Sabbadini et al. |
| 2003/0218130 A1 | 11/2003 | Boschetti et al. |
| 2003/0224444 A1 | 12/2003 | Sabbadini et al. |
| 2003/0232323 A1 | 12/2003 | Freeman et al. |
| 2004/0126904 A1 | 7/2004 | Watkins et al. |
| 2004/0137577 A1 | 7/2004 | Coyle et al. |
| 2005/0059086 A1 | 3/2005 | Huang et al. |
| 2005/0090016 A1 | 4/2005 | Rich et al. |
| 2005/0112650 A1 | 5/2005 | Chang et al. |
| 2005/0118230 A1 | 6/2005 | Hill et al. |
| 2005/0172476 A1 | 8/2005 | Stone et al. |
| 2005/0176056 A1 | 8/2005 | Sammak et al. |
| 2005/0208573 A1 | 9/2005 | Bell et al. |
| 2006/0163385 A1 | 7/2006 | Link et al. |
| 2006/0223187 A1 | 10/2006 | Carver et al. |
| 2006/0240560 A1 | 10/2006 | Bakker et al. |
| 2006/0250616 A1 | 11/2006 | Pettipiece et al. |
| 2006/0269962 A1 | 11/2006 | Watkins et al. |
| 2006/0275820 A1 | 12/2006 | Watkins et al. |
| 2007/0000342 A1 | 1/2007 | Kazuno |
| 2007/0003442 A1 | 1/2007 | Link et al. |
| 2007/0054119 A1 | 3/2007 | Garstecki et al. |
| 2007/0082019 A1 | 4/2007 | Huang et al. |
| 2007/0087348 A1 | 4/2007 | Notcovich et al. |
| 2007/0118297 A1 | 5/2007 | Thayer |
| 2007/0158547 A1 | 7/2007 | Rich et al. |
| 2007/0178168 A1 | 8/2007 | Ho et al. |
| 2007/0254378 A1 | 11/2007 | Zhang et al. |
| 2007/0259415 A1 | 11/2007 | Zigova et al. |
| 2008/0014589 A1 | 1/2008 | Link et al. |
| 2008/0019921 A1 | 1/2008 | Zhang |
| 2008/0023630 A1 | 1/2008 | Boschetti et al. |
| 2008/0026468 A1 | 1/2008 | Carver et al. |
| 2008/0032405 A1 | 2/2008 | Ho et al. |
| 2008/0044472 A1 | 2/2008 | Garcia et al. |
| 2008/0090737 A1 | 4/2008 | Boschetti |
| 2008/0241262 A1 | 10/2008 | Lee et al. |
| 2009/0028945 A1 | 1/2009 | Cheung et al. |
| 2009/0148961 A1 | 6/2009 | Luchini et al. |
| 2010/0178647 A1 | 7/2010 | Carver et al. |
| 2010/0178656 A1 | 7/2010 | Buffiere et al. |
| 2010/0184101 A1 | 7/2010 | Buffiere et al. |
| 2010/0187441 A1 | 7/2010 | Waldbeser et al. |
| 2010/0234252 A1 | 9/2010 | Moradi-Araghi et al. |
| 2010/0285594 A1 | 11/2010 | Purvis, Jr. |
| 2010/0303811 A1 | 12/2010 | Ochi |
| 2011/0022164 A1 | 1/2011 | Quinn et al. |
| 2011/0117670 A1 | 5/2011 | Walker et al. |
| 2011/0218123 A1 | 9/2011 | Weitz et al. |
| 2011/0222068 A1 | 9/2011 | Heng |
| 2011/0300629 A1 | 12/2011 | Hawkins et al. |
| 2011/0318820 A1 | 12/2011 | Hinz et al. |
| 2012/0065614 A1 | 3/2012 | Omary et al. |
| 2012/0129723 A1 | 5/2012 | Notcovich et al. |
| 2012/0295300 A1 | 11/2012 | Heng et al. |
| 2012/0309651 A1 | 12/2012 | Pregibon et al. |
| 2013/0089883 A1 | 4/2013 | Dallenne et al. |
| 2013/0173618 A1 | 7/2013 | Banville et al. |
| 2013/0177973 A1 | 7/2013 | Kondo |
| 2013/0274125 A1 | 10/2013 | Binder et al. |
| 2014/0073532 A1 | 3/2014 | Walker et al. |
| 2014/0100791 A1 | 4/2014 | Darmstadt et al. |
| 2014/0157859 A1 | 6/2014 | Darmstadt et al. |
| 2014/0179808 A1 | 6/2014 | Flanagan |
| 2014/0198313 A1 | 7/2014 | Tracy et al. |
| 2014/0221238 A1 | 8/2014 | Regan et al. |
| 2014/0271677 A1 | 9/2014 | Palese et al. |
| 2014/0377334 A1 | 12/2014 | Irvine et al. |
| 2015/0027207 A1 | 1/2015 | Likuski et al. |
| 2015/0094232 A1 | 4/2015 | Abate et al. |
| 2015/0177115 A1 | 6/2015 | Kim et al. |
| 2015/0211044 A1 | 7/2015 | Dallenne et al. |
| 2015/0267196 A1 | 9/2015 | Alsberg et al. |

(56) References Cited

U.S. PATENT DOCUMENTS

| | | |
|---|---|---|
| 2015/0362499 A1 | 12/2015 | Chan |
| 2016/0258856 A1 | 9/2016 | Kim et al. |
| 2016/0299051 A1 | 10/2016 | Kim et al. |
| 2017/0042995 A1 | 2/2017 | Ali et al. |
| 2017/0045436 A1 | 2/2017 | Fox et al. |
| 2017/0138856 A1 | 5/2017 | Li et al. |
| 2017/0159132 A1 | 6/2017 | Okino et al. |
| 2017/0268998 A1 | 9/2017 | Fox et al. |
| 2017/0361322 A1 | 12/2017 | Esmail et al. |
| 2017/0370951 A1 | 12/2017 | Buffiere et al. |
| 2018/0088112 A1 | 3/2018 | Fan et al. |
| 2018/0172687 A1 | 6/2018 | Kaul et al. |
| 2018/0216171 A1 | 8/2018 | Xue et al. |
| 2018/0247195 A1 | 8/2018 | Kumar et al. |
| 2018/0275040 A1 | 9/2018 | Kim et al. |
| 2018/0371525 A1 | 12/2018 | Lebofsky et al. |
| 2019/0145881 A1 | 5/2019 | Fox et al. |
| 2019/0154707 A1 | 5/2019 | Flamini et al. |
| 2019/0249171 A1 | 8/2019 | Wu et al. |
| 2019/0293546 A1 | 9/2019 | Handique |
| 2020/0056231 A1 | 2/2020 | Lebofsky et al. |
| 2020/0115675 A1 | 4/2020 | Pathak et al. |
| 2020/0150020 A1 | 5/2020 | Kim et al. |
| 2020/0206145 A1 | 7/2020 | Shi et al. |
| 2020/0209064 A1 | 7/2020 | Owsley et al. |
| 2020/0230159 A1 | 7/2020 | Ma et al. |
| 2020/0232979 A1 | 7/2020 | Revzin et al. |
| 2020/0249242 A1 | 8/2020 | Batxelli-Molina et al. |
| 2020/0268845 A1 | 8/2020 | Peled et al. |
| 2020/0332354 A1 | 10/2020 | Xue et al. |
| 2020/0363434 A1 | 11/2020 | Buffiere et al. |
| 2020/0399428 A1 | 12/2020 | Kleine-Brüggeney et al. |
| 2020/0400546 A1 | 12/2020 | Kim et al. |
| 2020/0408747 A1 | 12/2020 | Zur Megede et al. |
| 2021/0032297 A1 | 2/2021 | Schmidt et al. |
| 2021/0040567 A1 | 2/2021 | Handique et al. |
| 2021/0130880 A1 | 5/2021 | Lebofsky |
| 2021/0190740 A1 | 6/2021 | Scolari et al. |
| 2021/0231552 A1 | 7/2021 | Kim et al. |
| 2021/0236554 A1 | 8/2021 | Sadelain et al. |
| 2021/0247294 A1 | 8/2021 | Handique |
| 2021/0341469 A1 | 11/2021 | Kim et al. |
| 2022/0042077 A1 | 2/2022 | Lebofsky et al. |
| 2022/0065878 A1 | 3/2022 | Lee |
| 2022/0154266 A1 | 5/2022 | Xue et al. |
| 2022/0178810 A1 | 6/2022 | Kim et al. |
| 2022/0213530 A1 | 7/2022 | Larson et al. |
| 2022/0260476 A1 | 8/2022 | Kim et al. |
| 2022/0267853 A1* | 8/2022 | Vyas ................ C07K 16/2896 |
| 2022/0364976 A1 | 11/2022 | Kim et al. |
| 2023/0012786 A1 | 1/2023 | Lebofsky et al. |
| 2023/0062518 A1 | 3/2023 | Ebrahim et al. |
| 2023/0067460 A1 | 3/2023 | Nguyen et al. |
| 2023/0152202 A1 | 5/2023 | Kim et al. |
| 2023/0176042 A1 | 6/2023 | Kim et al. |
| 2023/0266223 A1 | 8/2023 | Kim et al. |
| 2024/0053248 A1 | 2/2024 | Kim et al. |
| 2024/0060038 A1 | 2/2024 | Nguyen et al. |
| 2024/0159645 A1 | 5/2024 | Kim et al. |
| 2024/0219382 A1 | 7/2024 | Ahn et al. |
| 2024/0269185 A1 | 8/2024 | Nguyen et al. |
| 2024/0319067 A1 | 9/2024 | Kim et al. |

FOREIGN PATENT DOCUMENTS

| | | |
|---|---|---|
| CN | 101245368 A | 8/2008 |
| CN | 102438740 A | 5/2012 |
| CN | 102604305 A | 7/2012 |
| CN | 102675501 A | 9/2012 |
| CN | 103718044 A | 4/2014 |
| CN | 103744185 A | 4/2014 |
| CN | 104641217 A | 5/2015 |
| EP | 2576839 B1 | 5/2017 |
| EP | 3585364 A1 | 1/2020 |
| JP | H07196916 A | 8/1995 |
| JP | 2002510541 A | 4/2002 |
| JP | 2007114026 A | 5/2007 |
| JP | 2010265291 A | 11/2010 |
| JP | 2012011269 A | 1/2012 |
| JP | 2013520530 A | 6/2013 |
| JP | 2013155358 A | 8/2013 |
| JP | 2014058557 A | 4/2014 |
| JP | 2014508516 A | 4/2014 |
| JP | 2015530361 A | 10/2015 |
| WO | WO-8910566 A1 | 11/1989 |
| WO | WO-0008212 A1 | 2/2000 |
| WO | WO-0132829 A2 | 5/2001 |
| WO | WO-03000014 A2 | 1/2003 |
| WO | WO-2005013896 A2 | 2/2005 |
| WO | WO-2006003423 A2 | 1/2006 |
| WO | WO-2006078841 A1 | 7/2006 |
| WO | WO-2006096571 A2 | 9/2006 |
| WO | WO-2008115653 A2 | 9/2008 |
| WO | WO-2008121342 A2 | 10/2008 |
| WO | WO-2010025190 A1 | 3/2010 |
| WO | WO-2010025988 A1 | 3/2010 |
| WO | WO-2011098407 A1 | 8/2011 |
| WO | WO-2012033811 A1 | 3/2012 |
| WO | WO-2013113670 A1 | 8/2013 |
| WO | WO-2018108341 A1 | 6/2018 |
| WO | WO-2020037214 A1 | 2/2020 |
| WO | WO-2021154900 A1 | 8/2021 |
| WO | WO-2023215886 A1 | 11/2023 |
| WO | WO-2023235885 A1 | 12/2023 |
| WO | WO-2024044593 A2 | 2/2024 |

OTHER PUBLICATIONS

Extended European Search Report for European Application No. EP21744765.5 dated Jan. 29, 2024, 8 pages.

Extended European Search Report issued by the European Patent Office for Application No. 16749674.4, dated Sep. 6, 2018, 12 pages.

Falconnet, et al., "Rapid, Sensitive and Real-Time Multiplexing Platform for the Analysis of Protein and Nucleic-Acid Biomarkers," Analytical Chemistry, pp. 1582-1589 (Jan. 15, 2015).

Gaulding, et al., "Reversible Inter- and Intra-microgel Cross-linking Using Disulfides," Macromolecules, 2012, vol. 45(1), pp. 39-45.

Hasegawa, Urara et al. "Nanogel-quantum dot hybrid nanoparticles for live cell imaging." Biochemical and biophysical research communications 331(4):917-921 (2005).

Higuchi, A., et al., "Design of polymeric materials for culturing human pluripotent stem cells: Progress toward feeder-free and xeno-free culturing," Progress in Polymer Science, Jul. 2014, vol. 39 (7), pp. 1348-1374.

Hu and Messersmith, "Rational design of transglutaminase substrate peptides for rapid enzymatic formation of hydrogels," J Am. Chem. Soc. 125, 14298-14299 (Oct. 31, 2003).

Ibadat, et al., "Synthesis and Characterization of Polymeric Microspheres Template for a Homogeneous and Porous Monolith" Polymers 13, 3639, pp. 1-12 (Oct. 22, 2021).

Jin et al., "Overview of cell death 1-124 signaling pathways", Cancer Biology &G Therapy, vol. 4, No. 2, Feb. 2, 2005, pp. 147-171, DOI: 10.4161/cbt.4.2.1508.

Keeney et al., "Single platform flow cytometric absolute CD34 cell counts based on the ISHAGE guidelines.," Cytometry 34:61-70 (Apr. 1998).

Kim I, et al., "Doxorubicin-loaded porous PLGA microparticles with surface attached TRAIL for the inhalation treatment of metastatic lung cancer," Biomaterials,34(27):6444-53, 2013.

Kim, Jin-Woong et al., "Fabrication of Monodisperse Gel Shells and Functional Microgels in Microfluidic Devices," Angew. Chem. Int. Ed. 46:819-1822 (2007).

Lee, Ki-Chang and Lee, Sang-Yun, "Preparation of Highly Cross-Linked, Monodisperse Poly (methyl methacrylate) Microspheres by Dispersion Polymerization; Part II. Semi-continuation Processes," Macromolecular Research 6(4):293-302 (2008).

Liu, A.L., et al., "Methods for Generating Hydrogel Particles for Protein Delivery," Annals of Biomedical Engineering, Jun. 2016, vol. 44 (6), pp. 1946-1958.

(56) References Cited

OTHER PUBLICATIONS

Liu, Z. et al., Recent Advances on Magnetic Sensitive Hydrogels in Tissue Engineering, Frontiers in Chemistry, vol. 8, Article 124, pp. 1-17, (Mar. 2020).

Luchini, Alessandra et al. "Smart hydrogel particles: biomarker harvesting: one-step affinity purification, size exclusion, and protection against degradation." Nano letters 8(1): 350-361 (2008).

Patanarut, Alexis et al., "Synthesis and characterization of hydrogel particles containing Cibacron Blue F3G-A." Colloids and Surfaces A: Physicochemical and Engineering Aspects 362(1):8-19 (2010).

Perez-Luna, V.H., et al., "Encapsulation of Biological Agents in Hydrogels for Therapeutic Applications," Gels, vol. 4(61), pp. 1-30, (Jul. 11, 2018).

Petriz et al. Next-generation cell mimics double as apoptosis controls and efficient flow cytometry. Downloaded from https://slingshotbio.com/wp-contenUuploads/2024/05/ Next-generation-cell-mimics-double-as-apoptosis-controls-and-efficient-flow-cytometry-training-tools.pdf on Jul. 1, 2024. Publication date May 2024, 1 page.

Proll, Guenther et al. "Potential of label-free detection in high-content-screening applications." Journal of Chromatography A 1116(1):2-8 (2007).

Salehi-Reyhani, et al., "Artificial cell mimics as simplified models for the study of cell biology," Experimental Biology and Medicine 2017; 242: 1309-1317.

Shastri, V.P., et al., "Non-Degradable Biocompatible Polymers in Medicine: Past, Present and Future", Current Pharmaceutical Biotechnology, Bentham Science Publishers, NL, vol. 4, No. 5, Jan. 1, 2003, pp. 331-337.

Sutherland et al., "IThe ISHAGE guidelines for CD34+ cell determination by flow cytometry. International Society of Hematotherapy and Graft Engineering," J Hematother 5:213-226 (Jul. 1996).

Tomczak, Nikodem et al., "Designer polymer-quantum dot architectures." Progress in Polymer Science 34:393-430 (2009).

Ugelstad, J. and Mork, P.C., "Swelling of Oligomer-Polymer Particles. New Methods of Preparation of Emulsions and Polymer Dispersions," Advances in Colloid and Interface Sciences, 13:101-140 (1980).

Wallberg et al., "Analysis of Apoptosis and Necroptosis by Fluorescence-Activated Cell Sorting," Cold Spring Harbor Protocol, vol. 2016, No. 4, Apr. 1, 2016, 7 pages.

Whitby et al., "ISHAGE protocol: are we doing it correctly?" Cytometry B Clin Cytom 82(1):9-17 (Jan. 2012). Epub Sep. 13, 2011.

Chi et al., Preparation strategy of hydrogel microsphere and its application in skin repair. Front Bioeng Biotechnol. 2023, vol. 11.: 1239183. Epub Jul. 24, 2023. PDF File: p. 1-13.

Danaei et al., "Impact of particle Size and Polydispersity Index on the Clinical Applications of Lipidic nanocarrier Systems", Pharmaceutics, 2018, pp. 1-17, vol. 10.

Hamilton et al., Hyaluronic Acid Hydrogel Microspheres for Slow Release Stem Cell Delivery. ACS Biomater Sci Eng. 2021, vol. 7(8), p. 3754-3763.

Li et al., Living and Injectable Porous Hydrogel Microsphere with Paracrine Activity for Cartilage Regeneration. Small vol. 19(17):e2207211, pp. 1-14 (Apr. 2023). Epub Jan. 18, 2023.

Liu al., Interventional hydrogel microsphere vaccine as an immune amplifier for activated antitumour immunity after ablation therapy. Nat Commun. 2023, vol. 14: 4106. Epub Jul. 11, 2023. PDF File: p. 1-19.

Moriyama et al., Enzymatic preparation of streptavidin-immobilized hydrogel using a phenolated linear poly(ethylene glycol). Biochem Eng. J. vol. 76, 2013. p. 37-42.

Pimentel et al., The Role of TRAIL in Apoptosis and Immunosurveillance in Cancer. Cancers (Basel). 2023, vol. 15(10): 2752. PDF File: p. 1-18.

Srivastava, TRAIL/Apo-2L: Mechanisms and Clinical Applications in Cancer. Neoplasia. 2001, vol. 3(6), p. 535-546.

Urciuolo A., et al., "Hydrogel-in-hydrogel live bioprinting for guidance and control of organoids and organotypic cultures" Nature Communications. May 30, 2023, vol. 14, No. 1, pp. 3128.

Dussiau C et al., "Hematopoietic Differentiation Is Characterized by a Transient Peak of Entropy at a Single-cell Level," BMC Biology 20(60), pp. 1-15 (Mar. 9, 2022).

International Search Report and Written Opinion for PCT Application No. PCT/US2024/044232 mailed Oct. 25, 2024, 12 pages.

Shim et al., "SAHA Enhances Differentiation of CD34+CD45+ Hematopoietic Stem and Progenitor Cells from Pluripotent Stem Cells Concomitant with an Increase in Hemogenic Endothelium," Stem Cells Translational Medicine 11(5):513-526 (Mar. 29, 2022).

\* cited by examiner

CD34 STEM CELL MIMICS

CROSS-REFERENCE TO RELATED APPLICATIONS

This application claims the benefit of U.S. Provisional Application No. 63/535,233, filed Aug. 29, 2023, the content of which is herein incorporated by reference in its entirety.

REFERENCE TO AN ELECTRONIC SEQUENCE LISTING

The contents of the electronic sequence listing (SLIN_024_01US_SeqList_ST26.xml; Size: 17,366 bytes; and Date of Creation: Aug. 27, 2024) are herein incorporated by reference in its entirety.

FIELD OF THE DISCLOSURE

The present disclosure relates to compositions of matter and methods that allow for calibration and experimental controls of stem cells.

BACKGROUND OF THE INVENTION

CD34-expressing stem cells are increasingly being used in cell therapy and other applications. CD34-expressing stem cells are generally enriched from donor-derived blood samples and phenotypic characterization is performed using flow cytometry to, e.g., characterize the starting material or for quality control following pre- and/or post-enrichment. Flow cytometry allows for measurement of forward scatter ("FSC") and side scatter ("SSC"), which are parameters that correlate with the cell volume and inner complexity of the particle (e.g., shape of the nucleus, the amount and type of cytoplasmic granules or the membrane roughness) respectively, as well as analysis of cell surface markers that are indicative of cell state. Using flow cytometry, CD34-expressing cells in a heterogenous cell population may be sorted, counted, and/or characterized, which allows for their use in a desired application.

Controls are used to calibrate flow cytometer parameters in order to distinguish the optical properties of the CD34-expressing cells from other cells in a heterogenous population. However, commercially-available stem cell controls are largely cell-based. Such controls are limited as they often have a low percentage of CD34-expressing cells (resulting in the need for long sampling times or large control populations to collect sufficient events), suffer from inconsistent supply (introducing cost and/or lot-to-lot variability), and/or are characterized by poor closed-vial shelf life (resulting in the need for more frequent bridging studies in applications requiring comparative studies). Alternative stem cell controls require the use of mobilized peripheral blood in order to get a high percentage of CD34-expressing cells, which introduces significant cost to the process. Therefore, there is a need in the art for acellular compositions that mimic CD34-expressing stem cells in order to calibrate devices such as flow cytometers for analysis of populations containing such cells.

SUMMARY OF THE INVENTION

In some aspects, the present disclosure provides compositions comprising a first population of hydrogel beads comprising: a) a polymerized monomer and a bifunctional monomer; and b) a cell surface biomarker profile comprising: i) CD34 and CD45 extracellular domains.

In some embodiments, the composition further comprises a second population of hydrogel beads comprising: c) a polymerized monomer and a bifunctional monomer; and d) a cell surface biomarker profile comprising: i) CD45 extracellular domain, but lacking a CD34 extracellular domain.

In some embodiments, the composition comprises a second population of hydrogel beads comprising: c) a polymerized monomer and a bifunctional monomer; and d) a cell surface biomarker profile comprising: i) CD45 extracellular domain, wherein each of the hydrogel beads in the second population comprises no more than 10% of the median number of CD34 extracellular domain comprised in the first population of hydrogel beads.

In some embodiments, the composition comprises a second population of hydrogel beads comprising: c) a polymerized monomer and a bifunctional monomer; and d) a cell surface biomarker profile comprising: i) CD45 extracellular domain, wherein the hydrogel beads in the second population comprises no more than 10% of the median number of CD34 extracellular domain comprised in the first population of hydrogel beads.

In some embodiments, the hydrogel beads in the second population comprise no more than 0.1%, no more than 0.2%, no more than 0.3%, no more than 0.5%, no more than 0.7%, no more than 1%, no more than 2%, no more than 3%, no more than 5%, or no more than 7%, of the median number of CD34 extracellular domain comprised in the first population of hydrogel beads. In some embodiments, each of the hydrogel beads in the second population comprises no more than 0.1%, no more than 0.2%, no more than 0.3%, no more than 0.5%, no more than 0.7%, no more than 1%, no more than 2%, no more than 3%, no more than 5%, or no more than 7%, of the median number of CD34 extracellular domain comprised in the first population of hydrogel beads.

In some embodiments, the hydrogel beads in the first population comprise between about 10% and about 400% of the amount of CD45 extracellular domain present on the cell surface of a target cell. In some embodiments, each of the hydrogel beads in the first population comprises between about 10% and about 400% of the amount of CD45 extracellular domain present on the cell surface of a target cell.

In some embodiments, the hydrogel beads in the first population comprise between about 10% and about 300%, about 20% and about 400%, about 20% and about 300%, about 20% and about 200%, or about 50% and about 200%, of the amount of CD45 extracellular domain present on the cell surface of a target cell. In some embodiments, each of the hydrogel beads in the first population comprises between about 10% and about 300%, about 20% and about 400%, about 20% and about 300%, about 20% and about 200%, or about 50% and about 200%, of the amount of CD45 extracellular domain present on the cell surface of a target cell.

In some embodiments, the hydrogel beads in the first population comprise between about 10% and about 400% of the amount of CD34 extracellular domain present on the cell surface of a target cell. In some embodiments, each of the hydrogel beads in the first population comprises between about 10% and about 400% of the amount of CD34 extracellular domain present on the cell surface of a target cell.

In some embodiments, the hydrogel beads in the first population comprise between about 10% and about 300%, about 20% and about 400%, about 20% and about 300%, about 20% and about 200%, or about 50% and about 200%, of the amount of CD34 extracellular domain present on the cell surface of a target cell. In some embodiments, each of the hydrogel beads in the first population comprises between about 10% and about 300%, about 20% and about 400%, about 20% and about 300%, about 20% and about 200%, or about 50% and about 200%, of the amount of CD34 extracellular domain present on the cell surface of a target cell.

In some embodiments, the hydrogel beads in the second population comprise between about 10% and about 400% of the amount of CD45 extracellular domain present on the cell surface of a target cell. In some embodiments, each of the hydrogel beads in the second population comprises between about 10% and about 400% of the amount of CD45 extracellular domain present on the cell surface of a target cell.

In some embodiments, the hydrogel beads in the second population comprise between about 10% and about 300%, about 20% and about 400%, about 20% and about 300%, about 20% and about 200%, or about 50% and about 200%, of the amount of CD45 extracellular domain present on the cell surface of a target cell. In some embodiments, each of the hydrogel beads in the second population comprises between about 10% and about 300%, about 20% and about 400%, about 20% and about 300%, about 20% and about 200%, or about 50% and about 200%, of the amount of CD45 extracellular domain present on the cell surface of a target cell.

In some embodiments, the hydrogel beads in the second population comprise no more than 10% of the amount of CD34 extracellular domain present on the cell surface of a target cell. In some embodiments, each of the hydrogel beads in the second population comprises no more than 10% of the amount of CD34 extracellular domain present on the cell surface of a target cell.

In some embodiments, the hydrogel beads in the second population comprise no more than 0.1%, no more than 0.2%, no more than 0.3%, no more than 0.5%, no more than 0.7%, no more than 1%, no more than 2%, no more than 3%, no more than 5%, or no more than 7%, of the amount of CD34 extracellular domain present on the cell surface of a target cell. In some embodiments, each of the hydrogel beads in the second population comprises no more than 0.1%, no more than 0.2%, no more than 0.3%, no more than 0.5%, no more than 0.7%, no more than 1%, no more than 2%, no more than 3%, no more than 5%, or no more than 7%, of the amount of CD34 extracellular domain present on the cell surface of a target cell.

In some embodiments, the amount of CD34 and/or CD45 extracellular domains present on the cell surface of the target cell is the median amount of CD34 and/or CD45 extracellular domains present on the surface of cells in a leukopack enriched in CD34+ cells using regimen H treatment.

In some embodiments, the target cell is a hematopoietic stem cell. In some embodiments, the target cell is a CD45dim-positive (CD45dim+) and CD34-positive (CD34+) stem cell.

In some embodiments, the target cell is a lymphocyte cell.

In some embodiments, the amount of the CD45 and/or CD34 extracellular domains present in the hydrogel and/or on the cell surface is measured based on the fluorescence intensity using flow cytometry. In some embodiments, the fluorescence intensity of CD45 extracellular domain is measured using a fluorophore labeled CD45-specific binding molecule, and/or wherein the fluorescence intensity of CD34 extracellular domain is measured using a fluorophore labeled CD34-specific binding molecule. In some embodiments, the binding molecule comprises a monoclonal antibody or antigen binding fragment thereof. In some embodiments, the CD34-specific binding molecule is selected from: a phycoerythrin (PE) labeled anti-CD34 antibody clone 8G12, a phycoerythrin (PE) labeled anti-CD34 antibody clone AC136, an allophycocyanin (APC) labeled anti-CD34 antibody clone 4H11, and a Brilliant™ Violet 421 (BV421) labeled anti-CD34 antibody clone 581. In some embodiments, the CD45-specific binding molecule is selected from: a fluorescein isothiocyanate (FITC) labeled anti-CD45 antibody clone 2D1, a PerCP-Cyanine® 5.5 (PerCP-Cy5.5) labeled anti-CD45 antibody clone 2D1, a phycoerythrin (PE) labeled anti-CD45 antibody clone MEM-28, and a BD Horizon™ V500 labeled anti-CD45 antibody clone HI30. In some embodiments, the combination of the CD34-specific binding molecule and the CD45-specific binding molecule are selected from one of the panels in Table 4; optionally, wherein the combination is panel 1 in Table 4.

In some embodiments, the biomarker(s) are attached to a matrix of the hydrogel bead via a linker. In some embodiments, the biomarker(s) are covalently attached to a matrix of the hydrogel bead. In some embodiments, the biomarker(s) are non-covalently attached to a matrix of the hydrogel bead.

In some embodiments, the hydrogel beads of the first and/or second populations have a (mean) diameter of between about 1 µm and about 40 µm, between about 20 µm and about 30 µm, between about 3 µm and about 20 µm, or about 4-10 µm. In some embodiments, the hydrogel beads of the first populations have a (mean) diameter of between about 1 µm and about 40 µm, between about 20 µm and about 30 µm, between about 3 µm and about 20 µm, or about 4-10 µm. In some embodiments, the hydrogel beads of the second populations have a (mean) diameter of between about 1 µm and about 40 µm, between about 20 µm and about 30 µm, between about 3 m and about 20 µm, or about 4-10 µm. In some embodiments, the hydrogel beads of the first and the second populations have a (mean) diameter of between about 1 µm and about 40 µm, between about 20 µm and about 30 µm, between about 3 µm and about 20 µm, or about 4-10 µm.

In some embodiments, an active portion of the composition comprises or consists of the first and second population of hydrogel beads.

In some embodiments, the first population comprises between 1-3% of the number of hydrogel beads in the active portion of the composition.

In some embodiments, the second population comprises between 50-99% of the number of hydrogel beads in the active portion of the composition; wherein any remainder in the active portion of the composition comprises hydrogel beads lacking CD34 and lacking CD45. In some embodiments, the second population comprises between 97-99% of the number of hydrogel beads in the active portion of the composition; wherein any remainder in the active portion of the composition comprises hydrogel beads lacking CD34 and lacking CD45.

In some embodiments, the first population comprises between 1-3% of the number of hydrogel beads in the active portion of the composition; and the second population comprises between 97-99% of the number of hydrogel beads in the active portion of the composition.

In some embodiments, the first population comprises between 1.4-1.8% of the number of hydrogel beads in the active portion of the composition; and the second population comprises between 98.2-98.6% of the number of hydrogel beads in the active portion of in the composition.

In some embodiments, the first population and the second population of hydrogel beads together comprise at least 80%, at least 85%, at least 90%, at least 95%, at least 96%, at least 97%, at least 98%, at least 99%, at least 99.5%, or 100% of the number of hydrogel beads in the active portion of the composition.

In some embodiments, the ratio of the number of the first population of hydrogel beads to the number of the second population of hydrogel beads is no more than 1, no more than 0.5, no more than 0.3, no more than 0.2, no more than 0.1, no more than 0.07, no more than 0.05, no more than 0.03, no more than 0.02, no more than 0.018, no more than 0.017, no more than 0.016, no more than 0.015, no more than 0.01, no more than 0.005, or no more than 0.001. In some embodiments, the ratio of the number of the first population of hydrogel beads to the number of the second population of hydrogel beads is no more than 0.0183.

In some embodiments, the ratio of the number of the first population of hydrogel beads to the number of the second population of hydrogel beads is between about 1 and about 0.5, between about 0.5 and about 0.2, between about 0.2 and about 0.1, between about 0.1 and about 0.05, between about 0.05 and about 0.02, between about 0.02 and about 0.015, between about 0.015 and about 0.01, between about 0.01 and about 0.005, between about 0.005 and about 0.002, or between about 0.002 and about 0.001, including all ranges and subranges therebetween. In some embodiments, the ratio of the number of the first population of hydrogel beads to the number of the second population of hydrogel beads is between about 0.0183 and about 0.0142.

In some embodiments, the first population comprises between 10%-95% of the number of hydrogel beads in the active portion of the composition.

In some embodiments, the first population comprises between 80%-95% of the number of hydrogel beads in the active portion of the composition.

In some embodiments, the second population comprises between 5-90% of the number of hydrogel beads in the active portion of the composition. In some embodiments, any remainder in the active portion of the composition comprises hydrogel beads lacking CD34 or CD45.

In some embodiments, the second population comprises between 5-20% of the number of hydrogel beads in the active portion of the composition.

In some embodiments, the first population comprises between 80-95% of the number of hydrogel beads in the active portion of the composition; and the second population comprises between 5-20% of the number of hydrogel beads in the active portion of the composition. In some embodiments, the first population comprises between 90-95% of the number of hydrogel beads in the active portion of the composition; and the second population comprises between 5-10% of the number of hydrogel beads in the active portion of the composition.

In some embodiments, the first population and the second population of hydrogel beads together comprise at least 80%, at least 85%, at least 90%, at least 95%, or 100% of the number of hydrogel beads in the active portion of the composition.

In some embodiments, the ratio of the number of the first population of hydrogel beads to the number of the second population of hydrogel beads is at least 1, at least 2, at least 5, at least 7, at least 8, at least 9, at least 10, at least 11, at least 12, at least 13, at least 14, at least 15, at least 16, at least 17, at least 18, at least 19, at least 20, at least 25, at least 30, at least 50, at least 70, or at least 100. In some embodiments, the ratio of the number of the first population of hydrogel beads to the number of the second population of hydrogel beads is at least 9.

In some embodiments, the ratio of the number of the first population of hydrogel beads to the number of the second population of hydrogel beads is between about 1 and about 2, between about 2 and about 5, between about 5 and about 8, between about 8 and about 10, between about 10 and about 12, between about 12 and about 15, between about 15 and about 20, between about 20 and about 50, between about 50 and about 100, including all ranges and subranges therebetween. In some embodiments, the ratio of the number of the first population of hydrogel beads to the number of the second population of hydrogel beads is between about 9 and about 19.

In some aspects, the present disclosure provides kits comprising two containers comprising different compositions of the disclosure. In some embodiments, the first container comprises the composition having more hydrogel beads in the second population than in the first population, and the second container comprises the composition having more hydrogel beads in the first population than in the second population. In some embodiments, the first container comprises at least 2, 3, 4, 5, 6, 7, 8 or more times the hydrogel beads than the second container.

In some embodiments, the first container comprises about $5 \times 10^5$ to about $2 \times 10^6$ beads and the second container comprises about $1 \times 10^5$ to about $4 \times 10^5$ beads. In some embodiments, the first container comprises about $1 \times 10^6$ beads and the second container comprises about $2.5 \times 10^5$ beads.

In some embodiments, the ratio of (a) the total number of the first and second populations of hydrogel beads in the first container and (b) the total number of the first and second populations of hydrogel beads in the second container is between about 1 and about 10, between about 2 and about 8, between about 3 and about 6, or about 4, including all ranges and subranges therebetween.

In some embodiments, the CD34 and CD45 cell surface markers each comprise a fluorophore.

In some embodiments, the CD34 and CD45 cell surface markers each comprise a different fluorophore.

In some embodiments, each fluorophore is independently selected from any one of: peridinin chlorophyll protein-cyanine 5.5 dye (PerCP-Cy5.5); phycoerythrin-cyanine7 (PE Cy7); allophycocyanin-cyanine 7 (APC-Cy7); fluorescein isothiocyanate (FITC); phycoerythrin (PE); allophyscocyanin (APC); 6-carboxy-4',5'-dichloro-2',7'-dimethoxyfluorescein succinimidylester; 5-(and-6)-carboxyeosin; 5-carboxyfluorescein; 6 carboxyfluorescein; 5-(and-6)-carboxyfluorescein; S-carboxyfluorescein-bis-(5-carboxymethoxy-2-nitrobenzyl)ether,-alanine-carboxamide, or succinimidyl ester; 5-carboxy fluorescein succinimidyl ester; 6-carboxyfluorescein succinimidyl ester; 5-(and-6)-carboxyfluorescein succinimidyl ester; 5-(4,6-dichlorotriazinyl) amino fluorescein; 2',7'-difluoro fluorescein; eosin-5-isothiocyanate; erythrosin5-isothiocyanate; 6-(fluorescein-5-carboxamido) hexanoic acid or succinimidyl ester; 6-(fluorescein-5-(and-6)-carboxamido) hexanoic acid or succinimidylester; fluorescein-S-EX succinimidyl ester; fluorescein-5-isothiocyanate; fluorescein-6-isothiocyanate; OregonGreen® 488 carboxylic acid, or succinimidyl ester; Oregon Green® 488 isothiocyanate; Oregon Green® 488-X succinimidyl ester; Oregon Green® 500 carboxylic acid; Oregon Green® 500 carboxylic acid, succinimidylester or triethylammonium salt; Oregon Green® 514 carboxylic acid; Oregon Green® 514 carboxylic acid or succinimidyl ester; RhodamineGreen™ carboxylic acid, succinimidyl ester or hydrochloride; Rhodamine Green™ carboxylic acid, trifluoroacetamide or succinimidylester; Rhodamine Green™-X succinimidyl ester or hydrochloride;

RhodolGreen™ carboxylic acid, N,O-bis-(trifluoroacetyl) or succinimidylester; bis-(4-carboxypiperidinyl) sulfonerhodamine or di(succinimidylester); 5-(and-6)carboxynaphthofluorescein,5-(and-6)carboxynaphthofluorescein succinimidyl ester; 5-carboxyrhodamine 6G hydrochloride; 6-carboxyrhodamine 6G hydrochloride, 5-carboxyrhodamine 6G succinimidyl ester; 6-carboxyrhodamine 6G succinimidyl ester; 5-(and-6)-carboxyrhodamine6G succinimidyl ester; 5-carboxy-2',4',5',7'-tetrabromosulfonefluorescein succinimidyl esteror bis-(diisopropylethylammonium) salt; 5-carboxytetramethylrhodamine; 6-carboxytetramethylrhodamine; 5-(and-6)-carboxytetramethylrhodamine; 5-carboxytetramethylrhodamine succinimidyl ester; 6-carboxytetramethylrhodaminesuccinimidyl ester; 5-(and-6)-carboxytetramethylrhodamine succinimidyl ester; 6-carboxy-X-rhodamine; 5-carboxy-X-rhodamine succinimidyl ester; 6-carboxy-X-rhodamine succinimidyl ester; 5-(and-6)-carboxy-X-rhodamine succinimidyl ester; 5-carboxy-X-rhodamine triethylammonium salt; Lissamine™ rhodamine B sulfonyl chloride; malachite green; isothiocyanate; NANOGOLD® mono(sulfosuccinimidyl ester); QSY® 21carboxylic acid or succinimidyl ester; QSY® 7 carboxylic acid or succinimidyl ester; Rhodamine Red™-X succinimidyl ester; 6-(tetramethylrhodamine-5-(and-6)-carboxamido) hexanoic acid; succinimidyl ester; tetramethylrhodamine-5-isothiocyanate; tetramethylrhodamine-6-isothiocyanate; tetramethylrhodamine-5-(and-6)-isothiocyanate; Texas Red® sulfonyl; Texas Red® sulfonyl chloride; Texas Red®-X STP ester or sodium salt; Texas Red®-X succinimidyl ester; Texas Red®-X succinimidyl ester; X-rhodamine-5-(and-6) isothiocyanate, BODIPY® FL; BODIPY® TMR STP ester; BODIPY® TR-X STP ester; BODIPY® 630/650-X STPester; BODIPY® 650/665-X STP ester; 6-dibromo-4,4-difluoro-5,7-dimethyl-4-bora-3a, 4a-diaza-s-indacene-3-propionic acid succinimidyl ester; 4,4-difluoro-4-bora-3a,4a-diaza-s-indacene-3,5-dipropionic acid; 4,4-difluoro-5,7-dimethyl-4-bora-3a,4a-diaza-s-indacene-3-pentanoicacid; 4,4-difluoro-5,7-dimethyl-4-bora3a,4a-diaza-s-indacene-3-pentanoicacid succinimidyl ester; 4,4-difluoro-5,7-dimefhyl-4-bora-3a,4a-diaza-s-indacene-3propionic acid; 4,4-difluoro-5,7-dimethyl-4-bora-3a, 4adiaza-s-indacene-3-propionic acid succinimidyl ester; 4,4-difluoro-5,7-dimefhyl-4-bora-3a,4a-diaza-s-indacene-3propionic acid; sulfosuccinimidyl ester or sodium salt; 6-((4,4-difluoro-5,7-dimethyl-4-bora-3a,4a-diaza-s-indacene-3propionyl)amino)hexanoic acid; 6-((4,4-difluoro-5,7 dimethyl-4-bora-3a,4a-diaza-s-indacene-3-propionyl)amino)hexanoic acid or succinimidyl ester; N-(4,4-difluoro-5,7-dimethyl-4-bora-3a,4a-diaza-s-indacene-3-propionyl) cysteic acid, succinimidyl ester or triethylammonium salt; 6-4,4-difluoro-1,3-dimethyl-5-(4-methoxyphenyl)-4-bora-3a,4a-4,4-difluoro-5,7-diphenyl-4-bora-3a,4a-diaza-sindacene-3-propionic acid; 4,4-difluoro-5,7-diphenyl-4-bora-3a,4a-diaza-s-indacene-3-propionic acid succinimidyl ester; 4, 4-difluoro-5-phenyl-4-bora-3a, 4a-diaza-s-indacene-3-propionic acid; succinimidyl ester; 6-((4, 4-difluoro-5-phenyl-4-bora-3a,4a-diaza-s-indacene-3-propionyl)amino) hexanoic acid or succinimidyl ester; 4,4-difluoro-5-(4-phenyl-1,3butadienyl)-4-bora-3a,4a-diaza-s-indacene-3-propionic acid succinimidyl ester; 4, 4-difluoro-5-(2-pyrrolyl)-4-bora-3a,4a-diaza-s-indacene-3-propionic acid succinimidyl ester; 6-(((4,4-difluoro-5-(2-pyrrolyl)-4-bora-3a,4a-diaza-s-indacene-3-yl)styryloxy)acetyl)aminohexanoic acid or succinimidyl ester; 4,4-difluoro-5-styryl-4-bora-3a, 4a-diaza-s-indacene-3-propionic acid; 4,4-difluoro-5-styryl-4-bora-3a, 4a-diaza-sindacene-3-propionic acid; succinimidyl ester; 4,4-difluoro-1,3,5,7-tetramethyl-4-bora-3a,4a-diaza-s-indacene-8-propionic acid; 4,4-difluoro-1,3,5,7-tetramethyl-4-bora-3a,4a-diaza-sindacene-8-propionic acid succinimidyl ester; 4,4-difluoro-5-(2-thienyl)-4-bora-3a,4a-diaza-sindacene-3-propionic acid succinimidyl ester; 6-(((4-(4,4-difluoro-5-(2-thienyl)-4-bora-3a,4a-diazas-indacene-3-yl) phenoxy)acetyl)amino)hexanoic acid or succinimidyl ester; and 6-(((4,4-difluoro-5-(2-thienyl)-4-bora-3a,4a-diaza-s-indacene-3-yl)styryloxy)acetyl) aminohexanoic acid or succinimidyl ester, Alexa Fluor®350 carboxylic acid; Alexa Fluor®430 carboxylic acid; Alexa Fluor® 488 carboxylic acid; Alexa Fluor®532 carboxylic acid; Alexa Fluor®546 carboxylic acid; Alexa Fluor®555 carboxylic acid; Alexa Fluor®568 carboxylic acid; Alexa Fluor®594 carboxylic acid; Alexa Fluor®633 carboxylic acid; Alexa Fluor®64 7 carboxylic acid; Alexa Fluor® 660 carboxylic acid; Alexa Fluor®680 carboxylic acid, Cy3 NHS ester; Cy 5 NHS ester; Cy5.5 NHS ester; and Cy7 NHS ester.

In some embodiments, the fluorophores are conjugated to an antibody or fragment thereof that is bound to an epitope within the polymer beads.

In some embodiments, the CD34 is from *H. sapiens*. In some embodiments, the CD34 extracellular domain comprises Ser32-Thr290 of uniprot P28906, or a sequence comprising at least 70%, 75%, 80%, 85%, 90%, 95%, or 97.5% identity with SEQ ID NO: 1.

In some embodiments, the CD45 is from *H. sapiens*. In some embodiments, the CD45 extracellular domain comprises Gln26-Lys577 of uniprot P08575, or a sequence comprising at least 70%, 75%, 80%, 85%, 90%, 95%, or 97.5% identity with any one of SEQ ID NO: 2-9. In some embodiments, the CD45 extracellular domain comprises Gln26-Lys577 of uniprot P08575, or a sequence comprising at least 70%, 75%, 80%, 85%, 90%, 95%, or 97.5% identity with SEQ ID NO: 10.

In some embodiments, the hydrogel beads exhibit at least one optical property that is substantially similar to the corresponding optical property of a target cell. In some embodiments, the at least one optical property comprises side scatter. In some embodiments, the at least one optical property comprises forward scatter. In some embodiments, the at least one optical property comprises side scatter and forward scatter.

In some embodiments, target cell is a hematopoietic stem cell. In some embodiments, the target cell is a lymphocyte cell.

In some aspects, the disclosure provides methods of calibrating a cytometer for detection of a CD34-expressing cell in a population of cells. In some aspects, the disclosure provides methods of calibrating a cytometer for detection of a CD45-expressing cell in a population of cells. In some aspects, the disclosure provides methods of calibrating a cytometer for detection of a CD34-expressing and CD45-expressing cell in a population of cells. In some embodiments, the method comprises sampling a composition or kit of the disclosure, and calibrating the cytometer based on at least one optical property of the hydrogel beads of the composition. In some embodiments, the method further comprises sampling the population of cells and obtaining a cell comprising the at least one optical property. In some embodiments, the method comprises forming a gating scheme based on the at least one optical property.

In some aspects, the disclosure provides methods of enriching CD34-expressing cells, comprising sampling a composition or kit of the disclosure and forming a gating scheme based on at least one optical property of the hydrogel beads of the composition, and selecting CD34-expressing cells in a population of cells based on the gating scheme.

In some embodiments, the CD34-expressing cell expresses a diminished amount of CD45.

In some embodiments, the CD34-expressing cell is a CD34-expressing stem cell.

In some embodiments, the at least one optical property comprises FSC, SSC, median fluorescence intensity (MFI) of CD45, MFI of CD34, or any combination thereof.

In some aspects, the present disclosure provides a first composition comprising the first population and the second population, wherein the first and second population of hydrogel beads together comprise the active portion of the composition. In some embodiments, the first population comprises between 1-3% of the number of hydrogel beads in the active portion of the composition. In some embodiments, the second population comprises between 50-99% of the number of hydrogel beads in the active portion of the composition; wherein any remainder in the active portion of the composition comprises hydrogel beads lacking CD34 or CD45. In some embodiments, the second population comprises between 97-99% of the number of hydrogel beads in the active portion of the composition. In some embodiments, the first population comprises between 1-3% of the number of hydrogel beads in the active portion of the composition; and the second population comprises between 97-99% of the number of hydrogel beads in the active portion of the composition. In some embodiments, the first population comprises between 1.4-1.8% of the number of hydrogel beads in the active portion of the composition; and the second population comprises between 98.2-98.6% of the number of hydrogel beads the active portion of in the composition.

In some aspects, the present disclosure provides a second composition comprising the first population and the second population, wherein the first and second population of hydrogel beads together comprise the active portion of the composition. In some embodiments, the first population comprises between 10%-95% of the number of hydrogel beads in the active portion of the composition. In some embodiments, the first population comprises between 80%-95% of the number of hydrogel beads in the active portion of the composition. In some embodiments, the second population comprises between 5-90% of the number of hydrogel beads in the active portion of the composition; wherein any remainder in the active portion of the composition comprises hydrogel beads lacking CD34 or CD45. In some embodiments, the second population comprises between 5-20% of the number of hydrogel beads in the active portion of the composition. In some embodiments, the first population comprises between 80-95% of the number of hydrogel beads in the active portion of the composition; and the second population comprises between 5-20% of the number of hydrogel beads in the active portion of the composition. In some embodiments, the first population comprises between 90-95% of the number of hydrogel beads in the active portion of the composition; and the second population comprises between 5-10% of the number of hydrogel beads in the active portion of the composition.

In some embodiments of any of the foregoing or related aspects, the CD34 is from *H. sapiens*. In some embodiments, the CD45 is from *H. sapiens*. In some embodiments, the CD34 extracellular domain comprises Ser32-Thr290 of uniprot P28906 or SEQ ID NO: 11, or a sequence comprising at least 70%, 75%, 80%, 85%, 90%, 95%, or 97.5% identity with Ser32-Thr290 of uniprot P28906 or SEQ ID NO: 11. In some embodiments, the CD34 extracellular domain comprises SEQ ID NO: 1, or a sequence comprising at least 70%, 75%, 80%, 85%, 90%, 95%, or 97.5% identity with SEQ ID NO: 1. In some embodiments, the CD45 extracellular domain comprises Gln26-Lys577 of uniprot P08575 or SEQ ID NO: 12, or a sequence comprising at least 70%, 75%, 80%, 85%, 90%, 95%, or 97.5% identity with Gln26-Lys577 of uniprot P08575 or SEQ ID NO: 12. In some embodiments, the CD45 extracellular domain comprises SEQ ID NO: 2, or a sequence comprising at least 70%, 75%, 80%, 85%, 90%, 95%, or 97.5% identity with SEQ ID NO: 2.

In some embodiments of any of the foregoing or related aspects, hydrogel beads exhibit at least one optical property that is substantially similar to the corresponding optical property of a target cell. In some embodiments, the at least one optical property is side scatter. In some embodiments, the at least one optical property is forward scatter. In some embodiments, the at least one optical property comprises side scatter and forward scatter. In some embodiments, the target cell is a hematopoietic stem cell.

In some aspects, the disclosure provides a method of calibrating a cytometer for detection of a CD34-expressing cell in a population of cells, comprising sampling a composition described herein, and calibrating the cytometer based on at least one optical property of the hydrogel beads of the composition. In some embodiments, the method further comprises sampling the population of cells and obtaining a cell comprising the at least one optical property. In some embodiments, the cell is a CD34-expressing cell.

DETAILED DESCRIPTION OF THE INVENTION

Definitions

Figure 1A:
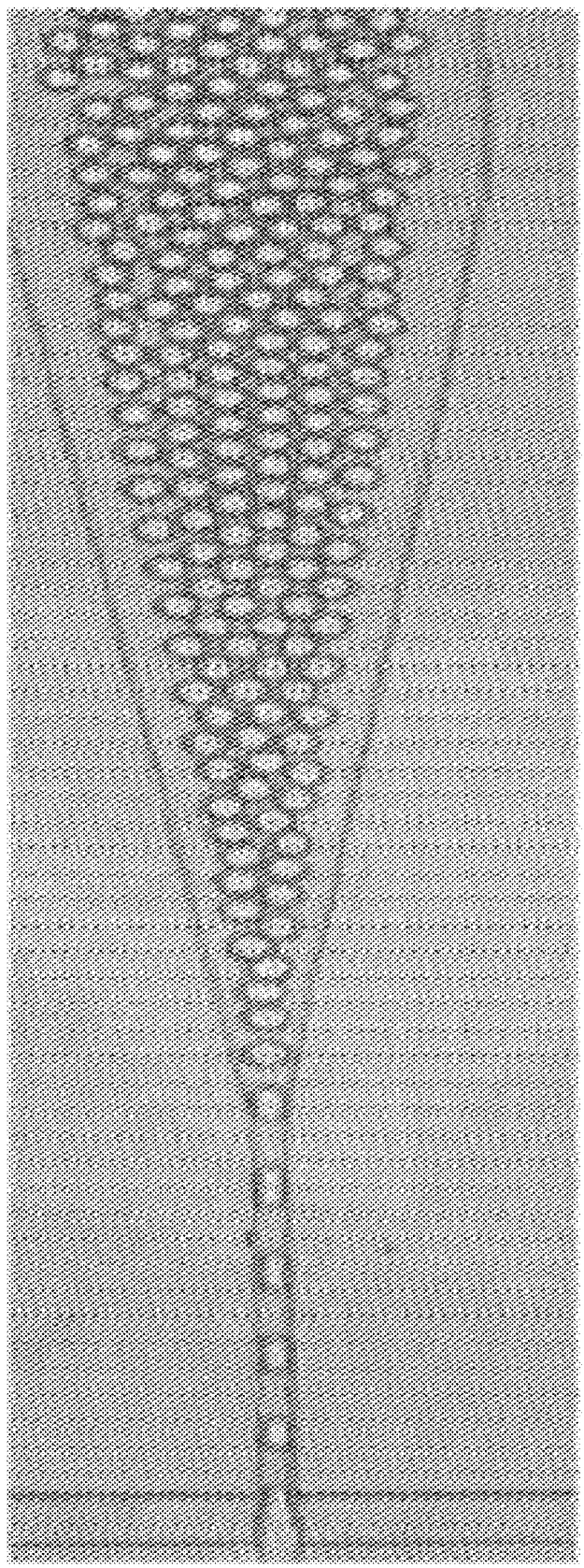
FIG. 1A-1C provides brightfield and fluorescent images of labeled hydrogel beads of the disclosure.

The indefinite articles "a" and "an" and the definite article "the" are intended to include both the singular and the plural, unless the context in which they are used clearly indicates otherwise.

"At least one" and "one or more" are used interchangeably to mean that the article may include one or more than one of the listed elements.

"Substantially similar," as used herein, denotes at least 40% similar, at least 50% similar, at least 60% similar, at least 70% similar, at least 80% similar, at least 90% similar, at least 95% similar, at least 96% similar, at least 97% similar, at least 98% similar or at least 99% similar.

As used herein, the term "MFI" refers to the Median Fluorescence Intensity. Median, which is the 50th percentile of a population, represents the value at which half of a measured population is above and the other half below. MFI is separate and distinct from "gMFI," which refers to geometric mean fluorescent intensity. Both MFI and gMFI measure the shift in fluorescence intensity of a population of cells.

Unless otherwise indicated, it is to be understood that all numbers expressing quantities, ratios, and numerical properties of ingredients, reaction conditions, and so forth, used in the specification and claims are contemplated to be able to be modified in all instances by the term "about".

Throughout this application, the term "about" is used to indicate that a value includes the inherent variation of error for the device or the method being employed to determine the value, or the variation that exists among the samples being measured. Unless otherwise stated or otherwise evident from the context, the term "about" means within 10% above or below the reported numerical value (except where such number would exceed 100% of a possible value or go below 0%). When used in conjunction with a range or series of values, the term "about" applies to the endpoints of the range or each of the values enumerated in the series, unless otherwise indicated. As used in this application, the terms "about" and "approximately" are used as equivalents.

As referred to herein, the term "hydrogel" refers to the macromolecular material whether dehydrated or in a hydrated state.

The term "active portion" when used in reference to a composition comprising hydrogel beads of the disclosure refers to the portion of hydrogel beads that contains a cell surface biomarker profile. Such hydrogel beads can be used, in some embodiments, as positive controls in flow cytometry for the presence of the corresponding biomarker. In contrast, an inactive portion of the hydrogel beads may include, for example, hydrogel beads that are formed by a polymerized monomer but do not contain any cell surface biomarker.

The term "including all ranges and subranges therebetween" or equivalents, are used herein to denote the intention that disclosure of any range or series of possible values, inherently also discloses all ranges and subranges encompassed by the highest and lowest values disclosed. This term includes the entire range from highest to lowest disclosed values, as well as subranges from any two or more disclosed points. This term is also intended to disclose any subranges encompassed anywhere within the highest and lowest disclosed values, including between two points that are explicitly recited in the document, up to one decimal point. Thus, disclosure of values 0, 5, 10, 15, 20, including all ranges and subranges therebetween, should be interpreted as also encompassing a range from 0-20, a range from 0-5 or 5-15, as well as a range from 2-16, or 3.1 to 19.8, etc.

Unless otherwise indicated, it is to be understood that all numbers expressing quantities, ratios, and numerical properties of ingredients, reaction conditions, and so forth, used in the specification are contemplated to be able to be modified in all instances by the term "including all ranges and subranges therebetween."

As used herein, "and/or" refers to and encompasses any and all possible combinations of one or more of the associated listed items.

Overview

This disclosure relates to the use of quantitative biomolecule cell mimics to enhance characterization of CD34-expressing cells in a heterogenous cell population. These cell mimics serve as reliable quantitative controls with known antigen density of biomolecules, for example, CD45 and CD34 molecules. Incorporating the cell mimics as reference material enables standardization, increasing comparability and data consistency across laboratories. These mimics play a vital role for assay transfer, facilitating reliable data exchange between different research settings. Additionally, cell mimics with quantified biomolecules aid in receptor occupancy assessment method development and validation, optimizing staining conditions, antibody concentrations, and assay sensitivity and specificity.

These cell mimics were designed using hydrogel bead manufacturing and biomolecule incorporation technology. This innovative approach enables the design of cell mimics that are independently tuned along optical and biochemical parameters, and also optionally physical parameters, such as size. By precisely controlling these parameters, this synthetic cell printing technology provides a versatile and customizable tool for immunophenotyping applications.

These cell mimics are a non-biohazardous and shelf stable alternative to primary cells. They require no maintenance prior to staining, enabling labs with limited resources to achieve reliable results. In summary, the utilization of quantitative cell mimics enhances stem cell characterization practices, providing quality control, standardization, method validation, and cost-effectiveness. By incorporating this quantitative cell mimic, clinical labs can achieve consistent and reliable results while optimizing resource utilization and advancing characterization techniques.

These cell mimics are applicable to evaluation of starting materials used to generate populations of CD34-expressing stem cells (e.g., donor derived blood samples), as well as quality control of such populations following downstream processing steps (e.g., pre- and post-enrichment).

The present disclosure can be used on any appropriate detection or analysis platform, including, without limitation, imaging (e.g., a microscope, a scanner, or the like), flow cytometry, or other immunodetection methods (e.g., an ELISA assay), electrophoresis, omic analysis (genomics, glycomics, proteomics, lipidomics analysis), molecular analysis (q-PCR etc.), or the like. Analysis, such as imaging or detecting, can be performed in fluorescence, bright field, dark field, or immunohistochemical (e.g. chromogenic stains).

Hydrogel Beads

A hydrogel is a material comprising a macromolecular three-dimensional network that allows it to swell when in the presence of water, to shrink in the absence of (or by reduction of the amount of) water, but not dissolve in water.

The swelling, i.e., the absorption of water, is a consequence of the presence of hydrophilic functional groups attached to or dispersed within the macromolecular network. Crosslinks between adjacent macromolecules result in the aqueous insolubility of these hydrogels. The cross-links may be due to chemical (i.e., covalent) or physical (i.e., VanDer Waal forces, hydrogen-bonding, ionic forces, etc.) bonds. Synthetically prepared hydrogels can be prepared by polymerizing a monomeric material to form a backbone and cross-linking the backbone with a crosslinking agent. A characteristic of a hydrogel that is of particular value is that the material retains the general shape, whether dehydrated or hydrated. Thus, if the hydrogel has an approximately spherical shape in the dehydrated condition, it will be spherical in the hydrated condition.

The hydrogels provided herein, in the form of beads, are synthesized by polymerizing one or more of the monomers provided herein. The synthesis is carried out to form individual hydrogel beads. The monomeric material (monomer) in one embodiment is polymerized to form a homopolymer. However, in some embodiments, copolymers of different monomeric units (i.e., co-monomers) are synthesized and used in the methods provided herein. The monomer or co-monomers used in the methods and compositions described herein, in some embodiments, is a bifunctional monomer or includes a bifunctional monomer (where co-monomers are employed). In some embodiments, the hydrogel is synthesized in the presence of a crosslinker. In further embodiments, embodiment, the hydrogel is synthesized in the presence of a polymerization initiator.

The amount of monomer can be varied by the user of the disclosure, for example to obtain a particular property that is substantially similar to that of a target cell. In one embodiment, the monomeric component(s) (i.e., monomer, co-monomer, bifunctional monomer, or a combination thereof, for example, bis/acrylamide in various crosslinking ratios, allyl amine or other co-monomers which provide chemical functionality for secondary labeling/conjugation or alginate is present at about 10 percent by weight to about 95 percent weight of the hydrogel. In further embodiments, the monomeric component(s) is present at about 15 percent by weight to about 90 percent weight of the hydrogel, or about 20 percent by weight to about 90 percent weight of the hydrogel.

Examples of various monomers and cross-linking chemistries available for use with the present disclosure are provided in the Thermo Scientific Crosslinking Technical Handbook entitled "Easy molecular bonding crosslinking technology," (available at tools.lifetechnologies.com/content/sfs/brochures/1602163-Crosslinking-Reagents-Handbook.pdf, the disclosure of which is incorporated by reference in its entirety for all purposes. For example, hydrazine (e.g., with an NHS ester compound) or EDC coupling reactions (e.g., with a maleimide compound) can be used to construct the hydrogels of the disclosure.

In some embodiments, a monomer for use with the hydrogels provided herein is lactic acid, glycolic acid, acrylic acid, 1-hydroxyethyl methacrylate, ethyl methacrylate, 2-hydroxyethyl methacrylate (HEMA), propylene glycol methacrylate, acrylamide, N-vinylpyrrolidone (NVP), methyl methacrylate, glycidyl methacrylate, glycerol methacrylate (GMA), glycol methacrylate, ethylene glycol, fumaric acid, a derivatized version thereof, or a combination thereof.

In some embodiments, one or more of the following monomers is used herein to form a hydrogel of the present disclosure: 2-hydroxyethyl methacrylate, hydroxyethoxyethyl methacrylate, hydroxydiethoxyethyl methacrylate, methoxyethyl methacrylate, methoxyethoxyethyl methacrylate, methoxydiethoxyethyl methacrylate, poly(ethylene glycol) methacrylate, methoxy-poly(ethylene glycol) methacrylate, methacrylic acid, sodium methacrylate, glycerol methacrylate, hydroxypropyl methacrylate, hydroxybutyl methacrylate or a combination thereof.

In other embodiments, one or more of the following monomers is used herein to form a tunable hydrogel: phenyl acrylate, phenyl methacrylate, benzyl acrylate, benzyl methacrylate, 2-phenylethyl acrylate, 2-phenylethyl methacrylate, 2-phenoxyethyl acrylate, 2-phenoxyethyl methacrylate, phenylthioethyl acrylate, phenylthioethyl methacrylate, 2,4,6-tribromophenyl acrylate, 2,4,6-tribromophenyl methacrylate, pentabromophenyl acrylate, pentabromophenyl methacrylate, pentachlorophenyl acrylate, pentachlorophenyl methacrylate, 2,3-dibromopropyl acrylate, 2,3-dibromopropyl methacrylate, 2-naphthyl acrylate, 2-naphthyl methacrylate, 4-methoxybenzyl acrylate, 4-methoxybenzyl methacrylate, 2-benzyloxyethyl acrylate, 2-benzyloxyethyl methacrylate, 4-chlorophenoxyethyl acrylate, 4-chlorophenoxyethyl methacrylate, 2-phenoxyethoxyethyl acrylate, 2-phenoxyethoxyethyl methacrylate, N-phenyl acrylamide, N-phenyl methacrylamide, N-benzyl acrylamide, N-benzyl methacrylamide, N,N-dibenzyl acrylamide, N,N-dibenzyl methacrylamide, N-diphenylmethyl acrylamide N-(4-methylphenyl)methyl acrylamide, N-1-naphthyl acrylamide, N-4-nitrophenyl acrylamide, N-(2-phenylethyl)acrylamide, N-triphenylmethyl acrylamide, N-(4-hydroxyphenyl)acrylamide, N,N-methylphenyl acrylamide, N,N-phenyl phenylethyl acrylamide, N-diphenylmethyl methacrylamide, N-(4-methyl phenyl)methyl methacrylamide, N-1-naphthyl methacrylamide, N-4-nitrophenyl methacrylamide, N-(2-phenylethyl)methacrylamide, N-triphenylmethyl methacrylamide, N-(4-hydroxyphenyl)methacrylamide, N,N-methylphenyl methacrylamide, N,N'-phenyl phenylethyl methacrylamide, N-vinylcarbazole, 4-vinylpyridine, 2-vinylpyridine, as described in U.S. Pat. No. 6,657,030, which is incorporated by reference in its entirety herein for all purposes.

Both synthetic monomers and bio-monomers can be used in the hydrogels provided herein, to form synthetic hydrogels, bio-hydrogels, or hybrid hydrogels that comprise a synthetic component and a bio-component (e.g., peptide, protein, monosaccharide, disaccharide, polysaccharide, primary amines sulfhydryls, carbonyls, carbohydrates, carboxylic acids present on a biomolecule). For example, proteins, peptides or carbohydrates can be used as individual monomers to form a hydrogel that includes or does not include a synthetic monomer (or polymer) and in combination with chemically compatible co-monomers and crosslinking chemistries (see for example, the Thermo Scientific Crosslinking Technical Handbook entitled "Easy molecular bonding→crosslinking→technology,"→available→at tools.lifetechnologies.com/content/sfs/brochures/1602163-Crosslinking-Reagents-Handbook.pdf, the disclosure of which is incorporated by reference in its entirety for all purposes). Compatible crosslinking chemistries include, but are not limited to, amines, carboxyls, and other reactive chemical side groups. Representative reactive groups amenable for use in the hydrogels and monomers described herein are provided in Table 1, below.

TABLE 1

Crosslinker reactive groups amenable for bio-monomer conjugation

| Reactivity class | Target functional group | Reactive chemical group |
|---|---|---|
| Amine reactive | —NH2 | NHS ester |
| | | Imidoester |
| | | Penafluorophenyl ester |
| | | Hydroxymethyl phosphine |
| Carboxyl-to-amine reactive | —COOH | Carbodiimide (e.g., EDC) |
| Sulfhydryl-reactive | —SH | Maeleimide |
| | | Haloacetyl (bromo- or iodo-) Pyridylsulfide |
| | | Thiosulfonate |
| | | Vinylsulfonate |
| Aldehyde-reactive (oxidized sugars, carbonyls) | —CHO | Hydrazine |
| | | Alkoxyamine |
| Photo-reactive, i.e., nonselective, random insertion | Random | Diazirine |
| | | Aryl azide |
| Hydroxyl (nonaqueous)-reactive | —OH | Isocyanate |
| Azide-reactive | —N3 | phosphine |

In general, any form of polymerization chemistry/methods commonly known by those skilled in the art, can be employed to form polymers. Polymerization can be catalyzed by ultraviolet light-induced radical formation and reaction progression. A hydrogel bead of the disclosure may be produced by the polymerization of acrylamide or the polymerization of acrylate. For example, the acrylamide in one embodiment is a polymerizable carbohydrate derivatized acrylamide as described in U.S. Pat. No. 6,107,365, the disclosure of which is incorporated by reference in its entirety for all purposes. As described therein and known to those of ordinary skill in the art, specific attachment of acrylamide groups to sugars is readily adapted to a range of monosaccharides and higher order polysaccharides, e.g., synthetic polysaccharides or polysaccharides derived from natural sources, such as glycoproteins found in serum or tissues.

In some embodiments, an acrylate-functionalized poly (ethylene) glycol monomer is used as a hydrogel monomer. For example, the PEG in one embodiment is an acrylate or acrylamide functionalized PEG.

In some embodiments, a hydrogel bead comprises a monofunctional monomer polymerized with at least one bifunctional monomer. One example includes, but is not limited to, the formation of poly-acrylamide polymers using acrylamide and bis-acrylamide (a bifunctional monomer). In another embodiment, a hydrogel bead provided herein comprises a bifunctional monomer polymerized with a second bifunctional monomer. One example includes, but is not limited to, the formation of polymers with mixed composition comprising compatible chemistries such as acrylamide, bis-acrylamide, and bis-acrylamide structural congeners comprising a wide range of additional chemistries. The range of chemically compatible monomers, bifunctional monomers, and mixed compositions is obvious to those skilled in the art and follows chemical reactivity principles know to those skilled in the art. (reference Thermo handbook and acrylamide polymerization handbook). See, for example, the Thermo Scientific Crosslinking Technical Handbook entitled "Easy molecular bonding crosslinking technology," (available at tools.lifetechnologies.com/content/sfs/brochures/1602163-Crosslinking-Reagents-Handbook.pdf) and the Polyacrylamide Emulsions Handbook (SNF Floerger, available at snf.com.au/downloads/Emulsion_Handbook_E.pdf), the disclosure of each of which is incorporated by reference in its entirety for all purposes.

In some embodiments, a hydrogel bead provided herein comprises a polymerizable monofunctional monomer and is a monofunctional acrylic monomer. Non-limiting examples of monofunctional acrylic monomers for use herein are acrylamide; methacrylamide; N-alkylacrylamides such as N-ethylacrylamide, N-isopropylacrylamide or N-tertbutylacrylamide; N-alkylmethacrylamides such as N-ethylmethacrylamide or Nisopropylmethacrylamide; N,N-dialkylacrylamides such as N,N-dimethylacrylamide and N,N-diethylacrylamide; N-[(dialkylamino)alkyl]acrylamides such as N-[3dimethylamino) propyl]acrylamide or N-[3-(diethylamino)propyl]acrylamide; N-[(dialkylamino) alkyl]methacrylamides such as N-[3-dimethylamino)propyl]methacrylamide or N-[3-(diethylamino) propyl]methacrylamide; (dialkylamino)alkyl acrylates such as 2-(dimethylamino) ethyl acrylate, 2-(dimethylamino)propyl acrylate, or 2-(diethylamino)ethyl acrylates; and (dialkylamino) alkyl methacrylates such as 2-(dimethylamino) ethyl methacrylate.

A bifunctional monomer is any monomer that can polymerize with a monofunctional monomer of the disclosure to form a hydrogel as described herein that further contains a second functional group that can participate in a second reaction, e.g., conjugation of a fluorophore or cell surface receptor (or domain thereof).

In some embodiments, a bifunctional monomer is selected from the group consisting of: allyl amine, allyl alcohol, allyl isothiocyanate, allyl chloride, and allyl maleimide.

A bifunctional monomer can be a bifunctional acrylic monomer. Non-limiting examples of bifunctional acrylic monomers are N,N'-methylenebisacrylamide, N,N'methylene bismethacrylamide, N,N'-ethylene bisacrylamide, N,N'-ethylene bismethacrylamide, N,N'propylenebisacrylamide and N,N'-(1,2-dihydroxyethylene) bisacrylamide.

Higher-order branched chain and linear co-monomers can be substituted in the polymer mix to adjust the refractive index while maintaining polymer density, as described in U.S. Pat. No. 6,657,030, incorporated herein by reference in its entirety for all purposes.

In some embodiments, a hydrogel comprises a molecule that modulates the properties of the hydrogel. Molecules capable of altering properties of a hydrogel are discussed further below.

In some embodiments, an individual hydrogel bead or a population thereof comprises a polymerized monomer that is biodegradable. In one embodiment, the biodegradable polymerized monomer is a poly(esters) based on polylactide (PLA), polyglycolide (PGA), polycaprolactone (PCL), poly (lactic-co-glycolic) acid (PLGA) and their copolymers. In some embodiments, the biodegradable polymerized monomer is a carbohydrate or a protein, or a combination thereof. For example, in one embodiment, a monosaccharide, disaccharide or polysaccharide, (e.g., glucose, sucrose, or maltodextrin) peptide, protein (or domain thereof) is used as a hydrogel monomer. Other biodegradable polymers include poly(hydroxyalkanoate)s of the PHB-PHV class, additional poly(ester)s, and natural polymers, for example, modified poly(saccharide)s, e.g., starch, cellulose, and chitosan. In other embodiments, the biocompatible polymer is an adhesion protein, cellulose, a carbohydrate, a starch (e.g., maltodextrin, 2-hydroxyethyl starch, alginic acid), a dextran, a lignin, a polyaminoacid, an amino acid, or chitin. Such biodegradable polymers are available commercially, for example, from Sigma Aldrich (St. Louis, MO).

In some embodiments, the the biodegradable monomer is selected from the group consisting of agar, agarose, alginic acid, alguronic acid, alpha glucan, amylopectin, amylose, arabinoxylan, beta-glucan, callose, capsullan, carrageenan polysaccharide, cellodextrin, cellulin, cellulose, chitin, chitosan, chrysolaminarin, curdlan, cyclodextrin, alphacyclodextrin, dextrin, dextran, ficoll, fructan, fucoidan, galactoglucomannan, galactomannan, galactosaminoogalactan, gellan gum, glucan, glucomannan, glucorunoxylan, glycocalyx, glycogen, hemicellulose, homopolysaccharide, hypromellose, icodextrin, inulin, kefiran, laminarin, lentinan, levan polysaccharide, lichenin, mannan, mixed-linkage gluxan, paramylon, pectic acid, pectin, pentastarch, phytoglycogen, pleuran, polydextrose, polysaccharide peptide, porphyran, pullulan, schizophyllan, sinistrin, sizofiran, welan gum, xanthan gum, xylan, xyloglucan, zymosan, and a combination thereof.

In some embodiments, the population of hydrogel beads comprises agar, agarose, alginic acid, alguronic acid, alpha glucan, amylopectin, amylose, arabinoxylan, beta-glucan, callose, capsullan, carrageenan polysaccharide, cellodextrin, cellulin, cellulose, chitin, chitosan, chrysolaminarin, curdlan, cyclodextrin, alpha-cyclodextrin, dextrin, dextran, ficoll, fructan, fucoidan, galactoglucomannan, galactomannan, galactosaminoogalactan, gellan gum, glucan, glucomannan, glucorunoxylan, glycocalyx, glycogen, hemicellulose, homopolysaccharide, hypromellose, icodextrin, inulin, kefiran, laminarin, lentinan, levan polysaccharide, lichenin, mannan, mixed-linkage gluxan, paramylon, pectic acid, pectin, pentastarch, phytoglycogen, pleuran, polydextrose, polysaccharide peptide, porphyran, pullulan, schizophyllan, sinistrin, sizofiran, welan gum, xanthan gum, xylan, xyloglucan, zymosan, or a combination thereof.

The protein in some embodiments comprises only natural amino acids. However, the present disclosure is not limited thereto. For example, self-assembling artificial proteins and proteins with non-natural amino acids (e.g., those incorporated into non-ribosomal peptides or synthetically introduced via synthetic approaches, see for example, Zhang et al. (2013). Current Opinion in Structural Biology 23, pp. 581-587, the disclosure of which is incorporated by reference in its entirety for all purposes), or protein domains thereof, can also be used as hydrogel monomers. The range of non-natural (unnatural) amino acids that can be incorporated into such compositions is well known to those skilled in the art (Zhang et al. (2013). Current Opinion in Structural Biology 23, pp. 581-587; incorporated by reference in its entirety for all purposes). The biodegradable polymer in one embodiment, is used as a co-monomer, i.e., in a mixture of monomers. The biodegradable polymer in one embodiment is a bifunctional monomer.

The biomonomer, in some embodiments, is functionalized with acrylamide or acrylate. For example, in one embodiment, the polymerizable acrylamide functionalized biomolecule is an acrylamide or acrylate functionalized protein (for example, an acrylamide functionalized collagen or functionalized collagen domain), an acrylamide or acrylate functionalized peptide, or an acrylamide or acrylate functionalized monosaccharide, disaccharide or polysaccharide.

Any monosaccharide, disaccharide, or polysaccharide (functionalized or otherwise) can be used as a hydrogel monomer. In some embodiments, an acrylamide or acrylate functionalized monosaccharide, disaccharide or polysaccharide is used as a polymerizable hydrogel monomer. In some embodiments, a structural polysaccharide is used as a polymerizable hydrogel monomer. In further embodiments, the structural polysaccharide is an arabinoxylan, cellulose, chitin or a pectin. In other embodiments, alginic acid (alginate) is used as a polymerizable hydrogel monomer. In yet other embodiments, a glycosaminoglycan (GAG) is used as a polymerizable monomer in the hydrogels provided herein. In further embodiments, the GAG is chondroitin sulfate, dermatan sulfate, keratin sulfate, heparin, heparin sulfate or hyaluronic acid (also referred to in the art as hyaluron or hyaluronate) is used as a polymerizable hydrogel monomer. The additional range of compatible biomonomers and their reactive chemistries are known be individuals skilled in the art and follow general chemical reactivity principles.

An additional range of biocompatible monomers that can be incorporated are known in the art, see, for example the non-degradable biocompatible monomers disclosed in Shastri (2003). Current Pharmaceutical Biotechnology 4, pp. 331-337, incorporated by reference herein in its entirety for all purposes. Other monomers are provided in de Moraes Porto (2012). Polymer Biocompatibility, Polymerization, Dr. Ailton De Souza Gomes (Ed.), ISBN: 978-953-51-0745-3; InTech, DOI: 10.5772/47786; Heller et al. (2010). Journal of Polymer Science Part A: Polymer Chemistry 49, pp. 650-661; Final Report for Biocompatible Materials (2004), The Board of the Biocompatible Materials and the Molecular Engineering in Polymer Science programmes, ISBN 91-631-4985-0, the disclosure of each of which are hereby incorporated by reference in their entirety.

Biocompatible monomers for use with the hydrogels described herein include in one embodiment, ethyleglycol dimethacrylate (EGDMA), 2-hydroxyethyl methacrylate (HEMA), methylmethacrylte (MMA), methacryloxymethyltrimethylsilane (TMS-MA), N-vinyl-2-pyrrolidon (N-VP), styrene, or a combination thereof.

Naturally occurring hydrogels useful in the present disclosure includes various polysaccharides available from natural sources such as plants, algae, fungi, yeasts, marine invertebrates and arthropods. Non-limiting examples include agarose, dextrans, chitin, cellulose-based compounds, starch, derivatized starch, and the like. These generally will have repeating glucose units as a major portion of the polysaccharide backbone. Cross-linking chemistries for such polysaccharides are known in the art, see for example Thermo Scientific Crosslinking Technical Handbook entitled "Easy molecular bonding crosslinking technology," (available at tools.lifetechnologies.com/content/sfs/brochures/1602163-Crosslinking-Reagents-Handbook.pdf).

Hyaluronan in one embodiment is used as a hydrogel monomer (either as a single monomer or as a co-monomer). Hyaluronan in one embodiment, is functionalized, for example with acrylate or acrylamide. Hyaluronan is a high molecular weight GAG composed of disaccharide repeating units of N-acetylglucosamine and glucuronic acid linked together through alternating β-1,4 and β-1,3 glycosidic bonds. In the human body, hyaluronate is found in several soft connective tissues, including skin, umbilical cord, synovial fluid, and vitreous humor. Accordingly, in one embodiment, where one or more properties of a target cell is desired to be mimicked, in one embodiment, hyaluronan is used as a hydrogel monomer. Methods for fabricating hydrogel beads are described in Xu et al. (2012). Soft Matter. 8, pp. 3280-3294, the disclosure of which is incorporated herein in its entirety for all purposes. As described therein, hyaluronan can be derivatized with various reactive handles depending on the desired cross-linking chemistry and other monomers used to form a hydrogel bead.

In yet other embodiments, chitosan, a linear polysaccharide composed of randomly distributed β-(1-4)-linked D-glucosamine (deacetylated unit) and N-acetyl-D-glucosamine (acetylated unit), is used as a hydrogel monomer (either as a single monomer or as a co-monomer).

In some embodiments, an individual hydrogel bead or a plurality thereof comprises a peptide, protein, a protein domain, or a combination thereof as a hydrogel monomer or plurality thereof. In further embodiments, the protein is a structural protein, or a domain thereof, for example, such as silk, elastin, titin or collagen, or a domain thereof. In some embodiments, the protein is an extracellular matrix (ECM) component (e.g., collagen, elastin, proteoglycan, fibrin, lysine, fibronectin). In even further embodiments, the structural protein is collagen. In yet further embodiments, the collagen is collagen type I, collagen type II or collagen type III or a combination thereof. In other embodiments, the hydrogel monomer comprises a proteoglycan. In further embodiments, the proteoglycan is decorin, biglycan, testican, bikunin, fibromodulin, lumican, or a domain thereof.

In other embodiments, an acrylate-functionalized structural protein hydrogel monomer is used as a component of the hydrogel provided herein (e.g., an acrylate functionalized protein or protein domain, for example, silk, elastin, titin, collagen, proteoglycan, or a functionalized domain thereof). In further embodiments, the acrylate functionalized structural protein hydrogel monomer comprises a proteoglycan, e.g., decorin, biglycan, testican, bikunin, fibromodulin, lumican, or a domain thereof.

In some embodiments PEG monomers and oligopeptides can be that mimic extracellular matrix proteins are used in the hydrogels provided herein, for example, with vinyl sulfone-functionalized multiarm PEG, integrin binding peptides and bis-cysteine matrix metalloproteinase peptides as described by Lutolf et al. (2003). *Proc. Natl. Acad. Sci. U.S.A.* 100, 5413-5418, incorporated by reference in its entirety for all purposes. In this particular embodiment, hydrogels are formed by a Michael-type addition reaction between the di-thiolated oligopeptides and vinyl sulfone groups on the PEG. The range of additional compatible chemistries that can be incorporated here are obvious to those skilled in the art and follow general chemical reactivity principles, see for example Thermo Scientific Crosslinking Technical Handbook entitled "Easy molecular bonding crosslinking technology," (available at tools.lifetechnologies.com/content/sfs/brochures/1602163-Crosslinking-Reagents-Handbook.pdf).

Other bioactive domains in natural proteins can also be used as a hydrogel monomer or portion thereof. For example, a cell-adhesive integrin binding domain, a controlled release affinity binding domain or a transglutaminase cross-linking domain can be used in the hydrogels provided herein. Details for producing such hydrogels can be found in Martino et al. (2009). *Biomaterials* 30, 1089; Martino et al. (2011). *Sci. Trans. Med.* 3, 100ra89; Hu and Messersmith (2003). *J. Am. Chem. Soc.* 125, 14298, each of which is incorporated by reference in its entirety for all purposes.

In some embodiments, recombinant DNA methods are used to create proteins, designed to gel in response to changes in pH or temperature, for example, by the methods described by Petk et al. (1998). *Science* 281, pp. 389-392, incorporated by reference in its entirety for all purposes. Briefly, the proteins consist of terminal leucine zipper domains flanking a water-soluble polyelectrolyte segment. In near-neutral aqueous solutions, coiled-coil aggregates of the terminal domains form a three-dimensional hydrogel polymer network.

Common cross linking agents that can be used to crosslink the hydrogels provided herein include but are not limited to ethylene glycol dimethacrylate (EGDMA), tetraethylene glycol dimethacrylate, and N,N'-15 methylenebisacrylamide. The range of additional crosslinking chemistries which can be used are obvious to those skilled in the art and follow general chemical reactivity principles, see for example Thermo Scientific Crosslinking Technical Handbook entitled "Easy molecular bonding crosslinking technology," (available at tools.lifetechnologies.com/content/sfs/brochures/1602163-Crosslinking-Reagents-Handbook.pdf).

In some embodiments, polymerization of a hydrogel is initiated by a persulfate or an equivalent initiator that catalyzes radical formation. The range of compatible initiators are known to those skilled in the art and follow general chemical reactivity principles, see for example Thermo Scientific Crosslinking Technical Handbook entitled "Easy molecular bonding crosslinking technology," (available at tools.lifetechnologies.com/content/sfs/brochures/1602163-Crosslinking-Reagents-Handbook.pdf). The persulfate can be any water-soluble persulfate. Non-limiting examples of water soluble persulfates are ammonium persulfate and alkali metal persulfates. Alkali metals include lithium, sodium and potassium. In some embodiments, the persulfate is ammonium persulfate or potassium persulfate. In further embodiments, polymerization of the hydrogel provided herein is initiated by ammonium persulfate.

Polymerization of a hydrogel can be accelerated by an accelerant which can catalyze the formation of polymerization-labile chemical side groups. The range of possible accelerants is known to those skilled in the art and follow general chemical reactivity principles see for example Thermo Scientific Crosslinking Technical Handbook entitled "Easy molecular bonding crosslinking technology," (available at tools.lifetechnologies.com/content/sfs/brochures/1602163-Crosslinking-Reagents-Handbook.pdf). The accelerant in one embodiment, is a tertiary amine. The tertiary amine can be any water-soluble tertiary amine. In one embodiment, an accelerant is used in the polymerization reaction and is N,N,N',N'tetramethylethylenediamine, 3-dimethylamino) propionitrile, or N,N,N',N'tetramethylethylenediamine (TEMED). In another embodiment, an accelerant is used in the polymerization reaction and isazobis (isobutyronitrile) (AIBN).

As discussed above, the hydrogel for use in the compositions and methods described herein can include any of the monomeric units and crosslinkers as described herein, and in one aspect, are produced as hydrogel beads by polymerizing droplets. Microfluidic methods of producing a plurality of droplets, including fluidic and rigidified droplets, are known to those of ordinary skill in the art, and described in US Patent Publication No. 2011/0218123 and U.S. Pat. No. 7,294,503, each incorporated herein by reference in their entireties for all purposes. Such methods provide for a plurality of droplets comprising a first fluid and being substantially surrounded by a second fluid, where the first fluid and the second fluid are substantially immiscible (e.g., droplets comprising an aqueous-based liquid being substantially surrounded by an oil based liquid).

A plurality of fluidic droplets (e.g., prepared using a microfluidic device) may be polydisperse (e.g., having a range of different sizes), or in some cases, the fluidic droplets may be monodisperse or substantially monodisperse, e.g., having a homogenous distribution of diameters, for instance, such that no more than about 10%, about 5%, about 3%, about 1%, about 0.03%, or about 0.01% of the droplets have an average diameter greater than about 10%, about 5%, about 3%, about 1%, about 0.03%, or about 0.01% of the average diameter. The average diameter of a population of droplets, as used herein, refers to the arithmetic average of the diameters of the droplets. Average diameters of the beads can be measured, for example, by light scattering techniques. Average diameters of hydrogel beads in one embodiment, are tailored, for example by varying flow rates of the fluid streams of the first and second fluids within the channel(s) of a microfluidic device, or by varying the volume of the channel(s) of the microfluidic device.

In some embodiments, the average diameter of the hydrogel beads is between about 0.1 µm and about 100 µm, about 0.5 µm and about 60 µm, or about 1 µm and about 40 µm. In embodiments, the average diameter of the hydrogel bead is about 1-2 µm, about 2-3 µm, about 3-5 µm, about 5-8 µm, about 8-12 µm, about 12-20 µm, or about 20-40 µm. In embodiments, the average diameter of the hydrogel bead is about 1-4 µm, about 2-8 µm, about 3-12 µm, about 4-16 m, about 5-20 µm, or about 10-40 µm, including all ranges and subranges therebetween. In some embodiments, the average diameter of the hydrogel beads is about the same as the diameter of a CD34+ human stem cell. In some embodiments, the average diameter of the hydrogel beads is about the same as the diameter of a CD34+ and CD45 diminished human cell.

Hydrogel particles in some embodiments, is carried by suspension polymerization, which is also referred to in the art as pearl, bead or granular polymerization (see Elbert (2011). *Acta Biomater.* 7, pp. 31-56, incorporated by reference herein in its entirety for all purposes). In suspension polymerization, the monomer is insoluble in the continuous phase, for example an aqueous monomer solution in a continuous oil phase. In suspension polymerization, polymerization initiation occurs within the monomer-rich droplets and with greater than one radical per droplet at any time. The monomer phase in one embodiment includes a monomer which can be a bifunctional monomer or a plurality of monomer species (co-monomers, which can be a plurality of bifunctional monomers. The monomer phase in one embodiment, includes an initiator and/or a crosslinking agent.

Emulsion polymerization can also be used to form the hydrogel particles described herein. In emulsion polymerization, the monomer has poor solubility in the continuous phase, similar to suspension polymerization, however, polymerization initiation occurs outside the monomer droplets (see Elbert (2011). *Acta Biomater.* 7, pp. 31-56, incorporated by reference herein in its entirety for all purposes). In emulsion polymerization embodiments, the initiator causes chain growth of the monomer (or co-monomers) dissolved in the continuous phase or monomer contained in micelles if surfactants are present.

In other embodiments, hydrogel particles are formed by precipitation polymerization, for example as described in Elbert (2011). *Acta Biomater.* 7, pp. 31-56, incorporated by reference herein in its entirety for all purposes. Precipitation polymerization is a technique that takes advantage of the differences in the solubility of monomer and polymer to produce microparticles. Specifically, it is known that larger polymer chains generally have lower solubility than smaller ones. Accordingly, above a specific molecular weight, phase separation may be favored. Precipitation polymerization initially begins as solution polymerizations in a single phase, homogenous system. Shortly after the start of the polymerization, in one embodiment, a relatively high concentration of polymer chains is present, favoring phase separation by nucleation. As polymerization proceeds, the concentration of polymer chains is low and existing particles capture the chains before nucleation of new particles can occur. Thus, nucleation of particles occurs only for a brief period of time shortly after the start of the reaction, which in one embodiment, results in a narrow size distribution of particles. Additional methods include but are not limited to lithographic particle formation (Helgeson et al. (2011). *Curr. Opin. Colloid. Interface Sci.* 16, pp. 106-117, incorporated by reference herein in its entirety for all purposes) membrane emulsification (e.g., by the microsieve emulsification technology techniques described by Nanomi B.V. (Netherlands)) and microchannel emulsification (Sugiura et al. (2002). *Languimir* 18, pp. 5708-5712, incorporated by reference herein in its entirety) and bulk emulsification (SNF Floerger, available at snf.com.au/downloads/Emulsion-_Handbook_E.pdf, incorporated by reference herein in its entirety).

In some embodiments, hydrogel particles are formed within a microfluidic device having two oil channels that focus on a central stream of aqueous monomer solution. In this embodiment, droplets form at the interface of the two channels and central stream to break off droplets in water-in-oil emulsion. Once droplets are formed, in one embodiment, they are stabilized prior to polymerization, for example, by adding a surfactant to the oil phase. However, in another embodiment, droplets are not stabilized prior to polymerization. Polymerization of the monomer in one embodiment is triggered by adding an accelerator (e.g., N,N,N',N'tetramethylethylenediamine) to one or both of the oil channels after initial droplets are formed.

Hydrogel Beads as Cell Mimics

The three primary modes of deconvolution for flow cytometry are the two passive optical properties of a particle (forward scattering, FSC, corresponding to the refractive index, or RI; and side scattering, SSC) and biomarkers present on the surface of a given cell type. Therefore, compositions that allow hydrogel particles of the disclosure to mimic specific cell types (e.g., CD34-expressing cells) with respect to these three modes are useful for providing synthetic, robust calibrants for flow cytometry.

In one embodiment, the refractive index (RI) of a disclosed hydrogel particle is greater than about 1.10, greater than about 1.15, greater than about 1.20, greater than about 1.25, greater than about 1.30, greater than about 1.35, greater than about 1.40, greater than about 1.45, greater than about 1.50, greater than about 1.55, greater than about 1.60, greater than about 1.65, greater than about 1.70, greater than about 1.75, greater than about 1.80, greater than about 1.85, greater than about 1.90, greater than about 1.95, greater than about 2.00, greater than about 2.10, greater than about 2.20, greater than about 2.30, greater than about 2.40, greater than about 2.50, greater than about 2.60, greater than about 2.70, greater than about 2.80, or greater than about 2.90.

In another embodiment, the refractive index (RI) of a disclosed hydrogel particle is about 1.10 to about 3.0, or about 1.15 to about 3.0, or about 1.20 to about 3.0, or about 1.25 to about 3.0, or about 1.30 to about 3.0, or about 1.35 to about 3.0, or about 1.4 to about 3.0, or about 1.45 to about 3.0, or about 1.50 to about 3.0, or about 1.6 to about 3.0, or about 1.7 to about 3.0, or about 1.8 to about 3.0, or about 1.9 to about 3.0, or about 2.0 to about 3.0.

In some embodiments, the refractive index (RI) of a disclosed hydrogel particle is less than about 1.10, less than about 1.15, less than about 1.20, less than about 1.25, less than about 1.30, less than about 1.35, less than about 1.40, less than about 1.45, less than about 1.50, less than about 1.55, less than about 1.60, less than about 1.65, less than about 1.70, less than about 1.75, less than about 1.80, less than about 1.85, less than about 1.90, less than about 1.95, less than about 2.00, less than about 2.10, less than about 2.20, less than about 2.30, less than about 2.40, less than about 2.50, less than about 2.60, less than about 2.70, less than about 2.80, or less than about 2.90. The prior paragraphs provide various minimums and maximums for refractive index. This portion of the disclosure is intended to be combinable, such that the disclosure provides ranges with both maximums and minimums. For example, in some embodiments the disclosed hydrogel particles exhibit a refractive index from about 1.10 to about 3.0.

The SSC of a disclosed hydrogel particle is most meaningfully measured in comparison to that of target cell (e.g., a CD34-expressing cell). In some embodiments, a disclosed hydrogel particle has an SSC within 30%, within 25%, within 20%, within 15%, within 10%, within 5%, or within 1% that of a target cell (e.g., a CD34-expressing cell), as measured by a cytometric device.

The SSC of a hydrogel particle in one embodiment, is modulated by incorporating a high-refractive index molecule (or plurality thereof) in the hydrogel. In one embodiment, a high-refractive index molecule is provided in a hydrogel particle, and in a further embodiment, the high-refractive index molecule is colloidal silica, alkyl acrylate, alkyl methacrylate or a combination thereof. Thus in some embodiments, a hydrogel particle of the disclosure comprises alkyl acrylate and/or alkyl methacrylate. Concentration of monomer in one embodiment is adjusted to further adjust the refractive index of the hydrogel particle.

Alkyl acrylates or Alkyl methacrylates can contain 1 to 18, 1 to 8, or 2 to 8, carbon atoms in the alkyl group, such as methyl, ethyl, n-propyl, isopropyl, n-butyl, isobutyl or tertbutyl, 2-ethylhexyl, heptyl or octyl groups. The alkyl group may be branched or linear.

High-refractive index molecules can also include vinylarenes such as styrene and methylstyrene, optionally substituted on the aromatic ring with an alkyl group, such as methyl, ethyl or tert-butyl, or with a halogen, such as chlorostyrene.

In some embodiments, FSC is modulated by adjusting the percentage of monomer present in the composition thereby altering the water content present during hydrogel formation. In one embodiment, where a monomer and co-monomer are employed, the ratio of monomer and co-monomer is adjusted to change the hydrogel particle's forward scatter properties.

The FSC of a disclosed hydrogel particle is most meaningfully measured in comparison to that of target cell (e.g., CD34-expressing cell). In some embodiments, a disclosed hydrogel particle has an FSC within 30%, within 25%, within 20%, within 15%, within 10%, within 5%, or within 1% that of a target cell (e.g., a CD34-expressing cell), as measured by a cytometric device.

FSC is related to particle volume, and thus can be modulated by altering particle diameter, as described herein. Generally, it has been observed that large objects refract more light than smaller objects leading to high forward scatter signals (and vice versa). Accordingly, particle diameter in one embodiment is altered to modulate FSC properties of a hydrogel particle. For example, hydrogel particle diameter is increased in one embodiment is altered by harnessing larger microfluidic channels during particle formation.

SSC can be engineered by encapsulating nanoparticles within hydrogels to mimic organelles in a target cell (e.g., CD34-expressing cell). In some embodiments, a hydrogel particle of the disclosure comprises one or more types of nanoparticles selected from the group consisting of: polymethyl methacrylate (PMMA) nanoparticles, polystyrene (PS) nanoparticles, and silica nanoparticles. Without wishing to be bound by theory, the ability to selectively tune both forward and side scatter of a hydrogel, as described herein, allows for a robust platform to mimic a vast array of cell types (e.g., CD34-expressing cells).

Although the invention is mainly described with respect to the modification of optical properties, the invention is not limited thereto. For example, hydrogel particles can be fabricated and adjusted to tune the capacitance of the particles, e.g., to calibrate coulter counters. In one embodiment, a hydrogel particle's capacitance is adjusted by altering the amount of hydrogel monomer in the composition. For example, polyanaline, polyacetylene; polyphenylene vinylene; polypyrrole (X=NH) and polythiophene (X=S) co-monomers; and polyaniline (X=NH/N) and polyphenylene sulfide (X=S) co-monomer concentrations can all be adjusted to alter capacitance. In one embodiment, the concentration of one or more of these monomers is increased to increase the capacitance of the hydrogel particle.

In some embodiments, a hydrogel particle of the disclosure has material modulus properties (e.g., elasticity) more closely resembling that of a target cell (e.g., CD34-expressing cell) as compared to a polystyrene bead of the same diameter.

In some embodiments, the hydrogel beads of the disclosure comprise an artificial optical-scatter property that is substantially similar to a corresponding optical-scatter property of a target cell (e.g., CD34-expressing cell) optical scatter property, said artificial optical scatter property provided by: a co-monomer, a chemical side-group, an encapsulated material, a colloidal silica, or a ratio of acrylamide to bis-acrylamide.

In some embodiments, the hydrogel beads of the disclosure comprise a scatter-modulating additive. In some embodiments, the optical-scatter property that is substantially similar to the corresponding optical-scatter property of the target cell (e.g., CD34-expressing cell) is side scatter (SSC). In some embodiments, the optical-scatter property that is substantially similar to the corresponding optical-scatter property of the target cell (e.g., CD34-expressing cell) is forward scatter (FSC).

In some embodiments, the scatter-modulating additive comprises a co-monomer. In some embodiments, the scatter-modulating additive comprises a suspension of nanoparticles.

A target cell can be virtually any type of cell, including prokaryotic and eukaryotic cells. Suitable prokaryotic target cells include, but are not limited to, bacteria such as *E. coli*, various *Bacillus* species, and the extremophile bacteria such as thermophiles.

Suitable eukaryotic target cells include, but are not limited to, fungi such as yeast and filamentous fungi, including species of *Saccharomyces, Aspergillus, Trichoderma*, and *Neurospora*; plant cells including those of corn, sorghum, tobacco, canola, soybean, cotton, tomato, potato, alfalfa, sunflower, etc.; and animal cells, including fish, birds and mammals. Suitable fish cells include, but are not limited to, those from species of salmon, trout, tilapia, tuna, carp, flounder, halibut, swordfish, cod and zebrafish. Suitable bird cells include, but are not limited to, those of chickens, ducks, quail, pheasants and turkeys, and other jungle fowl or game birds. Suitable mammalian cells include, but are not limited to, cells from horses, cows, buffalo, deer, sheep, rabbits, rodents such as mice, rats, hamsters and guinea pigs, goats, pigs, primates, marine mammals including dolphins and whales, as well as cell lines, such as human cell lines of any tissue or stem cell type, and stem cells, including pluripotent and non-pluripotent, and non-human zygotes. In some embodiments, the target cell is a human cell.

In some embodiments, the target cell is a hematopoietic stem cell. In some embodiments, the target cell is a CD34-expressing cell (e.g., a CD34-expressing stem cell). In some embodiments, the CD34-expressing cell is obtained from a donor (e.g., a human donor). In some embodiments, the CD34-expressing cell is present in blood obtained from a donor (e.g., a human donor). In some embodiments, the CD34-expressing cell is present in blood obtained from a donor (e.g., a human donor) administered a stem cell mobilizer.

In some embodiments, the CD34-expressing cell is engineered to express CD34.

In some embodiments, a target cell is a primary cell, cultured cell, established cell, normal cell, transformed cell, infected cell, stably transfected cell, transiently transfected cell, proliferating cell, or terminally differentiated cells.

In some embodiments, a target cell is an immune cell. Non-limiting examples of immune cells include B lymphocytes, also called B cells, T lymphocytes, also called T cells, natural killer (NK) cells, lymphokine-activated killer (LAK) cells, monocytes, macrophages, neutrophils, granulocytes, mast cells, platelets, Langerhans cells, stem cells, dendritic cells, peripheral blood mononuclear cells, tumor infiltrating (TIL) cells, gene modified immune cells including hybridomas, drug modified immune cells, and derivatives, precursors, or progenitors of any of the cell types listed herein. In some embodiments, the immune cells are plasma cells, lymphocytes, immune cells, biomolecule presenting cells (e.g., dendritic cells, macrophages, B cells), naïve B cells, memory B cells, naïve T cells, memory T cells, chimeric antigen receptor T cell (CAR-T cell), regulatory T cells, cytotoxic T cells, NK cells, or any other appropriate cell.

In some embodiments, the target cell is freshly collected from a subject. In some embodiments, the target cell is a cultured cell line. In some embodiments, the target cell is an established cell line. In some embodiments, the target cell is cultured from a preserved or frozen sample.

In some embodiments, the target cell is a stem cell. In some embodiments, the stem cell is a pluripotent stem cell, a totipotent stem cell, a multipotent stem cell, an oligopotent, or a unipotent stem cell. In some embodiments, the pluripotent stem cell is an embryonic stem cell. In some embodiments, the stem cell is an undifferentiated pluripotent stem cell. In some embodiments, the totipotent stem cell is, without limitation, an embryonic stem cell, a neural stem cell, a bone marrow stem cell, a hematopoietic stem cell, a cardiomyocyte, a neuron, an astrocyte, a muscle cell, or a connective tissue cell. In some embodiments, the multipotent stem cell is, without limitation, a myeloid progenitor cell, or a lymphoid progenitor cell. In some embodiments, the stem cell is an induced pluripotent stem cell (iSPC). In some embodiments, the stem cell is an adult stem cell. In some embodiments, the stem cell is an undifferentiated pluripotent stem cell. In some embodiments, the stem cell is a mammalian stem cell. In some embodiments, the stem cell is a primate stem cell. In some embodiments, the stem cell is a human stem cell.

In some embodiments, the stem cells are derived from any source within an animal. For example, stem cells may be harvested from embryos, or any primordial germ layer therein, from placental or chorion tissue, or from more mature tissue such as adult stem cells including, but not limited to, adipose, bone marrow, nervous tissue, mammary tissue, liver tissue, pancreas, epithelial, respiratory, gonadal, and muscle tissue. In some embodiments, the stem cells are placental- or chorionic-derived stem cells.

In some embodiments, the target cell is a blood cell. In some embodiments, the target cell is a peripheral blood mononuclear cell (PMBC). In some embodiments, the peripheral blood mononuclear cell is a lymphocyte, a monocyte, or a dendritic cell. In some embodiments, the lymphocyte is a T-cell, B-cell, or NK cell. In some embodiments, the target cell is a natural killer (NK) cell.

In some embodiments, a target cell is a lymphocyte cell. In some embodiments, the target cell is T cell, a NK cell, or a B cell.

In some embodiments, the target cell is selected from the exemplary target cells listed in Table 2 of the disclosure.

Biomolecules Bound to Hydrogel Beads

After the hydrogel particle is formed, one or more of the particle's surfaces can be functionalized, for example, to mimic one or more properties of a target cell. The hydrogel beads can also comprise biomolecules, such as an antigen.

In some embodiments, the hydrogel bead comprises a specific number of copies of a biomolecule, such as a cell surface marker, e.g., a cell surface receptor, or a domain thereof, for example, an epitope binding region thereof. For example, individual subpopulations of hydrogel particles can each be derivatized to have a unique number of copies, e.g., one subpopulation will contain 100 copies of a cell surface marker, a second subpopulation will contain 1,000 copies of the same cell surface marker, a third subpopulation will contain 10,000 copies of the same cell surface marker, etc. The populations of hydrogel particles are fluorescently stained for the respective cell surface marker and fluorescence is detected for hydrogel particles in each subpopulation. In this regard, the subpopulations of hydrogel particles can be used to generate a standard curve of fluorescence emission for target cells with the respective cell marker. The cell surface marker can be any of the cell surface markers provided thereof, or binding regions thereof, or a cell surface marker known to one of ordinary skill in the art.

Hydrogel particles of the disclosure behave similarly to target cells in procedures such as staining and analysis by flow cytometry or FACS. For example, in one embodiment, a hydrogel particle has one or more optical properties substantially similar to any one of the cell types described herein.

Hydrogel particles, in one embodiment, are functionalized with one or more cell surface markers, or fragments thereof, for example, extracellular portions thereof in the case of transmembrane proteins, for example, by attaching the one or more cell surface markers, extracellular portions or ligand binding regions thereof to the particle via a free amine, free carboxyl and/or free hydroxyl group present on the surface of the hydrogel particle. Functionalization of a hydrogel particle with a dye or cell surface molecule can also occur through a linker, for example a streptavidin/biotin conjugate.

Depending on the target cell, individual hydrogel particles can be derivatized with one or more cell surface markers, or fragments thereof, for example, extracellular portions thereof in the case of transmembrane proteins to further mimic the structural properties of the target cell. The Tables below provide a non-limiting list of cell surface markers that can be used to derivative hydrogel particles, depending on the target cell. Although the cell surface marker is provided, it is understood that a portion of the cell surface marker, for example, a receptor binding portion, a ligand binding portion, or an extracellular portion of the marker can be used to derivative the hydrogel particle (at the free functional group, as described above).

In some embodiments, the disclosure provides a hydrogel bead functionalized with CD34 or a portion thereof (e.g., a CD34 extracellular domain). In some embodiments, the disclosure provides a hydrogel bead functionalized with CD45 or portion thereof (e.g., a CD45 extracellular domain). In some embodiments, the disclosure provides a hydrogel bead functionalized with CD34 or a portion thereof (e.g., a CD34 extracellular domain) and CD45 or portion thereof (e.g., a CD45 extracellular domain).

In some embodiments, the disclosure provides a first population of hydrogel beads comprising a cell surface biomarker profile comprising both CD34 and CD45 extracellular domains. In some embodiments, the hydrogel beads comprise a polymerized monomer and a bifunctional monomer. In some embodiments, the present disclosure provides hydrogel beads with various predetermined levels of CD34 and CD45 biomarkers, which can be used as controls for a variety of assays (e.g., flow cytometry). In such embodiments, populations of hydrogels are designed to mimic corresponding animal cell populations. Thus, in some embodiments, the populations of hydrogel beads are configured with appropriate CD34 and/or CD45 biomarkers (or extra cellular domains thereof) that approximate the concentration of those biomarkers in various animal cell populations.

In some embodiments, each of the hydrogel beads in the first population comprises between about 10% and about 400% of the amount of the CD34 extracellular domain present on the cell surface of a target cell. In some embodiments, each of the hydrogel beads in the first population comprises between about 10% and about 400% of the amount of the CD45 extracellular domain present on the cell surface of a target cell. In some embodiments, each of the hydrogel beads in the first population comprises between about 10% and about 50%, about 10% and about 70%, about 10% and about 100%, about 10% and about 120%, about 10% and about 150%, about 10% and about 200%, about 10% and about 250%, about 10% and about 300%, about 10% and about 400%, about 20% and about 50%, about 20% and about 70%, about 20% and about 100%, about 20% and about 120%, about 20% and about 150%, about 20% and about 200%, about 20% and about 250%, about 20% and about 300%, about 20% and about 400%, about 30% and about 50%, about 30% and about 70%, about 30% and about 100%, about 30% and about 120%, about 30% and about 150%, about 30% and about 200%, about 30% and about 250%, about 30% and about 300%, about 30% and about 400%, about 40% and about 50%, about 40% and about 70%, about 40% and about 100%, about 40% and about 120%, about 40% and about 150%, about 40% and about 200%, about 40% and about 250%, about 40% and about 300%, about 40% and about 400%, about 50% and about 70%, about 50% and about 100%, about 50% and about 120%, about 50% and about 150%, about 50% and about 200%, about 50% and about 250%, about 50% and about 300%, about 50% and about 400%, about 60% and about 70%, about 60% and about 100%, about 60% and about 120%, about 60% and about 150%, about 60% and about 200%, about 60% and about 250%, about 60% and about 300%, about 60% and about 400%, about 70% and about 100%, about 70% and about 120%, about 70% and about 150%, about 70% and about 200%, about 70% and about 250%, about 70% and about 300%, about 70% and about 400%, about 80% and about 100%, about 80% and about 120%, about 80% and about 150%, about 80% and about 200%, about 80% and about 250%, about 80% and about 300%, about 80% and about 400%, about 90% and about 100%, about 90% and about 120%, about 90% and about 150%, about 90% and about 200%, about 90% and about 250%, about 90% and about 300%, about 90% and about 400%, about 100% and about 120%, about 100% and about 150%, about 100% and about 200%, about 100% and about 250%, about 100% and about 300%, about 100% and about 400%, about 120% and about 150%, about 120% and about 200%, about 120% and about 250%, about 120% and about 300%, about 120% and about 400%, about 150% and about 200%, about 150% and about 250%, about 150% and about 300%, or about 150% and about 400%, of the amount of CD34 and/or CD45 extracellular domains present on the cell surface of a target cell, including all ranges and subranges therebetween.

In some embodiments, the disclosure provides a second population of hydrogel beads each comprising a cell surface biomarker profile comprising a CD45 extracellular domain but a lower level of CD34 extracellular domain compared to the first population of hydrogel beads. In some embodiments, each of the hydrogel beads in the second population comprises no more than 10% of the median number of CD34 extracellular domain comprised in the first population of hydrogel beads. In some embodiments, each of the hydrogel beads in the second population comprises no more than 0.1%, no more than 0.2%, no more than 0.3%, no more than 0.5%, no more than 0.7%, no more than 1%, no more than 2%, no more than 3%, no more than 5%, or no more than 7%, of the median number of CD34 extracellular domain comprised in the first population of hydrogel beads. In some embodiments, the cell surface biomarker profile of each of the hydrogel beads in the second population lacks a CD34 extracellular domain. In some embodiments, the hydrogel beads comprise a polymerized monomer and a bifunctional monomer.

In some embodiments, each of the hydrogel beads in the second population comprises between about 10% and about 400% of the amount of the CD45 extracellular domain present on the cell surface of a target cell. In some embodiments, each of the hydrogel beads in the second population comprises between about 10% and about 50%, about 10% and about 70%, about 10% and about 100%, about 10% and about 120%, about 10% and about 150%, about 10% and about 200%, about 10% and about 250%, about 10% and about 300%, about 10% and about 400%, about 20% and about 50%, about 20% and about 70%, about 20% and about 100%, about 20% and about 120%, about 20% and about 150%, about 20% and about 200%, about 20% and about 250%, about 20% and about 300%, about 20% and about 400%, about 30% and about 50%, about 30% and about 70%, about 30% and about 100%, about 30% and about 120%, about 30% and about 150%, about 30% and about 200%, about 30% and about 250%, about 30% and about 300%, about 30% and about 400%, about 40% and about 50%, about 40% and about 70%, about 40% and about 100%, about 40% and about 120%, about 40% and about 150%, about 40% and about 200%, about 40% and about 250%, about 40% and about 300%, about 40% and about 400%, about 50% and about 70%, about 50% and about 100%, about 50% and about 120%, about 50% and about 150%, about 50% and about 200%, about 50% and about 250%, about 50% and about 300%, about 50% and about 400%, about 60% and about 70%, about 60% and about 100%, about 60% and about 120%, about 60% and about 150%, about 60% and about 200%, about 60% and about 250%, about 60% and about 300%, about 60% and about 400%, about 70% and about 100%, about 70% and about 120%, about 70% and about 150%, about 70% and about 200%, about 70% and about 250%, about 70% and about 300%, about 70% and about 400%, about 80% and about 100%, about 80% and about 120%, about 80% and about 150%, about 80% and about 200%, about 80% and about 250%, about 80% and about 300%, about 80% and about 400%, about 90% and about 100%, about 90% and about 120%, about 90% and about 150%, about 90% and about 200%, about 90% and about 250%, about 90% and about 300%, about 90% and about 400%, about 100% and about 120%, about 100% and about 150%, about 100% and about 200%, about 100% and about 250%, about 100% and about 300%, about 100% and about 400%, about 120% and about 150%, about 120% and about 200%, about 120% and about 250%, about 120% and about 300%, about 120% and about 400%, about 150% and about 200%, about 150% and about 250%, about 150% and about 300%, or about 150% and about 400%, of the amount of the CD45 extracellular domain present on the cell surface of a target cell, including all ranges and subranges therebetween.

In some embodiments, the amount of the CD34 extracellular domain in each of the hydrogel beads in the second population is lower than the amount of the CD34 extracellular domain in each of the hydrogel beads in the first population. In some embodiments, each of the hydrogel beads in the second population comprises no more than 10% of the amount of the CD34 extracellular domain present on the cell surface of a target cell. In some embodiments, each of the hydrogel beads in the second population comprises no more than 50%, no more than 40%, no more than 30%, no more than 20%, or no more than 10%, of the amount of the CD34 extracellular domain present on the cell surface of a target cell. In some embodiments, each of the hydrogel beads in the second population comprises no more than 0.1%, no more than 0.2%, no more than 0.3%, no more than 0.5%, no more than 0.7%, no more than 1%, no more than 2%, no more than 3%, no more than 5%, or no more than 7%, of the amount of the CD34 extracellular domain present on the cell surface of a target cell.

In some embodiments, the hydrogel beads in the first population comprise between about 10% and about 400% of the amount of the CD34 extracellular domain present on the cell surface of a target cell. In some embodiments, the hydrogel beads in the first population comprise between about 10% and about 400% of the amount of the CD45 extracellular domain present on the cell surface of a target cell. In some embodiments, the hydrogel beads in the first population comprise between about 10% and about 50%, about 10% and about 70%, about 10% and about 100%, about 10% and about 120%, about 10% and about 150%, about 10% and about 200%, about 10% and about 250%, about 10% and about 300%, about 10% and about 400%, about 20% and about 50%, about 20% and about 70%, about 20% and about 100%, about 20% and about 120%, about 20% and about 150%, about 20% and about 200%, about 20% and about 250%, about 20% and about 300%, about 20% and about 400%, about 30% and about 50%, about 30% and about 70%, about 30% and about 100%, about 30% and about 120%, about 30% and about 150%, about 30% and about 200%, about 30% and about 250%, about 30% and about 300%, about 30% and about 400%, about 40% and about 50%, about 40% and about 70%, about 40% and about 100%, about 40% and about 120%, about 40% and about 150%, about 40% and about 200%, about 40% and about 250%, about 40% and about 300%, about 40% and about 400%, about 50% and about 70%, about 50% and about 100%, about 50% and about 120%, about 50% and about 150%, about 50% and about 200%, about 50% and about 250%, about 50% and about 300%, about 50% and about 400%, about 60% and about 70%, about 60% and about 100%, about 60% and about 120%, about 60% and about 150%, about 60% and about 200%, about 60% and about 250%, about 60% and about 300%, about 60% and about 400%, about 70% and about 100%, about 70% and about 120%, about 70% and about 150%, about 70% and about 200%, about 70% and about 250%, about 70% and about 300%, about 70% and about 400%, about 80% and about 100%, about 80% and about 120%, about 80% and about 150%, about 80% and about 200%, about 80% and about 250%, about 80% and about 300%, about 80% and about 400%, about 90% and about 100%, about 90% and about 120%, about 90% and about 150%, about 90% and about 200%, about 90% and about 250%, about 90% and about 300%, about 90% and about 400%, about 100% and about 120%, about 100% and about 150%, about 100% and about 200%, about 100% and about 250%, about 100% and about 300%, about 100% and about 400%, about 120% and about 150%, about 120% and about 200%, about 120% and about 250%, about 120% and about 300%, about 120% and about 400%, about 150% and about 200%, about 150% and about 250%, about 150% and about 300%, or about 150% and about 400%, of the amount of CD34 and/or CD45 extracellular domains present on the cell surface of a target cell, including all ranges and subranges therebetween.

In some embodiments, the disclosure provides a second population of hydrogel beads comprising a cell surface biomarker profile comprising a CD45 extracellular domain but a lower level of CD34 extracellular domain compared to the first population of hydrogel beads. In some embodiments, the hydrogel beads in the second population comprise no more than 10% of the median number of CD34 extracellular domain comprised in the first population of hydrogel beads. In some embodiments, the hydrogel beads in the second population comprise no more than 0.1%, no more than 0.2%, no more than 0.3%, no more than 0.5%, no more than 0.7%, no more than 1%, no more than 2%, no more than 3%, no more than 5%, or no more than 7%, of the median number of CD34 extracellular domain comprised in the first population of hydrogel beads. In some embodiments, the cell surface biomarker profile of the hydrogel beads in the second population lacks a CD34 extracellular domain. In some embodiments, the hydrogel beads comprise a polymerized monomer and a bifunctional monomer.

In some embodiments, the hydrogel beads in the second population comprise between about 10% and about 400% of the amount of the CD45 extracellular domain present on the cell surface of a target cell. In some embodiments, the hydrogel beads in the second population comprise between about 10% and about 50%, about 10% and about 70%, about 10% and about 100%, about 10% and about 120%, about 10% and about 150%, about 10% and about 200%, about 10% and about 250%, about 10% and about 300%, about 10% and about 400%, about 20% and about 50%, about 20% and about 70%, about 20% and about 100%, about 20% and about 120%, about 20% and about 150%, about 20% and about 200%, about 20% and about 250%, about 20% and about 300%, about 20% and about 400%, about 30% and about 50%, about 30% and about 70%, about 30% and about 100%, about 30% and about 120%, about 30% and about 150%, about 30% and about 200%, about 30% and about 250%, about 30% and about 300%, about 30% and about 400%, about 40% and about 50%, about 40% and about 70%, about 40% and about 100%, about 40% and about 120%, about 40% and about 150%, about 40% and about 200%, about 40% and about 250%, about 40% and about 300%, about 40% and about 400%, about 50% and about 70%, about 50% and about 100%, about 50% and about 120%, about 50% and about 150%, about 50% and about 200%, about 50% and about 250%, about 50% and about 300%, about 50% and about 400%, about 60% and about 70%, about 60% and about 100%, about 60% and about 120%, about 60% and about 150%, about 60% and about 200%, about 60% and about 250%, about 60% and about 300%, about 60% and about 400%, about 70% and about 100%, about 70% and about 120%, about 70% and about 150%, about 70% and about 200%, about 70% and about 250%, about 70% and about 300%, about 70% and about 400%, about 80% and about 100%, about 80% and about 120%, about 80% and about 150%, about 80% and about 200%, about 80% and about 250%, about 80% and about 300%, about 80% and about 400%, about 90% and about 100%, about 90% and about 120%, about 90% and about 150%, about 90% and about 200%, about 90% and about 250%, about 90% and about 300%, about 90% and about 400%, about 100% and about 120%, about 100% and about 150%, about 100% and about 200%, about 100% and about 250%, about 100% and about 300%, about 100% and about 400%, about 120% and about 150%, about 120% and about 200%, about 120% and about 250%, about 120% and about 300%, about 120% and about 400%, about 150% and about 200%, about 150% and about 250%, about 150% and about 300%, or about 150% and about 400%, of the amount of the CD45 extracellular domain present on the cell surface of a target cell, including all ranges and subranges therebetween.

In some embodiments, the amount of the CD34 extracellular domain in the hydrogel beads in the second population is lower than the amount of the CD34 extracellular domain in the hydrogel beads in the first population. In some embodiments, the hydrogel beads in the second population comprise no more than 10% of the amount of the CD34 extracellular domain present on the cell surface of a target cell. In some embodiments, the hydrogel beads in the second population comprise no more than 50%, no more than 40%, no more than 30%, no more than 20%, or no more than 10%, of the amount of the CD34 extracellular domain present on the cell surface of a target cell. In some embodiments, the hydrogel beads in the second population comprise no more than 0.1%, no more than 0.2%, no more than 0.3%, no more than 0.5%, no more than 0.7%, no more than 1%, no more than 2%, no more than 3%, no more than 5%, or no more than 7%, of the amount of the CD34 extracellular domain present on the cell surface of a target cell.

In some embodiments, the amount of CD34 and/or CD45 extracellular domains present on the cell surface of the target cell is the median amount of CD34 and/or CD45 extracellular domains present on the surface of cells in a leukopack enriched in CD34+ cells using regimen H treatment. In some embodiments, the leukopak is an enriched leukapheresis product collected from healthy and consenting donors using the Spectra Optia® Apheresis System following an IRB-approved protocol. In some embodiments, the leukopak is collected from at least 10, at least 20, or at least 30 healthy and consenting donors. Leukopaks allow for scalability and reproducibility of experiments by limiting the impact of donor-to-donor variability. In some embodiments, the leukopak contains acid-citrate-dextrose solution A (ACDA) as the anticoagulant. In some embodiments, the leukopak (before CD34+ cell enrichment) contains up to about 50% T cells, about 20% monocytes, about 10% B cells, about 10% NK cells, about 3% granulocytes, and about 3% hematocrit. Regimen H is a mobilization regimen known in the art and performed by AllCells® to collect mobilized peripheral blood. During the procedure, healthy donors are given FDA-approved drugs to "mobilize" the HSPCs from bone marrow stem cell niche to enter the peripheral blood circulation. In some embodiments, the regimen H treatment comprises subcutaneously administering Filgrastim (Neupogen®) 10 ug/kg/day for 5 days, subcutaneously administering Plerixafor (Mozobil®) 240 ug/kg/day for 2 days on day 4 and 5 (evenings), and apheresis on day 5 and 6. The cytokine G-CSF (Neupogen®) is the most frequently used mobilizing agent and has been the gold standard in the clinic for over 20 years. The bicyclam molecule Plerixafor (Mozobil®) has been shown to effectively rescue the mobilization of HSPCs in individuals that fail to mobilize with G-CSF. Further information of the regimen H treatment can be found, for example, in the weblink "allcells.com/dual-mobilization-enhances-cd34-yield-across-all-donor-types/", the content of which is incorporated by reference in its entirety. Even though the amount of CD34 and/or CD45 extracellular domains can vary among a population of cells in the leukopack, the median amount of CD34 and/or CD45 extracellular domains present on the surface of cells in a CD34+ cells enriched leukopack has minimal batch-to-batch variation.

In some embodiments, there may be multiple forms or variants of the CD34 and/or CD45 extracellular domains present in the hydrogel beads or on the cell surface of the target cell. For example, CD45 extracellular domain has several naturally occurring isoforms (e.g., SEQ ID NO: 2-9) and multiple isoforms may present on the surface of the same cell. In some embodiments, the CD34 and/or CD45 extracellular domains in the hydrogel beads may exist in different forms. For example, a hydrogel beads may have multiple CD34 extracellular domain variants, with one variant containing a first tag and possibly a mutation (e.g., insertion, deletion, or substitution), and another variant containing a second tag and possibly a different mutation (e.g., insertion, deletion, or substitution). In such cases, unless indicated otherwise, the amount of CD34 and/or CD45 extracellular domains is the total amount of all the variants that can bind to a CD34-specific binding molecule and/or a CD45-specific binding molecule in a quantitative assay. In some embodiments, the quantitative assay is the fluorescence intensity measurement using flow cytometry. That is, in some embodiments, the amount of the CD45 and/or CD34 extracellular domains present in the hydrogel and/or on the cell surface is measured based on the fluorescence intensity using flow cytometry. In some embodiments, the amount of CD34 and/or CD45 extracellular domains in the hydrogel is compared to the median amount of CD34 and/or CD45 extracellular domains present on the surface of cells in a leukopack enriched in CD34+ cells using regimen H treatment, based on the fluorescence intensity in flow cytometry (e.g., using the combination of the CD34-specific binding molecule and the CD45-specific binding molecule according to panel 1 in Table 4).

In some embodiments, the fluorescence intensity of CD45 extracellular domain is measured using a CD45-specific binding molecule. In some embodiments, the fluorescence intensity of CD34 extracellular domain is measured using a CD34-specific binding molecule. In some embodiments, the binding molecule comprises a monoclonal antibody or antigen binding fragment thereof. In some embodiments, the binding molecule comprises a peptide, a protein, an aptamer, or a polymer. In some embodiments, the binding molecule is a complex (e.g., a complex of a primary antibody and a fluorophore labeled secondary antibody). In some embodiments, the binding molecule binds to CD34 or CD45 with an equilibrium dissociation constant (Kd) of less than 1000 nM, less than 100 nM, less than 50 nM, less than 10 nM, less than 5 nM, less than 1 nM, less than 0.5 nM, or less than 0.1 nM. In some embodiments, the binding molecule is fluorophore labeled or comprises a fluorophore.

In some embodiments, the CD34-specific binding molecule is selected from: a phycoerythrin (PE) labeled anti-CD34 antibody clone 8G12, a phycoerythrin (PE) labeled anti-CD34 antibody clone AC136, an allophycocyanin (APC) labeled anti-CD34 antibody clone 4H11, and a Brilliant™ Violet 421 (BV421) labeled anti-CD34 antibody clone 581. In some embodiments, the CD45-specific binding molecule is selected from: a fluorescein isothiocyanate (FITC) labeled anti-CD45 antibody clone 2D1, a PerCP-Cyanine® 5.5 (PerCP-Cy5.5) labeled anti-CD45 antibody clone 2D1, a phycoerythrin (PE) labeled anti-CD45 antibody clone MEM-28, and a BD Horizon™ V500 labeled anti-CD45 antibody clone HI30. In some embodiments, the combination of the CD34-specific binding molecule and the CD45-specific binding molecule are selected from one of the panels in Table 4. In some embodiments, the combination of the CD34-specific binding molecule and the CD45-specific binding molecule is a phycoerythrin (PE) labeled anti-CD34 antibody clone 8G12 and a fluorescein isothiocyanate (FITC) labeled anti-CD45 antibody clone 2D1.

In some embodiments, the CD34 is from *H. sapiens*. In some embodiments, the CD34 extracellular domain comprises Ser32-Thr290 of uniprot P28906 or SEQ ID NO: 1, or a sequence comprising at least 70%, 75%, 80%, 85%, 90%, 95%, or 97.5% identity with Ser32-Thr290 of uniprot P28906 or SEQ ID NO: 1. In some embodiments, the CD34 extracellular domain comprises an amino acid sequence that is at least 70%, at least 75%, at least 80%, at least 85%, at least 90%, at least 95%, at least 96%, at least 97%, at least 98%, at least 99%, at least 99.5%, or 100% identical to SEQ ID NO: 1. In some embodiments, the CD34 extracellular domain comprises an amino acid sequence that is at least 90%, at least 95%, at least 96%, at least 97%, at least 98%, at least 99%, or 100% identical to a stretch of at least 20 continuous amino acids in SEQ ID NO: 1. In some embodiments, the CD34 extracellular domain comprises an amino acid sequence that is at least 90%, at least 95%, at least 96%, at least 97%, at least 98%, at least 99%, or 100% identical to a stretch of at least 30 continuous amino acids in SEQ ID NO: 1. In some embodiments, the CD34 extracellular domain comprises an amino acid sequence that is at least 90%, at least 95%, at least 96%, at least 97%, at least 98%, at least 99%, or 100% identical to a stretch of at least 40 continuous amino acids in SEQ ID NO: 1. In some embodiments, the CD34 extracellular domain comprises an amino acid sequence that is at least 90%, at least 95%, at least 96%, at least 97%, at least 98%, at least 99%, or 100% identical to a stretch of at least 50 continuous amino acids in SEQ ID NO: 1. In some embodiments, the CD34 extracellular domain comprises an amino acid sequence that is at least 90%, at least 95%, at least 96%, at least 97%, at least 98%, at least 99%, or 100% identical to a stretch of at least 70 continuous amino acids in SEQ ID NO: 1. In some embodiments, the CD34 extracellular domain comprises an amino acid sequence that is at least 90%, at least 95%, at least 96%, at least 97%, at least 98%, at least 99%, or 100% identical to a stretch of at least 100 continuous amino acids in SEQ ID NO: 1. In some embodiments, the CD34 extracellular domain comprises a fluorophore.

In some embodiments, the CD45 is from *H. sapiens*. In some embodiments, the CD45 extracellular domain comprises Gln26-Lys577 of uniprot P08575 or SEQ ID NO: 2, or a sequence comprising at least 70%, 75%, 80%, 85%, 90%, 95%, or 97.5% identity with Gln26-Lys577 of uniprot P08575 or SEQ ID NO: 2. In some embodiments, the CD45 extracellular domain comprises an amino acid sequence that is at least 70%, at least 75%, at least 80%, at least 85%, at least 90%, at least 95%, at least 96%, at least 97%, at least 98%, at least 99%, at least 99.5%, or 100% identical to any one of SEQ ID NO: 2-9. In some embodiments, the CD45 extracellular domain comprises an amino acid sequence that is at least 70%, at least 75%, at least 80%, at least 85%, at least 90%, at least 95%, at least 96%, at least 97%, at least 98%, at least 99%, at least 99.5%, or 100% identical to SEQ ID NO: 10. In some embodiments, the CD45 extracellular domain comprises an amino acid sequence that is at least 90%, at least 95%, at least 96%, at least 97%, at least 98%, at least 99%, or 100% identical to a stretch of at least 20 continuous amino acids in SEQ ID NO: 10. In some embodiments, the CD45 extracellular domain comprises an amino acid sequence that is at least 90%, at least 95%, at least 96%, at least 97%, at least 98%, at least 99%, or 100% identical to a stretch of at least 30 continuous amino acids in SEQ ID NO: 10. In some embodiments, the CD45 extracellular domain comprises an amino acid sequence that is at least 90%, at least 95%, at least 96%, at least 97%, at least 98%, at least 99%, or 100% identical to a stretch of at least 40 continuous amino acids in SEQ ID NO: 10. In some embodiments, the CD45 extracellular domain comprises an amino acid sequence that is at least 90%, at least 95%, at least 96%, at least 97%, at least 98%, at least 99%, or 100% identical to a stretch of at least 50 continuous amino acids in SEQ ID NO: 10. In some embodiments, the CD45 extracellular domain comprises an amino acid sequence that is at least 90%, at least 95%, at least 96%, at least 97%, at least 98%, at least 99%, or 100% identical to a stretch of at least 70 continuous amino acids in SEQ ID NO: 10. In some embodiments, the CD45 extracellular domain comprises an amino acid sequence that is at least 90%, at least 95%, at least 96%, at least 97%, at least 98%, at least 99%, or 100% identical to a stretch of at least 100 continuous amino acids in SEQ ID NO: 10. In some embodiments, the CD45 extracellular domain comprises a fluorophore. In some embodiments, the fluorophore of the CD45 extracellular domain is different from the fluorophore of the CD34 extracellular domain.

TABLE 5

Non-limiting Exemplary Sequences of CD34 and CD45 Extracellular Domains

| Protein | Non-limiting Exemplary Sequence | SEQ ID NO |
|---|---|---|
| CD34 Extracellular Domain | SLDNNGTATPELPTQGTFSNVSTNVSYQETTTPSTLGSTSLH PVSQHGNEATTNITETTVKFTSTSVITSVYGNTNSSVQSQTS VISTVFTTPANVSTPETTLKPSLSPGNVSDLSTTSTSLATSP TKPYTSSSPILSDIKAEIKCSGIREVKLTQGICLEQNKTSSC | 1 |

TABLE 5-continued

Non-limiting Exemplary Sequences of CD34 and CD45 Extracellular Domains

| Protein | Non-limiting Exemplary Sequence | SEQ ID NO |
|---|---|---|
| | AEFKKDRGEGLARVLCGEEQADADAGAQVCSLLLAQSEVRPQ CLLLVLANRTEISSKLQLMKKHQSDLKKLGILDFTEQDVASH QSYSQKT | |
| CD45 Extracellular Domain ABC Isoform | QSPTPSPTGLTTAKMPSVPLSSDPLPTHTTAFSPASTFEREN DFSETTTSLSPDNTSTQVSPDSLDNASAFNTTGVSSVQTPHL PTHADSQTPSAGTDTQTFSGSAANAKLNPTPGSNAISDVPGE RSTASTFPTDPVSPLTTTLSLAHHSSAALPARTSNTTITANT SDAYLNASETTTLSPSGSAVISTTTIATTPSKPTCDEKYANI TVDYLYNKETKLFTAKLNVNENVECGNNTCTNNEVHNLTECK NASVSISHNSCTAPDKTLILDVPPGVEKFQLHDCTQVEKADT TICLKWKNIETFTCDTQNITYRFQCGNMIFDNKEIKLENLEP EHEYKCDSEILYNNHKFTNASKIIKTDFGSPGEPQIIFCRSE AAHQGVITWNPPQRSFHNFTLCYIKETEKDCLNLDKNLIKYD LQNLKPYTKYVLSLHAYIIAKVQRNGSAAMCHFTTKSAPPSQ VWNMTVSMTSDNSMHVKCRPPRDRNGPHERYHLEVEAGNTLV RNESHKNCDFRVKDLQYSTDYTFKAYFHNGDYPGEPFILHHS TSYNSK | 2 |
| CD45 Extracellular Domain O Isoform | QSPTPSPTDAYLNASETTTLSPSGSAVISTTTIATTPSKPTC DEKYANITVDYLYNKETKLFTAKLNVNENVECGNNTCTNNEV HNLTECKNASVSISHNSCTAPDKTLILDVPPGVEKFQLHDCT QVEKADTTICLKWKNIETFTCDTQNITYRFQCGNMIFDNKEI KLENLEPEHEYKCDSEILYNNHKFTNASKIIKTDFGSPGEPQ IIFCRSEAAHQGVITWNPPQRSFHNFTLCYIKETEKDCLNLD KNLIKYDLQNLKPYTKYVLSLHAYIIAKVQRNGSAAMCHFTT KSAPPSQVWNMTVSMTSDNSMHVKCRPPRDRNGPHERYHLEV EAGNTLVRNESHKNCDFRVKDLQYSTDYTFKAYFHNGDYPGE PFILHHSTSYNSK | 3 |
| CD45 Extracellular Domain AB Isoform | QSPTPSPTGLTTAKMPSVPLSSDPLPTHTTAFSPASTFEREN DFSETTTSLSPDNTSTQVSPDSLDNASAFNTTGVSSVQTPHL PTHADSQTPSAGTDTQTFSGSAANAKLNPTPGSNAISDAYLN ASETTTLSPSGSAVISTTTIATTPSKPTCDEKYANITVDYLY NKETKLFTAKLNVNENVECGNNTCTNNEVHNLTECKNASVSI SHNSCTAPDKTLILDVPPGVEKFQLHDCTQVEKADTTICLKW KNIETFTCDTQNITYRFQCGNMIFDNKEIKLENLEPEHEYKC DSEILYNNHKFTNASKIIKTDFGSPGEPQIIFCRSEAAHQGV ITWNPPQRSFHNFTLCYIKETEKDCLNLDKNLIKYDLQNLKP YTKYVLSLHAYIIAKVQRNGSAAMCHFTTKSAPPSQVWNMTV SMTSDNSMHVKCRPPRDRNGPHERYHLEVEAGNTLVRNESHK NCDFRVKDLQYSTDYTFKAYFHNGDYPGEPFILHHSTSYNSK | 4 |
| CD45 Extracellular Domain AC Isoform | QSPTPSPTGLTTAKMPSVPLSSDPLPTHTTAFSPASTFEREN DFSETTTSLSPDNTSTQVSPDSLDNASAFNTTDVPGERSTAS TFPTDPVSPLTTTLSLAHHSSAALPARTSNTTITANTSDAYL NASETTTLSPSGSAVISTTTIATTPSKPTCDEKYANITVDYL YNKETKLFTAKLNVNENVECGNNTCTNNEVHNLTECKNASVS ISHNSCTAPDKTLILDVPPGVEKFQLHDCTQVEKADTTICLK WKNIETFTCDTQNITYRFQCGNMIFDNKEIKLENLEPEHEYK CDSEILYNNHKFTNASKIIKTDFGSPGEPQIIFCRSEAAHQG VITWNPPQRSFHNFTLCYIKETEKDCLNLDKNLIKYDLQNLK PYTKYVLSLHAYIIAKVQRNGSAAMCHFTTKSAPPSQVWNMT VSMTSDNSMHVKCRPPRDRNGPHERYHLEVEAGNTLVRNESH KNCDFRVKDLQYSTDYTFKAYFHNGDYPGEPFILHHSTSYNS K | 5 |
| CD45 Extracellular Domain BC Isoform | QSPTPSPTGVSSVQTPHLPTHADSQTPSAGTDTQTFSGSAAN AKLNPTPGSNAISDVPGERSTASTFPTDPVSPLTTTLSLAHH SSAALPARTSNTTITANTSDAYLNASETTTLSPSGSAVISTT TIATTPSKPTCDEKYANITVDYLYNKETKLFTAKLNVNENVE CGNNTCTNNEVHNLTECKNASVSISHNSCTAPDKTLILDVPP GVEKFQLHDCTQVEKADTTICLKWKNIETFTCDTQNITYRFQ CGNMIFDNKEIKLENLEPEHEYKCDSEILYNNHKFTNASKII KTDFGSPGEPQIIFCRSEAAHQGVITWNPPQRSFHNFTLCYI KETEKDCLNLDKNLIKYDLQNLKPYTKYVLSLHAYIIAKVQR NGSAAMCHFTTKSAPPSQVWNMTVSMTSDNSMHVKCRPPRDR NGPHERYHLEVEAGNTLVRNESHKNCDFRVKDLQYSTDYTFK AYFHNGDYPGEPFILHHSTSYNSK | 6 |
| CD45 Extracellular Domain A Isoform | QSPTPSPTGLTTAKMPSVPLSSDPLPTHTTAFSPASTFEREN DFSETTTSLSPDNTSTQVSPDSLDNASAFNTTDAYLNASETT TLSPSGSAVISTTTIATTPSKPTCDEKYANITVDYLYNKETK LFTAKLNVNENVECGNNTCTNNEVHNLTECKNASVSISHNSC | 7 |

TABLE 5-continued

Non-limiting Exemplary Sequences of CD34 and CD45 Extracellular Domains

| Protein | Non-limiting Exemplary Sequence | SEQ ID NO |
|---|---|---|
| | TAPDKTLILDVPPGVEKFQLHDCTQVEKADTTICLKWKNIET FTCDTQNITYRFQCGNMIFDNKEIKLENLEPEHEYKCDSEIL YNNHKFTNASKIIKTDFGSPGEPQIIFCRSEAAHQGVITWNP PQRSFHNFTLCYIKETEKDCLNLDKNLIKYDLQNLKPYTKYV LSLHAYIIAKVQRNGSAAMCHFTTKSAPPSQVWNMTVSMTSD NSMHVKCRPPRDRNGPHERYHLEVEAGNTLVRNESHKNCDFR VKDLQYSTDYTFKAYFHNGDYPGEPFILHHSTSYNSK | |
| CD45 Extracellular Domain B Isoform | QSPTPSPTGVSSVQTPHLPTHADSQTPSAGTDTQTFSGSAAN AKLNPTPGSNAISDAYLNASETTTLSPSGSAVISTTTIATTP SKPTCDEKYANITVDYLYNKETKLFTAKLNVNENVECGNNTC TNNEVHNLTECKNASVSISHNSCTAPDKTLILDVPPGVEKFQ LHDCTQVEKADTTICLKWKNIETFTCDTQNITYRFQCGNMIF DNKEIKLENLEPEHEYKCDSEILYNNHKFTNASKIIKTDFGS PGEPQIIFCRSEAAHQGVITWNPPQRSFHNFTLCYIKETEKD CLNLDKNLIKYDLQNLKPYTKYVLSLHAYIIAKVQRNGSAAM CHFTTKSAPPSQVWNMTVSMTSDNSMHVKCRPPRDRNGPHER YHLEVEAGNTLVRNESHKNCDFRVKDLQYSTDYTFKAYFHNG DYPGEPFILHHSTSYNSK | 8 |
| CD45 Extracellular Domain C Isoform | QSPTPSPTDVPGERSTASTFPTDPVSPLTTTLSLAHHSSAAL PARTSNTTITANTSDAYLNASETTTLSPSGSAVISTTTIATT PSKPTCDEKYANITVDYLYNKETKLFTAKLNVNENVECGNNT CTNNEVHNLTECKNASVSISHNSCTAPDKTLILDVPPGVEKF QLHDCTQVEKADTTICLKWKNIETFTCDTQNITYRFQCGNMI FDNKEIKLENLEPEHEYKCDSEILYNNHKFTNASKIIKTDFG SPGEPQIIFCRSEAAHQGVITWNPPQRSFHNFTLCYIKETEK DCLNLDKNLIKYDLQNLKPYTKYVLSLHAYIIAKVQRNGSAA MCHFTTKSAPPSQVWNMTVSMTSDNSMHVKCRPPRDRNGPHE RYHLEVEAGNTLVRNESHKNCDFRVKDLQYSTDYTFKAYFHN GDYPGEPFILHHSTSYNSK | 9 |
| CD45 Extracellular Domain Consensus Sequence | DAYLNASETTTLSPSGSAVISTTTIATTPSKPTCDEKYANIT VDYLYNKETKLFTAKLNVNENVECGNNTCTNNEVHNLTECKN ASVSISHNSCTAPDKTLILDVPPGVEKFQLHDCTQVEKADTT ICLKWKNIETFTCDTQNITYRFQCGNMIFDNKEIKLENLEPE HEYKCDSEILYNNHKFTNASKIIKTDFGSPGEPQIIFCRSEA AHQGVITWNPPQRSFHNFTLCYIKETEKDCLNLDKNLIKYDL QNLKPYTKYVLSLHAYIIAKVQRNGSAAMCHFTTKSAPPSQV WNMTVSMTSDNSMHVKCRPPRDRNGPHERYHLEVEAGNTLVR NESHKNCDFRVKDLQYSTDYTFKAYFHNGDYPGEPFILHHST SYNSK | 10 |
| CD34 Full Length | MLVRRGARAGPRMPRGWTALCLLSLLPSGFMSLDNNGTATPE LPTQGTFSNVSTNVSYQETTTPSTLGSTSLHPVSQHGNEATT NITETTVKFTSTSVITSVYGNTNSSVQSQTSVISTVFTTPAN VSTPETTLKPSLSPGNVSDLSTTSTSLATSPTKPYTSSSPIL SDIKAEIKCSGIREVKLTQGICLEQNKTSSCAEFKKDRGEGL ARVLCGEEQADADAGAQVCSLLLAQSEVRPQCLLLVLANRTE ISSKLQLMKKHQSDLKKLGILDFTEQDVASHQSYSQKTLIAL VTSGALLAVLGITGYFLMNRRSWSPTGERLGEDPYYTENGGG QGYSSGPGTSPEAQGKASVNRGAQENGTGQATSRNGHSARQH VVADTEL | 11 |
| CD45 Full Length | MTMYLWLKLLAFGFAFLDTEVFVTGQSPTPSPTGLTTAKMPS VPLSSDPLPTHTTAFSPASTFERENDFSETTTSLSPDNTSTQ VSPDSLDNASAFNTTGVSSVQTPHLPTHADSQTPSAGTDTQT FSGSAANAKLNPTPGSNAISDVPGERSTASTFPTDPVSPLTT TLSLAHHSSAALPARTSNTTITANTSDAYLNASETTTLSPSG SAVISTTTIATTPSKPTCDEKYANITVDYLYNKETKLFTAKL NVNENVECGNNTCTNNEVHNLTECKNASVSISHNSCTAPDKT LILDVPPGVEKFQLHDCTQVEKADTTICLKWKNIETFTCDTQ NITYRFQCGNMIFDNKEIKLENLEPEHEYKCDSEILYNNHKF TNASKIIKTDFGSPGEPQIIFCRSEAAHQGVITWNPPQRSFH NFTLCYIKETEKDCLNLDKNLIKYDLQNLKPYTKYVLSLHAY IIAKVQRNGSAAMCHFTTKSAPPSQVWNMTVSMTSDNSMHVK CRPPRDRNGPHERYHLEVEAGNTLVRNESHKNCDFRVKDLQY STDYTFKAYFHNGDYPGEPFILHHSTSYNSKALIAFLAFLII VTSIALLVVLYKIYDLHKKRSCNLDEQQELVERDDEKQLMNV EPIHADILLETYKRKIADEGRLFLAEFQSIPRVFSKFPIKEA RKPFNQNKNRYVDILPYDYNRVELSEINGDAGSNYINASYID GFKEPRKYIAAQGPRDETVDDFWRMIWEQKATVIVMVTRCEE GNRNKCAEYWPSMEEGTRAFGDVVVKINQHKRCPDYIIQKLN IVNKKEKATGREVTHIQFTSWPDHGVPEDPHLLLKLRRRVNA | 12 |

TABLE 5-continued

Non-limiting Exemplary Sequences of CD34 and
CD45 Extracellular Domains

| Protein | Non-limiting Exemplary Sequence | SEQ ID NO |
|---------|--------------------------------|-----------|
|         | FSNFFSGPIVVHCSAGVGRTGTYIGIDAMLEGLEAENKVDVY GYVVKLRRQRCLMVQVEAQYILIHQALVEYNQFGETEVNLSE LHPYLHNMKKRDPPSEPSPLEAEFQRLPSYRSWRTQHIGNQE ENKSKNRNSNVIPYDYNRVPLKHELEMSKESEHDSDESSDDD SDSEEPSKYINASFIMSYWKPEVMIAAQGPLKETIGDFWQMI FQRKVKVIVMLTELKHGDQEICAQYWGEGKQTYGDIEVDLKD TDKSSTYTLRVFELRHSKRKDSRTVYQYQYTNWSVEQLPAEP KELISMIQVVKQKLPQKNSSEGNKHHKSTPLLIHCRDGSQQT GIFCALLNLLESAETEEVVDIFQVVKALRKARPGMVSTFEQY QFLYDVIASTYPAQNGQVKKNNHQEDKIEFDNEVDKVKQDAN CVNPLGAPEKLPEAKEQAEGSEPTSGTEGPEHSVNGPASPAL NQGS | |

Additional biomolecules for use with the disclosed hydrogel beads and methods disclosed herein are provided in Tables 2 and 3.

TABLE 2

Exemplary Target Cells and Representative Cell Surface Marker(s)

| Target Cell | Cell Surface Marker(s) (human) | Cell Surface Marker(s) (mouse) |
|-------------|-------------------------------|-------------------------------|
| B Cell | CD19, CD20 | CD19, CD22 (B cell activation marker), CD45R/B220 |
| T Cell | CD3, CD4, CD8 | CD3, CD4, CD8 |
| Activated T Cells | CD25, CD69 | CD25, CD69 |
| Dendritic Cell | CD1c, CD83, CD123, CD141, CD209, MHC II | CD11c, CD123, MHC II |
| Plasmacytoid Dendritic Cells* | CD123, CD303, CD304 | CD11c$^{int}$, CD317 |
| Platelet (resting) | CD42b | CD41 |
| Platelet (activated) | CD62P | CD62P |
| Natural Killer Cells | CD16, CD56 | CD49b (clone DX5) |
| Hematopoietic Stem Cell | CD34, CD90 | CD48, CD117, CD150, Sca-1 |

TABLE 2-continued

Exemplary Target Cells and Representative Cell Surface Marker(s)

| Target Cell | Cell Surface Marker(s) (human) | Cell Surface Marker(s) (mouse) |
|-------------|-------------------------------|-------------------------------|
| Macrophage | CD11b, CD68, CD163 | F4/80, CD68 |
| Monocyte | CD14, CD16, CD64 | CD11b, CD115, Ly-6C |
| Plasma Cell | CD138 | CD138 |
| Red Blood Cell | CD235a | TER-119 |
| Neutrophil | CD15, CD16 | CD11b, Ly-6B.2, Ly6G, Gr-1 |
| Basophil | 2D7 antigen, CD123, CD203c, FcεRIα | CD200R3, FcεRIα |
| Eosinophil | CD11b, CD193, EMR1, Siglec-8 | CD11b, CD193, F4/80, Siglec-F |
| Granulocyte | CD66b | CD66b, Gr-1/Ly6G, Ly6C |
| Endothelial cell | CD146 | CD146 MECA-32, CD106, CD31, CD62E (activated endothelial cell) |
| Epithelial cell | CD326 | CD326 (EPCAM1) |
| Natural Killer (NK) cell | CD56 | CD335 (NKp46) |
| Myeloid derived suppressor cell (MDSC) | CD11b, CD14, CD33 (Siglec-3) | CD11b, GR1 |

TABLE 3

Cell surface markers for use with the hydrogel beads described herein.

| | | |
|---|---|---|
| 14-3-3 [alpha][beta] | Cdc-123 | HPx2 |
| 14-3-3 [epsilon] | Cdc-2 (p34) | Hrk |
| 14-3-3 [zeta] | Cdc-25A Phosph (Ser17) | Hsc70 |
| 14-3-3 [theta] | Cdc-25C | HSD17B1 |
| 14-3-3 [sigma] | Cdc-37 | HSD3B1 |
| 15-Lipoxygenase 1 | Cdc-45L | HSF1 |
| 160 kD Neurofilament Medium | Cdc-6 | HSF2 |
| 200 kD Neurofilament Heavy | CDc-7 | HSF4 |
| 2H2 | Cdk1 | HSL |
| 3G11 sialoganglioside antigen | Cdk2 | Hsp105 |
| 4E-BP1 | Cdk4 | Hsp14 |
| 4E-BP1 Phospho (Thr37/46) | Cdk5 | Hsp22 |
| 5-Methylcytidine | Cdk6 | HSP25 |
| 5HT3A receptor | Cdk7 | Hsp27 |
| 5T4 | Cdk9 | Hsp40 |
| 68 kDa Neurofilament Light | CdkA1 | Hsp47 |
| 7.1 | CdkN2A | Hsp60 |
| 70 kDa Neurofilament Light | CdkN3 | Hsp70 |

TABLE 3-continued

Cell surface markers for use with the hydrogel beads described herein.

| | | |
|---|---|---|
| A20 | CDT1 | Hsp70-2 |
| A2B5 | CDX2 | Hsp90 |
| AAK1 | CEACAM19 | Hsp90[alpha] |
| ABCA1 | CEACAM20 | Hsp90[beta] |
| ABCA7 | CEACAM7 | HspA4 |
| ABCB4 | CEBP[alpha] | HspA6 |
| ABCB5 | CEBP[beta] | HspB2 |
| ABCC10 | CEND1 | HspB2 |
| ABCC11 | CENPA | HspB7 |
| ABCG1 | CENPE | HSV tag |
| ABI2 | CENPF | HTLV I gp46 |
| ABIN3 | CENPH | HTLVI p19 |
| ABIN3[beta] | Centrin 2 | HtrA2/Omi |
| ABL2 | CFAH | Human Papillomavirus 16 (E7) |
| Abraxas | cFos | Huntingtin |
| ACAA1 | CFTR | HUS1 |
| ACADM | CGB5 | Hydrogen Potassium ATPase [beta] |
| ACAT2 | cGK1 | I-Ak (A[alpha]k) |
| ACBD3 | CH2 | I-Ak (A[beta]k) |
| ACD | CHCHD5 | Ia (B cells) |
| ACE2 | CHD3 | IBA1 |
| Acetyl Coenzyme A Carboxylase | CHD4 | IBP2 |
| Acetyl Coenzyme A Carboxylase [alpha] | Chemerin | ICAD |
| Acetyl Coenzyme A Synthetase | CHIPS, C-terminus | IDO |
| Acetylated Lysine | CHIPS, N-terminus | IFABP |
| AChR[alpha] | Chk1 | IFN-[alpha] |
| AChR[beta] | Chk2 | IFN-[alpha]1 |
| AChR[gamma] | Chondroitin Sulfate | IFN-[alpha]2[beta] |
| Aconitase2 | CHOP | IFN-[beta] |
| ACOT12 | Chromogranin C | IFN-[gamma] |
| ACSA2 | ChT1 | IFN-[gamma]R[beta] |
| ACSF2 | chTOG | IFN-[lambda] |
| ACSM5 | cIAP1 | IFNA1 |
| Act1 | cIAP2 | IFNAR1 |
| Activation molecule 8 (B cells) | CIAS1 | IFT88 |
| Activin A Receptor Type IB | CIDEA | Ig |
| Activin A Receptor Type IIB | CIP4 | Ig (polyspecific) |
| ACTN3 | CISD1 | Ig light chain [kappa] |
| ACY1 | CITED1 | Ig light chain [lambda] |
| ACY3 | CITED2 | Ig light chain [lambda]1, [lambda]2, [lambda]3 |
| ADA | cJun | IgA |
| ADAM12 | cJun Phospho (Tyr91/Tyr93) | IgA (Fab2) |
| ADE2 | CKII[alpha] | IgA (H) |
| Adenosine A1 Receptor | CKMT2 | IgA, [kappa] |
| Adenosine A2aR | CLASP1 | IgA, [lambda] |
| Adenovirus | Clathrin | IgA1 |
| Adenovirus Fiber monomer and trimer | Claudin-1 | IgA2 |
| Adenovirus hexon protein | Claudin-10 | IgD |
| Adenylate Kinase 1 | Claudin-15 | IgD ([delta] heavy chain) |
| Adenylosuccinate Lyase | Claudin-16 | IgDa |
| ADFP | Claudin-18 (C-term) | IgDb |
| ADH1B | Claudin-18 (Mid) | IgE |
| ADH6 | Claudin-4 | IgE, [kappa] |
| ADH7 | Claudin-5 | IgEa |
| ADI1 | Claudin-8 | IgEb |
| Adiponectin | CLAW-H | IgG |
| Adiponectin Receptor 2 | CLEC12A | IgG (Fab H/L) |
| Adipose Triglyceride Lipase | CLEC1B | IgG (Fab) |
| ADP Ribosylation Factor | CLEC4A | IgG (Fab2 Fc) |
| ADP-ribosyltransferase 2.2 gene | CLEC4M | IgG (Fab2 H/L) |

TABLE 3-continued

Cell surface markers for use with the hydrogel beads described herein.

| | | |
|---|---|---|
| Adrenodoxin | CLEC9A | IgG (Fab2) |
| AF10 | CLIP | IgG (Fc) |
| AFAP1 | CLOCK | IgG (H/L) |
| AFP | Clostridium botulinum Toxin B | IgG ([gamma] chain specific) |
| AG2 | CLPP | IGG Fd |
| AGAP1 | cMaf | IgG, light chain |
| AGPAT5 | cMet | IgG, [kappa] |
| AGR2 | CMKLR1 | IgG/IgM |
| AHSG | CMRF44 | IgG/IgM/IgA |
| AICDA | CMRF56 | IgG/IgM/IgA (Fab2 H/L) |
| AID | cMyb | IgG/IgM/IgA (Fab2) |
| AIF | cMyb | IgG/IgM/IgA (H/L) |
| AIM-2 | CNDP2 | IgG/IgY |
| Aiolos | CNTFR[alpha] | IgG1 |
| AIPL1 | COASY | IgG1 (heavy chain) |
| AIRE | Coatomer [delta] | IgG1, [kappa] |
| AK3 | Cofilin | IgG1, [lambda] |
| AK3L1 | Colec12 | IgG1/2a |
| AK5 | Collagen I | IgG1/3 |
| Akt | Collagen I/III | IgG1a |
| Akt (pS473) | Collagen II | IgG1b |
| Akt (pT308) | Collagen III | IgG2 |
| Akt1 | Collagen IV | IgG2, [kappa] |
| Akt2 | Collagen V | IgG2, [lambda] |
| Akt3 | Collagen VI | IgG2/3 |
| Albumin | Collagen VII | IgG2a |
| Alcohol Dehydrogenase | COMMD1 | IgG2, [kappa] |
| Aldehyde Reductase | Complement Factor B | IgGa, [lambda] |
| aLDH1A1 | Complex I Immunocapture | IgG2a/b |
| ALDH1L1 | Conjugated Choline Glutaric acid | IgG2b |
| ALDH2 | Connexin 26 | IgGb, [kappa] |
| ALDH3A1 | Connexin 30 | IgG2c |
| ALDH3A2 | Connexin 30.2 | IgG2c, [kappa] |
| ALDH5A1 | Connexin 30.3 | IgG3 |
| ALDH6A1 | Connexin 32 | IgG3, [kappa] |
| ALDH7A1 | Connexin 36 | IgG3, [lambda] |
| ALDOB | Connexin 37 | IgG4 |
| Aldolase B | Connexin 37 (C-term) | IgGDa |
| Alexa Fluor ® 405/Cascade Blue | Connexin 37 (Mid) | IgK |
| Alexa Fluor ® 488 | | IGKC |
| ALG2 | Connexin 39 (Mid) | IgL |
| Alix | Connexin 40 (C-term) | IGLC2 |
| Allergin1 | Connexin 40 (Mid) | IgM |
| alpha 1 Antitrypsin | Connexin 43 | IgM (Fab2) |
| alpha 1 Catenin | Connexin 45 | IgM (Fc) |
| alpha 1 Sodium Potassium ATPase | Connexin 45 (C-term) | IgM (H/L) |
| alpha 2 Catenin | Connexin 46 | IgM, [kappa] |
| alpha 2 Macroglobulin | Connexin 47 | IgM, [lambda] |
| alpha Actin 1 | Connexin 57 (C-term) | IgMa |
| alpha Actin 2 | Connexin 57 (Mid) | IgMb |
| alpha Actinin | Contactin 2 | IgY |
| alpha Actinin 2 | COPS3 | Ig's |
| alpha Actinin 3 | Coronavirus | Ihh |
| alpha Actinin 4 | Coronin 1A | Ikaros |
| alpha Adaptin | Coronin 1B | IkB[alpha] |
| alpha Adducin | Cortactin | IkB[beta] |
| alpha B Crystallin | Cortical Thymocytes | IkB[zeta] |
| alpha Fodrin | COX I | IKK[alpha] |
| alpha Internexin | COX I/III | IKK[beta] |
| alpha Synuclein | COX II | IKK[gamma] p(S376) |
| ALS1 | COX IV | IKK[epsilon] |
| AMACR | COX VA | IL-10 |
| Aminopeptidase P | COX VIA1 | IL-11R[alpha] |
| AML1 | Coxsackie Adenovirus Receptor | IL-12 |
| Amphiphysin | CPF | IL-12 (p35) |
| AMPK[alpha] | CPI17[alpha] | IL-12 (p70) |
| AMPK[alpha]1 | Cpn10 | IL-12 R[beta]1 |
| AMPK[alpha]2 | CPO | IL-12 R[beta]2 |
| AMPK[beta]1 | CPS1 | IL-12/IL-23 (p40) |
| AMPK[gamma]1 | CPT2 | IL-13 |
| Amyloid[beta] 42 | CRABP1 | IL-15 |
| ANAPC2 | CRABP2 | IL-1/IL-15R |

TABLE 3-continued

Cell surface markers for use with the hydrogel beads described herein.

| | | |
|---|---|---|
| AND1 | CRALBP | IL-15R[alpha] |
| Androgen Receptor | Creatine Kinase BB | IL-16 |
| Angiotensin I | Creatine Kinase MM | IL-17D |
| Angiotensin II Receptor 2 | CREB | IL-17A |
| Angiotensin III | CREB Receptor (Ser133) | IL-17A/F |
| ANKRD53 | cRel | IL-17B |
| Annexin IV | Cripto1 | IL-17C |
| Annexin V | CRISP3 | IL-17E |
| ANP | Crk p38 | IL-17F |
| Anti-Kudoa thyrsites | CrkL | IL-18 |
| Anti-*T. brucei* procyclin (GPEET) | CrkL (pY207) | IL-18BP |
| Anti-*T. brucei* procyclin (phosphorylated GPEET) | CROT | IL-19 |
| Antiglobulin (Coombs) | CRRY | IL-1RA |
| Antithrombin III | CRTAM | IL-1RN |
| AP2 [alpha] | CRTC3 | IL-1[alpha] |
| AP2 [alpha][beta] | CRY2 | IL-1[beta] |
| AP2 [gamma] | Cryptochrome I | IL-2 |
| AP2M1 | Cryptosporidium | IL-20R2 |
| AP2S1 | Cryptosporidium Parvum | IL-20R[alpha] |
| APAF1 | CRYZL1 | IL-20R[beta] |
| APBB3 | CSK | IL-21 |
| APC | CSK Binding Protein | IL-22 |
| APC-1 | CSPS | IL-22R[alpha]2 |
| APC-10 | cSrc | IL-23 (p19) |
| APC-11 | CST2 | IL-23R |
| APC-2 | CTDSP1 | IL-24 |
| APC-3 | CTNNA3 | IL-25 |
| APC-5 | CTNNBL1 | IL-27 |
| APC-7 | Cullin 1 | IL-27 (p28) |
| APC-8 | Cullin 2 | IL-27R[alpha] |
| APE1 | Cullin 3 | IL-28 |
| APG12 | Cullin 4A | IL-28R[alpha] |
| APG3 | Cullin 4A/B | IL-29 |
| APG5 | Cullin 4B | IL-3 |
| APG7 | Cutaneous Lymphocyte Antigen | IL-31 |
| APMAP | CUTL1 | IL-32[alpha][beta][gamma][delta] |
| Apo-2.7 | CX3CL1 | IL-32[alpha][beta][delta] |
| Apo-2.7 (7A6) | CX3CL1 | IL-33 |
| ApoE | CXCL1 | IL-34 |
| ApoE4 | CXCL10 | IL-4 |
| APOER2 | CXCL12[alpha] | IL-4R[alpha] |
| Apolipoprotein AI | CXCL12[beta] | IL-5 |
| Apolipoprotein AII | CXCL13 | IL-6 |
| Apolipoprotein AIV | CXCL9 | IL-7 |
| Apolipoprotein B | CXCL7 | IL-7R[alpha] |
| Apolipoprotein CIII | CXorf26 | IL-8 |
| Apolipoprotein D | Cyanine | IL-9 |
| Apolipoprotein E | CYB5R2 | ILF3 |
| Apolipoprotein F | CYB5R2 | ILK |
| Apolipoprotein H | Cyclin A | ILK1 |
| Apolipoprotein J | Cyclin A2 | Immunofluorescence-N-[gamma] |
| Apolipoprotein L1 | Cyclin B1 | IMP3 |
| Apolipoprotein M | Cyclin B2 | Importin9 |
| Apoptotic neutrophils | Cyclin D1 | Influenza A Virus M2 Protein |
| APP | Cyclin D2 | Influenza B Virus Nucleoprotein |
| Aquaporin 1 | Cyclin D3 | ING1 |
| Aquaporin 15 | Cyclin E | ING2 |
| ARF1 | Cyclin E2 | ING3 |
| ARF5 | Cyclin H | ING4 |
| ARFGAP1 | Cyclins D1/D2/D3 | Inhibin [alpha] |
| ARFRP1 | Cyclophilin 40 | iNOS |
| Argonaute-1 | CYLD | INPP4A |
| ARH | CysLT1 | INPP4B |
| ARHGAP25 | Cystatin C | Insulin |
| ARHGAP4 | Cystatin S | Insulin Degrading Enzyme (IDE) |
| ARL11 | Cytochrome B245 heavy chain | Insulin Receptor R |
| ARL5B | Cytochrome B245 light chain | Integrin [alpha]4/[beta]7 |

TABLE 3-continued

Cell surface markers for use with the hydrogel beads described herein.

| | | |
|---|---|---|
| ARPC5 | Cytochrome c | Integrin [alpha]9/[beta]1 |
| Artemis | Cytochrome P450 17A1 | Integrin [alpha]V/[beta]5 |
| Aryl hydrocarbon Receptor | Cytochrome P450 19A1 | Integrin [alpha]V/[beta]6 |
| ASB-1 | Cytochrome P450 1A2 | Integrin [beta]1 Phospho (Tyr783) |
| ASCC1 | Cytochrome P450 2A6 | Integrin [beta]1 Phospho (Tyr795) |
| ASCC2 | Cytochrome P450 2B6 | Integrin [beta]5 |
| ASGPR | Cytochrome P450 2C9 | Integrin [beta]6 |
| Asialo-GM1 | Cytochrome P450 2J2 | Integrin [beta]7 |
| ASK1 | Cytochrome P450 3A4 | Intercalated DNA |
| Asparagine synthetase | Cytochrome P450 3A5 | Intra-Acrosomal Protein |
| Ataxin 1 | Cytochrome P450 Reductase | Intra-Acrosomal Proteins |
| ATF1 | Cytokeratin | Invariant NK T |
| ATF2 | Cytokeratin (acidic) | IP10 |
| ATG4A | Cytokeratin (basic) | IQGA1 |
| ATG9A | Cytokeratin (Pan-reactive) | IRAK1 |
| ATIC | Cytokeratin 1 | IRAK3 |
| Atlantic Salmon Ig | Cytokeratin 10 | IRAK4 |
| ATM | Cytokeratin 10/13 | IRE1 |
| ATP citrate lyase | Cytokeratin 13 | IRF1 |
| ATP1B3 | Cytokeratin 14 | IRF3 |
| ATP5A | Cytokeratin 14/15/16/19 | IRF4 |
| ATP5H | Cytokeratin 15 | IRF5 |
| ATP5J | Cytokeratin 16 | IRF6 |
| ATP6V0D1 | Cytokeratin 18 | IRF7 (pS477/pS479) |
| ATP6V1B1 | Cytokeratin 19 | IRF8 |
| ATPB | Cytokeratin 2 | IRF9 |
| ATRIP | Cytokeratin 20 | IRS1 |
| Aurora A | Cytokeratin 4 | IRS1 (pY896) |
| Aurora A Phospho (Thr288) | Cytokeratin 4/5/6/8/10/13/18 | IRS2 |
| Aurora B | Cytokeratin 40 | IRS4 |
| Aurora B Phospho (Thr232) | Cytokeratin 5 | IRG15 |
| AVEN | Cytokeratin 5/6/18 | IRS20 |
| Avian Influenza A Neuraminidase | Cytokeratin 5/8 | ISL1 |
| Avidin | Cytokeratin 6 | Isthmin1 |
| Axin 2 | Cytokeratin 6a | ITCH |
| Axl | Cytokeratin 7 | Integrin [alpha]7 |
| B and Activated T Cells | Cytokeratin 7/17 | ITK |
| B Cell | Cytokeratin 8 | ITPR1 |
| B Cell Subset | Cytokeratin 8/18/19 | Jagged2 |
| B cells (pan reactive) | D4-GDI | JAK2 |
| B lymphocytes antibody [UCH-B1] | DAB2 | JAK3 |
| b-Endorphin | DACH1 | JAM2 |
| B-Raf Phospho (Thr598/Ser601) | DAND5 | JAML |
| B18R | DAP1 | Japanese encephalitis virus NS1 glycoprotein |
| B7-H4 | DAP12 | JNK |
| BACE1 | DAPK1 | JNK Phospho (Thr183/Tyr185) |
| BACE2 | DAPK2 | JNK1/JNK2/JNK3 |
| BACH1 | DARPP32 | JNK2 |
| baculovirus envelope gp64 protein | Daxx | Junctional Adhesion Molecule C |
| BAG1 | DAZL | Junctophilin-1 (C-term) |
| BAG2 | DBC1 | Junctophilin-1 (Mid) |
| BAG3 | DCAMKL1 | Junctophilin-2 (C-term) |
| BAG4 | DCC | Junctophilin-3 (Mid) |
| BAIAP2 | DCIR2 | KAP1 |
| BAK | DCLRE1B | KATNA1 |
| BAMBI | DCP1a | KCNH1 |
| BAP31 | DcR3 | KDEL |
| BAP37 | DCTN2 | KDM4D |
| basal cell Cytokeratin | DcTRAIL-R1 | Ki-67 |
| Basophils | DcTRAILS-R2 | KIF22 |
| Bassoon | DCXR | KIF3A |
| BATF | DDB1 | KIF4A |
| Bax | DDDDK tag | KIFA3 |
| BCAR1 | DDX3 | Kindlin2 |

TABLE 3-continued

Cell surface markers for use with the hydrogel beads described herein.

| | | |
|---|---|---|
| BCAR2 | DDX4 | Kinetoplastid Membrane Protein 11 (KMP-1)) |
| BCKD complex E2 subunit | DDX50 | KIR-2.1 |
| Bcl-10 | DECR1 | KIR-2D (pan CD158) |
| Bcl-2 | Dectin1 | KLF4 |
| Bcl-2 (pS70) | Dectin2 | KLF6 |
| Bcl-2 like 12 | DEF8 | KLH |
| Bcl-2 like 2 | Defensin [alpha]1 | KLHL11 |
| Bcl-22 | DELETE | KLRA3 |
| Bcl-2A1 | delta 1 Catenin | KLRC1 |
| Bcl-2[alpha] | Delta like protein 1 | KLRG1 |
| Bcl-3 | Delta like protein 4 | KMT4 |
| Bcl-6 | Delta Opioid Receptor | KMT5A |
| Bcl-xL | DeltaC | KOR-SA3544 |
| Bcl-XS/L | DeltaD | KS1/4 |
| BCR | Dendritic Cell Marker | Ksp37 |
| BCSC1 | Deoxycytidine kinase | KSR1 |
| BDH2 | Desmin | Ku70 |
| BDKRB2 | Desmoglein 2 | Ku70/80 |
| BDNF | Desmoglein 1 | Ku80 |
| Beclin1 | Desmoplakin | Kudoa Thyrsites |
| Bestrophin 3 | Destrin | Kunitz Protease Inhibitor |
| beta 2 Adrenoreceptor | Dextran | Kv4.2 |
| Beta 3 Adrenergic Receptor | DGKA | L/S-MAG |
| beta 3 Sodium Potassium ATPase | Dicer | Labeling Check Reagent |
| beta Actin | DISC1 (C-term) | Lactate Dehydrogenase |
| beta Arrestin 1 | DISC1 (Mid) | Lactate Dehydrogenase B |
| beta Arrestin 2 | Dishevelled 3 | Lambda |
| beta Catenin | Disialoganglioside GD2 | Lamin A |
| beta Catenin (npaa 27-37) | Disialoganglioside GD3 | Lamin A/C |
| beta Catenin (npaa 35-50) | Dkk1 | Lamin B Receptor |
| beta Catenin (pS45) | Dkk3 | Lamin B1 |
| beta Dystroglycan | DLC8 | Lamin B2 |
| beta galactosidase | DLK1 | Lamin C |
| beta galactosidase fusion proteins | Dlx5 | Laminin |
| beta Synuclein | DM-GRASP | Laminin 5 |
| beta2 Microglobulin | DMT1 | Laminin Receptor |
| BHMT | DNA-PKcs | Laminin [beta]1 |
| Bid | DNA-PKcs Phospho (Thr2609) | LAMP2a |
| Biglycan | DNAI1 | LAMP2b |
| Bilirubin Oxidase | DNAJA2 | LAT |
| Bim | DNAJB2 | LAT (pY171) |
| BimL | DNAJC3 | LAT (pY226) |
| BIN1 | DNAPK | LBP |
| BIN3 | DNM1L | LC3 |
| Biotin | Dnmt1 | LC3B |
| BiP | Dnmt3b | LCAT |
| BLBP | DNP | Lck |
| Blimp-1 | DOK2 | Lck (pY505) |
| BLK | DOK7 | LDH1 |
| BLNK | Dopamine Receptor D1 | LDH1/B/C |
| BLNK (pY84) | Dopamine Receptor D3 | LDL (MDA oxidized) |
| Blood Group A Antigen | Dopamine Receptor D5 | LDLR |
| Blood Group AB Antigen | Dopamine [beta] Hydroxylase | LEF1 |
| Blood Group B Antigen | Doublecortin | Leishmania LPG (repeat epitope) |
| Blood Group H ab Antigen | DP1 | Leishmania Major Surface Protease (GP-63) |
| Blood Group H ab Antigen/nAntigen | DPH2 | LEKTI |
| Blood Group H inhibitor | DPP10 | Leukemia Inhibitory Factor |
| Blood Group Lewis a | DPP3 | Leuktriene A4 hydrolase |
| Blood Group M Antigen | DPP9 | Leukotriene B4 Receptor |

TABLE 3-continued

Cell surface markers for use with the hydrogel beads described herein.

| | | |
|---|---|---|
| Blood Group N Antigen | Dppa4 | LHX3 |
| Blooms Syndrome Protein Blm | DPYD | LI-Cadherin |
| BM1 | DR3 | LIF |
| BMAL1 | DRAK1 | DNA Ligase I |
| BMI1 | DRAK2 | DNA Ligase II |
| Bmk | Drebin | LIM kinase 2 |
| BMP15 | DTYMK | LIME1 |
| BMP4 | DUSP23 | LIMK1 |
| BMP7 | DUSP27 | LIMS1 |
| BMPR1A | DUSP3 | Lin28 |
| BMPR2 | DUSP5 | Lineage Cocktail |
| BMX | DUSP6 | Lipin 1 |
| bMyc | DUX4 | LIS1 |
| BNIP2 | DYKDDDDK Epitope Tag | Liver Carboxylesterase 1 |
| BNIP3 | Dynamin | LKB1 |
| BNIP3L | Dynamin1 | LMO2 |
| BOB1 | Dynamitin | LOX |
| BORA | Dynein light chain 2 | LOX1 |
| Borealin | Dysbindin | LRP5/6 |
| *Borrelia burgdorferi* | Dysferlin | LRP6 |
| BPI | Dystrobrevin [alpha] | LRPAP1 |
| BRaf | Dystrobrevin [beta] | LSD1 |
| BRCA1 | Dystroglycan Phospho (Tyr893) | LSP1 |
| BRCC36 | *E. Coli* O/E | LSS |
| BRD3 | E2A-Pbx1 | LT[alpha] |
| BrdU | E2F1 | Luciferase |
| BRF1 | E47 | LXR[alpha] |
| BRG1 | E4BP4 | Ly-108 |
| BRN3A | Ea52-68 peptide bound to I-A | Ly-49A |
| Btk | Ea52-68 peptide bound to the I-A | Ly-49A/D |
| Btk (pY551)/Itk (pY511) | EAAT1 | Ly-49AB6 |
| BTLN-2 | Early B Lineage | Ly-49C/F/I/H |
| BTN1A1 | EBF1 | Ly-49C/I |
| Bu1 | EBI3 | Ly-49D |
| Bu1a | EBP50 | Ly-49E/F |
| Bu1a/Bu1b | ECGF1 | Ly-49F |
| Bu1b | ECH1 | Ly-49G |
| BubR1 | ECRG4 | Ly-49G2 |
| Bulb | EDA | Ly-49G2B6 |
| Butyrylcholinesterase | EDA-A2R | Ly-49H |
| C peptide | EDG1 | Ly-49I |
| C reactive protein | EDG2 | Ly-51 |
| C-EBP[beta] | EDG3 | Ly-6A.2/Ly-6E.1 |
| C1 Inhibitor | EDG6 | Ly-6A/E |
| C15orf40 | EEA1 | Ly-6b |
| C16orf72 | EEF1G | Ly-6B.2 |
| C1orf50 | EEF2 | Ly-6C |
| C1Q | EEF2K | Ly-6D |
| C1QA | EEN | Ly-6G |
| C1QB | EFEMP1 | Ly-6G/C |
| C1QC | EFEMP2 | Ly-6K |
| C1QG | Eg5 | Ly-77 |
| C1r | Eg5 Phospho (Thr927) | Lymphotoxin [beta] |
| C1s | EGF | Lymphotoxin [beta] Receptor |
| C20orf30 | EGF Receptor | Lyn |
| C20orf43 | EGF Receptor (pY1173) | LYRIC |
| C21orf56 | EGF Receptor (pY845) | Lysophopholipase 1 |
| C21orf59 | EGF Receptor (pY992) | Lysosomal acid lipase |
| C2orf43 | EGR1 | Lysozome |
| C3 | EGR2 | Lysozyme |
| C3aR | EGD1 | Lyve1 |
| C3b | eIF1 | M-CSF |
| C3c | eIF2C2 | M13 Bacteriophage Coat Protein g8p |
| C3d | EIF2S1 | M13 Bacteriophage Protein |
| C4 | eIF2[gamma] | MAA |
| C4 binding protein | eIF3 | Mac-2BP |
| C4b | eIF3D | macroH2A.1 |
| C4c | eIF3D (p66) | Macrophage |
| C4d | eIF3F | Macrophage Activator |

TABLE 3-continued

Cell surface markers for use with the hydrogel beads described herein.

| | | |
|---|---|---|
| C4orf42 | eIF3G | Macrophage galactose lectin |
| C5 | eIF3H (p40) | Macrophage/Granulocyte |
| C5aR1 | eIF3I (p36) | Macrophages/Monocytes |
| C5L2 | eIF3J | MAD2 |
| C6 | eIF3K | MadCAM1 |
| C6orf64 | eIF4B | MADD |
| C8A/B/G | eiF4E | MADH7 |
| C9 | eIF4E (pS209) | MAFB |
| C9orf41 | eIF4E2 | MAG |
| CA125 | eIF5A | MAGE-A |
| CA19.9 | eIF6 | MAGE1 |
| CAB39 | Elastase | MAIR2 |
| CACNA1S | Elk1 | MAIR4 |
| CACNA2 | Elk1 (pS383) | MALT1 |
| CACNG1 | ELK3 | Mammaglobin A |
| CAD | Elongin B | MAP1LC3A |
| Cadherin 1 | Elongin C | MAP2 |
| Cadherin 10 | EMAP II | MAP2B |
| Cadherin 11 | Embigin | MAP2K1IP1 |
| Cadherin 7 | EMG1 | MAP3K8 |
| Cadherin 8 | Emi1 | MAP4 Phospho (Ser768) |
| Cadherin 9 | EMR3 | MAP4K1 |
| Cadherin E | EMSY | MAP4K4 |
| Cadherin H | Ena/Vasp-like | MAPK12 |
| Cadherin K | EndoG | MAPK6 |
| Cadherin P | EndoGlyx-1 | MAPKAP Kinase 2 |
| Cadherin R | Endomucin | MAPKAP Kinase 2 Phospho (Thr334) |
| CAK C Terminus | Endothelial Cells | MARCKS |
| CAK N Terminus | Endothelial Lipase | MARCO |
| CAK Phospho (Ser164/Thr170) | Endothelial Venule Marker | Marginal Zone B Cells |
| Calbindin | Endothelium | MARK2 |
| Calcineurin A | Engrailed1 | MARK3 |
| Calcitonin Receptor | ENO1 | MART1 |
| Calcium Sensing Receptor | Enolase1 | Mast Cell |
| Caldesmon | eNOS | Mast Cell Protease 11 |
| Calgranulin A | eNOS (pS1177) | mature macrophage marker |
| Calgranulin B | Entpd2 | MBD1 |
| Calmodulin | Eomes | MBD2 |
| Calnexin-ER membrane marker | Eos | MBL |
| Calpain 1 | Epac1 | MCL1 |
| Calpain 2 | Eph Receptor A1 | MCM2 |
| Calpain 9 | Eph Receptor A2 | MCM3 |
| Calpain S1 (small subunit) | Eph Receptor A4 | MCM4 |
| Calpastatin | Eph Receptor B4 | MCM5 |
| Calponin | Eph Receptor B6 | MCM6 |
| Calreticulin | Ephrin A2 | MCM7 |
| Calretinin | Ephrin A3 | MCP-1 |
| Calsequestrin 2 | EPHX2 | MCP-4 |
| CaMKI | EPM2AIP1 | MCP-8 |
| CaMKII | EPOR | MCSF |
| CaMKII Phospho (Thr286) | EPS15R | MD1 |
| CaMKII[delta] | Epsin 1 | MD2 |
| CamKIV | Epsin 2 | MDC |
| CaMKI[alpha] | ER-HR3 | MECT1 |
| CAMLG | ER-MP54 | MEF2A |
| cAMP Protein Kinase Catalytic subunit | ER-TR7 | MEIS1 |
| cAMP Protein Kinase Catalytic subunit [alpha] | ER81 | MEK1 |
| Cannbinoid Receptor I | ERAB | MEK1 (p298) |
| Cannbinoid Receptor II | ERCC1 | MEK1 (pS218)/MEK2 (pS222) |
| CAP-G2 | ERG | Mek1/2 (pS222) |
| CAP18 | ERK1 | MEK2 |
| CAP2 | ERK1/2 (pT185/pY187) | MEK3 |
| CAP3 | ERK1/2 (pT202/pY204) | MEK4 |
| Carbonic Anhydrase I | ERK1/ERK2 | MEK5 |

TABLE 3-continued

Cell surface markers for use with the hydrogel beads described herein.

| | | |
|---|---|---|
| Carbonic Anhydrase IX | ERK2 | MEK6 |
| Carboxylesterase 1 | ERK5 | MEK7 |
| Carboxypeptidase A1 | ERMAP | MEKK1 |
| Carboxypeptidase A2 | ERp29 | MEKK2 |
| CARD11 | ERp72 | MEKK3 |
| CARD8 | Erthroid Cells | MEKK4 |
| CARD9 | Erzin/Radixin/Moesin | Melanoma |
| Cardiac Troponin T | ER[alpha] Phospho (Ser167) | MELK |
| CARKL | ESAM | MEMO1 |
| CARM1 | Estrogen Iducible Protein pS2 | Mena |
| Casein Kinase 1 [alpha] | Estrogen Receptor | Menin |
| Casein Kinase 1 [gamma]2 | Estrogen Receptor [alpha] | MEOX2 |
| Casein Kinase 2 | Estrogen Receptor [beta] | Merlin |
| Caspase 1 | Estrogen Related Receptor alpha | MERTK |
| Caspase 10 | ETAR | Mesothelin |
| Caspase 11 | Ethenoadenosine | Metallothionein |
| Caspase 12 | ETS1 | MetRS |
| Caspase 2 | EVI2A | mGluR5 |
| Caspase 3 | EWSR1 | MHC Class I |
| Caspase 4 | EXD1 | MHC Class I (H-2Db) |
| Caspase 5 | EXOSC3 | MHC Class I (H-2Dd) |
| Caspase 6 | EXOSC7 | MHC Class I (H-2Dk) |
| Caspase 7 | EYA2 | MHC Class I (H-2Dq/Lq) |
| Caspase 8 | EZH1/2 | MHC Class I (H-2Kb) |
| Caspase 9 | Ezrin | MHC Class I (H-2Kb/Db) |
| Catalase | Ezrin (pY353) | MHC Class I (H-2Kb/Dd) |
| Catechol-O-methyltransferase | F-actin | MHC Class I (H-2Kd a3 domain) |
| Cathepsin D | F10A1 | MHC Class I (H-2Kd) |
| Cathepsin K | F4/80 | MHC Class I (H-2Kd/Dd) |
| Cathepsin L | FAA4 | MHC Class I (H-2Kd/Dd/q/u/v) |
| Caveolin1 | FABP4 | MHC Class I (H-2Kk) |
| Caveolin1 (pY14) | Factor I | MHC Class I (H-2Kq) |
| Caveolin2 | Factor IX | MHC Class I (H-2Ks) |
| Cbl | Factor VIII.vWF (delete) | MHC Class I (H-2Ld) |
| CBP | Factor XIIIa | MHC Class I (H-2Ld/Dd) |
| CBWD1 | FADD | MHC Class Ib (H-M3) |
| CBX1 | FAHD2A | MHC Class II |
| cCB1 (pY700) | FAK | MHC Class II (DQ) |
| cCB1 (pY774) | FAK (pS910) | MHC Class II (DR) |
| CCDC98 | FAM119A | MHC Class II (I-A) |
| CCK4 | FAM175A | MHC Class II (I-A/E) |
| CCL11 | FAM84B | MHC Class II (I-Ab) |
| CCL17 | FAM91A1 | MHC Class II (I-Ab/Ad) |
| CCL18 | FANCC | MHC Class II (I-Ab/As) |
| CCL19-Fc | FANCD2 | MHC Class II (I-Ad) |
| CCL20 | Fanconi anemia D2 Phospho (Ser222) | MHC Class II (I-Ak) |
| CCL21 | FAP | MHC Class II (I-Ak/Ad/Ab/Aq/Ar) |
| CCL25 | Fascin | MHC Class II (I-Ak/As) |
| CCL3 | FBP1 | MHC Class II (I-Ap) |
| CCL5 | FBXO21 | MHC Class II (I-Aq) |
| CCL6 | FBXO31 | MHC Class II (I-E) |
| CCNB1IP1 | FBXO42 | MHC Class II (I-E[kappa]) |
| CCR10 | FBXO43 | MHC Class II (RT1B) |
| CCR11 | Fc Receptor Binding Inhibitor | MHC Class II (RT1Bu) |
| CCRD6 | FC receptor IgA + IgM | MHC Class II (RT1D) |
| CCRL2 | FcR | MHC Class II [beta] |
| CD1 | FcRL6 | MHC Qa1b |
| CD1.1 | FcRLA | MICA |
| CD10 | Fc[epsilon]RI | MICA/MICB |
| CD100 | FDC | MICB |
| CD101 | FDFT1 | Microfold (M) Cells |
| CD102 | FDPS | Microtubule Associated Protien 2ab |

TABLE 3-continued

Cell surface markers for use with the hydrogel beads described herein.

| | | |
|---|---|---|
| CD103 | FE65 | Microtubule Associated Protein RP/EB 2 |
| CD104 | FeLV p27 | Midkine |
| CD105 | FEN1 | Mineralocorticoid Receptor |
| CD106 | FER | MIP-1[beta] |
| CD107a | Ferritin Heavy Chain | MIPEP |
| CD107b | Ferritin Light Chain | Mitochondria |
| CD108 | Ferritin, mitochondiral | Mitofilin |
| CD109 | FES | Mitofusin 1 |
| CD11 | Fetal Hemoglobin | Mitofusin 2 |
| CD110 | FGF acidic | Mitotic Cells |
| CD111 | FGF basic | MKK6 |
| CD112 | FGF21 | MLH1 |
| CD113 | FGFR1 | MLK3 |
| CD114 | FGFR2 | MLL1 |
| CD115 | FGR | MLLT11 |
| CD116 | FH | MMP1 |
| CD117 | FHL1 | MMP10 |
| CD118 | Fibrillarin | MMP11 |
| CD119 | Fibrillin | MMP12 |
| CD11a | Fibrinogen | MMP13 |
| CD11a, strain polymorphism | Fibrinogen [alpha] chain | MMP14 |
| CD11a/CD18 | Fibrinogen [gamma] chain | MMP15 |
| CD11b | Fibrinopeptide A | MMP17 |
| CD1b/c | Fibrinopeptide B | MMP19 |
| CD11c | Fibroblast activation protein [alpha] | MMP2 |
| CD11d | Fibroblast Surface Protein | MMP20 |
| CD120a | Fibroblasts/Epithelial cells | MMP21 |
| CD120b | Fibronectin | MMP26 |
| CD121a | Fibronectin | MMP3 |
| CD121b | Fibulin5 | MMP8 |
| CD122 | Ficolin B | MMP9 |
| CD123 | Filaggrin | Mnk1 |
| CD124 | Filamin A | mNOS |
| CD125 | FITC | MnSOD |
| CD126 | FITC/Oregon Green | Moesin |
| CD127 | FIV | Monoamine Oxidase B |
| CD129 | FIV gp120 | Monocyte/Granulocyte |
| CD13 | FIV gp95 | Mononuclear Phagocyte |
| CD130 | FIV p24 | Mouse Embryonic Fibroblast (mEF) Feeder Cells |
| CD131 | FIV p24 gag | Mouse Lineage |
| CD132 | FKBP12 | MPP1 |
| CD133 | FKBP4 | MRCL3 |
| CD133/2 | FKBP6 | MRE11 |
| CD134 | FKBPL | MRGPR-X2 |
| CD135 | FLiC | MRI1 |
| CD136 | Flightless1 | MRP14 |
| CD137 | FLIP | MRP2 |
| CD137L | Flt3L | MRP3 |
| CD138 | Fluorescent Protein | MRP4 |
| CD139 | FLV gp70 | MRP5 |
| CD14 | FLYWCH2 | MRP6 |
| CD140a | FMC7 | MRP8 |
| CD140b | fMLP Receptor | MRP8/14 |
| CD140b (pY1009) | FMRP | MSC (W8B2) |
| CD140b (pY1021) | FNTA | MSC (W3D5) |
| CD140b (pY771) | FNTB | MSC (W5C5) |
| CD140b (pY857) | Follicular Dendritic Cells | MSC (W7C6) |
| CD141 | Fos | MSC/NPC |
| CD142 | FOXA1 | MSH2 |
| CD143 | FOXA2 | MSH6 |
| CD144 | FOXC2 | MSI2H |
| CD146 | FOXD3 | MSK1 |
| CD147 | FOXI1 | MST1 |
| CD148 | FOXJ1 | MST1/MST2 |
| CD15 | FOXM1 | MST3 |
| CD150 | FOXO1 | MST4 |
| CD151 | FOXO3A | MST4/MST3/STK25 |
| CD152 | FOXP1 | mTOR |
| CD153 | FOXP3 | Muc-16 |
| CD154 | FPRL1 | Muc-2 |
| CD155 | FR4 | Muc-3 |

TABLE 3-continued

Cell surface markers for use with the hydrogel beads described herein.

| | | |
|---|---|---|
| CD156c | Fra2 | Muc-4 |
| CD157 | Fragilis | Muc-7 |
| CD158a | FRAT1 | MULT-1 |
| CD158a/h | Frataxin | Munc13-4 |
| CD158b | Frequenin | Munc18 |
| CD158b1/b2/j | Frizzled-1 | MUPP1 |
| CD158d | FSH[alpha] | Mus81 |
| CD158e | FSH[beta] | Musashi1 |
| CD158e/k | FUK | Muscarinic Acetylcholine Receptor 2 |
| CD158e1 | FUS | muscle Actin |
| CD158e1/e2 | FXYD3 | Muscleblind-like 1 |
| CD158f | FYB | MVP |
| CD158g | Fyn | MYBBP1A |
| CD158h | Fyn (pY528)/c-Src (pY530) | MYBPC3 |
| CD158i | Fyn-Related Kinase | Myc tag |
| CD158j | FZR1 | MyD88 |
| CD159a | G-CSF | Myelin Basic Protein |
| CD159c | G3BP | Myelin oligodendrocyte glycoprotein |
| CD15s | G6PD | Myelin PLP |
| CD16 | GAB1 | Myeloid Antigen |
| CD16/32 | GAB2 | Myeloid Cell Nuclear Differentiation Antigen |
| CD16/56 | GABA B Receptor 2 | Myeloid Lineage |
| CD160 | GABARAP | Myocilin |
| CD161 | GAD65 | Myogenin |
| CD161a | GAD67 | Myosin heavy chain |
| CD162 | GADD34 | Myosin IIA |
| CD162R | Galacto-cerebroside | Myosin light chain 2 |
| CD163 | Galactocerebroside | Myosin light chain 3 |
| CD164 | Galectin 1 | Myosin light chain kinase |
| CD165 | Galectin 10 | Myosin Phosphatase |
| CD166 | Galectin 3 | Myosin Phosphatase 1/2 |
| CD167a | Galectin 4 | MYST2 |
| CD168 | Galectin 7 | NADH2 |
| CD169 | Galectin 8 | Naf1 |
| CD16b | Galectin 9 | NAK |
| CD17 | gamma Synuclein | Nanog |
| CD170 | Ganglioside GD2 | NAPE-PLD |
| CD171 | Ganglioside GD3 | NAT1 |
| CD172 | Ganglioside GM1 | Native Lipoteichoic Acid |
| CD172a | Gankyrin | Nariuretic Peptide Receptor A |
| CD172a/b | GAP | Natural Killer Cell |
| CD172b | GAP43 | Natural Killer Cell Activation Structures |
| CD172g | GAPDH | NBS1 |
| CD173 | GARP | NC1.1 |
| CD177 | GAS2 | NCF4 |
| CD178 | GAS7 | Nck |
| CD178.1 | GAT2 | NCOA1 |
| CD179a | GATA1 | NCOA2 |
| CD179b | GATA2 | NCX1 |
| CD18 | GATA3 | NDUFAF1 |
| CD180 | GATA4 | NDUFB4 |
| CD181 | GATM | NDUFS3 |
| CD182 | GBA3 | NEDD8 |
| CD183 | GBE1 | NEK2 |
| CD184 | GBP1 | NEK6 |
| CD185 | GBP2 | NEK7 |
| CD186 | GBP5 | NEK9 |
| CD19 | GC1qR | NEK9 Phospho (Thr210) |
| CD191 | GCDFP15 | Nestin |
| CD192 | GCDH | NETO2 |
| CD193 | GCK1 | Neurabin1 |
| CD194 | GCLM | Neuregulin1 |
| CD195 | GCN2 | Neuregulin3 |
| CD195 (cytoplasmic) | GCN5 | Neuroblastoma |
| CD195 Phospho (Ser337) | GCTM2 | NeuroD1 |
| CD195 Phospho (Ser349) | GDAP1L1 | NeuroD2 |
| CD196 | GDF15 | Neurofibromin |
| CD197 | Gelsolin | Neurofilament Heavy Protein |

TABLE 3-continued

Cell surface markers for use with the hydrogel beads described herein.

| | | |
|---|---|---|
| CD198 | Gemin1 | Neurofilament Medium Protein |
| CD199 | Gephyrin | Neurogenin 2 |
| CD1a | GFAP | Neurokinin 1 Receptor |
| CD1b | GFP | Neuron Specific Enolase |
| CD1b/c | GILZ | Neuronal Growth Factor Receptor |
| CD1c | GIMAP4 | Neurotensin Receptor 1 |
| CD1d | GIPR | NF[kappa]B p50/p105 |
| CD1d [alpha]GalCer Complex | GIT2 | NF[kappa]B p65 (pS536) |
| CD2 | GITRL | NFATc1 |
| CD20 | GLAST | NF[kappa]B p50 |
| CD200 | Gli1 | NF[kappa]B p50/p105 |
| CD200R | Glial Fibrilary Acidic Protein | NF[kappa]B p52/p100 |
| CD200R3 | Glicentin | NF[kappa]B p65 |
| CD201 | GLIPR1L1 | NF[kappa]B p65 (pS529) |
| CD202b | Glucagon | NG2 |
| CD203a | Glucocorticoid Receptor | NGF |
| CD203c | Glucocorticoid Receptor alpha | Nhedc2 |
| CD204 | Glucose 1 Dehydrogenase | NHERF1 |
| CD205 | Glucose 6 Phosphate Isomerase | Nicastrin |
| CD206 | GLUH1 | Ninein |
| CD207 | GLUT1 | Nitrotyrosine |
| CD208 | GLUT2 | NKG2A/C/E |
| CD209 | GLUT4 | NKG2AB6 |
| CD209b | GLUT5 | NKp80 |
| CD21 | Glutamate receptor 2 | NKX3.1 |
| CD21/CD35 | Glutamate receptor 2/3 | NM23A |
| CD210 | Glutamate receptor 3 | NMDA Receptor 2A |
| CD212 | Glutamate receptor 4 | NMDA Receptor 2B |
| CD213a1 | Glutaminase | NMDE2 |
| CD213a2 | Glutamine Sunthetase | NMDZ1 |
| CD217 | Glutaredoxin 2 | NMNA2 |
| CD218a | Glutathione NEM | nMyc |
| CD22 | Glutathione NEW | nNOS |
| CD22 (pY822) | Glutathione Peroxidase 1 | NNTM |
| CD22.2 | Glutathione Peroxidase 4 | Nociceptin |
| CD220 | Glutathione Reductase | Nod2 |
| CD220[alpha] | Glutathione S Transferase [theta]2 | Nodal |
| CD221 | Glutathione S Transferase [kappa]1 | Noggin |
| CD221 (pY1131) | Glutathione S Transferase [mu] | NONO |
| CD222 | Glutathione Synthetase | Nonspecific Cytotoxic Cells |
| CD223 | Glycogen synthase 1 | Notch1 |
| CD224 | Glycoprotein IX | Notch2 |
| CD226 | Glycoprotein VI | Notch3 |
| CD227 | GM-CSF | Notch4 |
| CD229 | GM130 | NOX2 |
| CD229.1 | GM3.2 | NOX4 |
| CD23 | GNB2 | NOXA2 |
| CD230 | GNB2L1 | NPC |
| CD231 | GNLY | NPM-ALK |
| CD233 | GNMT | NPM/B23 Phospho (Thr199) |
| CD234 | GnRHR | NPM/B23 Phospho (Thr234/Thr237) |
| CD235a | Golgi Protein (58K) | NPY5R |
| CD235ab | Golgi Zone | NQO1 |
| CD236 | GOLM1 | NR2E1 |
| CD239 | GOLPH2 | NRC2C |
| CD24 | GOSR1 | Nrf2 |
| CD240CE | gp340 | NRG3 |
| CD240DCE | gp49R | NSPA/B |
| CD243 | GPA33 | NTAL |
| CD244 | GPCR5C | NTF97 |
| CD244.1 | GPR-120 | Nucleolin |
| CD244.2 | GPR-143 | Nucleolin Phospho (Thr76/Thr84) |
| CD245 | GPR-151 | Nucleophosmin |
| CD246 | GPR-18 | NUDC |
| CD247 | GPR-30 | NUMA1 |

TABLE 3-continued

Cell surface markers for use with the hydrogel beads described herein.

| | | |
|---|---|---|
| CD247 (pY142) | GPR-40 | Nur77 |
| CD249 | GPR-48 | O acetyl GD3 |
| CD25 | GPR-49 | Oct2 |
| CD252 | GPR-50 | Oct3/4 |
| CD253 | GPR-56 | Oct3/4A |
| CD254 | GPR-73A | Oct4 |
| CD255 | GPR-73B | ODAG |
| CD256 | GPR-77 | OGDH |
| CD257 | GPR-83 | OLIG1 |
| CD258 | GPR-86 | OLIG2 |
| CD26 | GPR-C5C | Oligodendrocyte Marker |
| CD261 | GPR-C5D | Oligodendrocyte Marker O1 |
| CD262 | Granulin | Oligodendrocyte Marker O4 |
| CD263 | Granulysin | Oncostatin M Receptor |
| CD264 | Granzyme A | Orai1 |
| CD265 | Granzyme B | OSCAR |
| CD266 | Granzyme K | OSR1 |
| CD267 | GRAP2 | Osteonectin |
| CD268 | GRASP1 | Osteopontin |
| CD269 | GRASP65 | Osteoprotegerin |
| CD27 | GRB2 | Otx2 |
| CD270 | GRB7 | OVA (SIINFEKL) H-2Kb |
| CD271 | GRHPR | Oval Cell Marker |
| CD272 | GRIM19 | Ovalbumim |
| CD273 | GRK1 | Ovarian Carcinoma-associated Antigen |
| CD274 | GRK2 | OX-62 |
| CD275 | GRK3 | p110[delta] |
| CD276 | GRK5 | p120 Catenin |
| CD277 | GRK6 | p120 Catenin (pS268) |
| CD278 | Growth hormone receptor | p120 Catenin (pS288) |
| CD279 | GRP170 | p120 Catenin (pS879) |
| CD28 | GRP94 | p120 Catenin (pT310) |
| CD280 | GSC | p120 Catenin (pT916) |
| CD281 | GSK3[alpha] | p120 Catenin (pY228) |
| CD282 | GSK3[alpha]/[beta] | p13 |
| CD283 | GSK3[beta] | p130 |
| CD284 | GSPT2 | p130 Cas |
| CD284/MD2 Complex | GST | p130 Cas (pY249) |
| CD286 | GST Epitope Tag | p14ARF |
| CD289 | GSTA4 | p150, 95 |
| CD29 | GTF2D1 | p19ARF |
| CD290 | GTPase HRAS | p21 |
| CD294 | GTPBP4 | p22phox |
| CD298 | Guanylate kinase | p23 |
| CD299 | H-2 | p27Kip1 |
| CD2a | H-2.m31 | P2RX4 |
| CD3 | H-2Db | P2RY8 |
| CD3/CD44 | H-2Dd | P2X3 |
| CD30 | H-2Kd | P2X7 |
| CD300 | H2-M | P2Y6 |
| CD300a | H2-M3 | p34Cdc-2 |
| CD300e | H2A.X | p38 |
| CD300f | H2A.X Phospho (Ser139) | p38 MAPK (pT180/pY182) |
| CD301 | H2A1J | p400 |
| CD303 | H60 | p53 |
| CD303a | HA tag | p53 Acetylated (Lys305) |
| CD304 | HADHA | p53 Acetylated (Lys382) |
| CD305 | HADHA/HADHB | p53 Phospho (Ser15) |
| CD307d | HADHB | p53 Phospho (Ser37) |
| CD309 | HADHSC | p53 Phospho (Ser392) |
| CD31 | HAND1 | p53BP1 (Ser1778) |
| CD310 | HAO1 | p57Kip2 |
| CD312 | Haptoglobin | p60 CAF1 |
| CD314 | HARS | p62 |
| CD314 (activating) | HARS2 | p63 |
| CD314 (blocking) | HBF | p63 (TA) |
| CD317 | hCG[alpha] | p70 S6 Kinase [beta] |
| CD318 | hCG[beta] | p90 Rsk |
| CD319 | hCG[beta]4 | p90 Rsk Phospho (Thr368/Ser372) |
| CD32 | HCN4 | p95 NBS1 |
| CD321 | HDAC1 | p97 |
| CD323 | HDAC10 | PA28[gamma] |

TABLE 3-continued

Cell surface markers for use with the hydrogel beads described herein.

| | | |
|---|---|---|
| CD324 | HDAC2 | PABP1 |
| CD325 | HDAC3 | PABP2 |
| CD326 | HDAC4 | PABPN1 |
| CD328 | HDAC6 | PAC1 |
| CD329 | HDAC9 | PAD2 |
| CD32B | HDHD1A | PAG1 |
| CD33 | HDHD2 | PAK1 |
| CD334 | HDJ2 | PAK2 |
| CD335 | HDLBP | PAK3 |
| CD336 | HE4 | pan Actin |
| CD337 | HEC1 | pan Macrophage |
| CD338 | HEF1 | Panendothelial Cell Antigen |
| CD339 | Helios | PAR1 |
| CD34 | Hematopoiesis related Macrophage | Parainfluenza Virus type 1 |
| CD340 | Hematopoietic Lineage Cocktail | Parainfluenza Virus type 2 |
| CD344 | Hematopoietic Progenitor Cell | Parainfluenza Virus type 3 |
| CD349 | Hemoglobin | PARC |
| CD35 | Hemoglobin F | PARD3 |
| CD351 | Hemoglobin subunit [alpha] | PARK7/DJ1 |
| CD354 | Hepatitis B Virus | PARP, Cleaved Form |
| CD357 | Hepatitis B Virus Core Antigen | PARP16 |
| CD358 | Hepatitis B Virus E Antigen | PARP4 |
| CD36 | Hepatitis B Virus Surface Antigen (Ad/Ay) | PARVA |
| CD360 | Hepatitis C Virus | Pax2 |
| CD361 | Hepatitis C Virus Core Antigen | Pax5 |
| CD36L1 | Hepatitis C Virus NS4 | Pax6 |
| CD37 | Hepsin | Pax7 |
| CD38 | HER2 | Pax8 |
| CD39 | HER3 | Pax9 |
| CD39L4 | HER4 | Paxillin |
| CD3D | Hes1 | Paxillin Phospho (Tyr118) |
| CD3G | Hexokinase | Paxillin Phospho (Tyr31) |
| CD3[gamma] | Hexokinase1 | PBEF |
| CD3[delta] | Hexokinase2 | PBK |
| CD3[epsilon] | HFE1 | PBP |
| CD3[epsilon] (CD3 Molecular Complex) | HGF | PBR |
| CD4 | HGFA Inhibitor 1 | PBX3 |
| CD4 (domain 1) | HHEX | PCB |
| CD4 (domain 2) | HHV8 GPCR | PCNA |
| CD4 v4 | HIBCH | PCYT1A |
| CD40 | HID1 | PD-1H |
| CD40bp | HIF-1[alpha] | PD-ECGF |
| CD41 | HIF-2[alpha] | PDC-TREM |
| CD41/CD61 | HIF1AN | PDCD4 |
| CD41a | HINT1 | PDCD6 |
| CD41b | HIP2 | PDE3B |
| CD42a | HIPK2 | PDECGF |
| CD42b | Hippocalcin | PDGF-AA |
| CD42d | Histamine H3 Receptor | PDI |
| CD43 | Histocytes | PDK1 |
| CD44 | Histone H1 | PDK2 |
| CD44 (v3) | Histone H1.0 | PDPK1 |
| CD44 (v4) | Histone H2A | PDPK1 (pS241) |
| CD44 (v5) | Histone H2B | PDX1 |
| CD44 (v6) | Histone H2B type 1B | PDZK1 |
| CD44 (v7) | Histone H3 | PE |
| CD44.2 | Histone H3 Phospho (Ser10) | PECR |
| CD44std | Histone H3 Phospho (Ser28) | PEI-Transferrinfection |
| CD44v6 | Histone H3.3 | Pellino 1 |
| CD44var (v10) | Histone H4 | Pentraxin 3 |
| CD44var (v3) | HIV1 Core Antigen | PEPD |
| CD44var (v3-v10) | HIV1 p17 | Perforin |
| CD44var (v4) | HIV1 p24 | Peroxiredoxin 1 |
| CD44var (v5) | HIV1 p55/p17 | Peroxiredoxin 2 |

TABLE 3-continued

Cell surface markers for use with the hydrogel beads described herein.

| | | |
|---|---|---|
| CD44var (v6) | HIV1 tat | Peroxiredoxin 6 |
| CD44var (v7) | HL60 | PEX5 |
| CD44var (v7-v8) | HLA Class I | PF4 |
| CD45 | HLA-2Kb/2Db | PGC1[alpha] |
| CD45.1 | HLA-2kb/2Db | PGIS |
| CD45.2 | HLA-A | PGP9.5 |
| CD45R | HLA-A/B/C | PGRP-Ia |
| CD45RA | HLA-A1/A11/A26 | PGRP-S |
| CD45RB | HLA-A1/A36 | PHD1 |
| CD45RC | HLA-A10/A11 | PHD2 |
| CD45RO | HLA-A10/A28/B75 | Phosphatidylserine |
| CD46 | HLA-A10/B62/B71 | Phospho SHIP |
| CD47 | HLA-A11 | Phospholipase A2 activator protein (PLAP) |
| CD48 | HLA-A2 | Phospholipase C [beta]3 |
| CD49a | HLA-A2/A25/A32 | Phospholipase C [gamma]1 |
| CD49a/CD29 | HLA-A2/A28 | Phospholipase D1 |
| CD49b | HLA-A2/A3/A29 | Phosphoserine/threonine/tyrosine |
| CD49b/CD29 | HLA-A2/A69 | Phosphotyrosine |
| CD49b/CD61 | HLA-A2/B17 | PI 3 Kinase catalytic subunit [alpha] |
| CD49c | HLA-A2/B5 | PI 3 Kinase catalytic subunit [gamma] |
| CD49d | HLA-A2/B57 | PI 3 Kinase p110 [beta] |
| CD49d/CD29 | HLA-A23/A24 | PI 3 Kinase p110 [delta] |
| CD49e | HLA-A24/A11/A2403 | PI 3 Kinase p150 |
| CD49e/CD29 | HLA-A25 | PI 3 Kinase p85 [alpha] |
| CD49f | HLA-A25/A26 | PI 3 Kinase [beta] |
| CD49f/CD29 | HLA-A25/A26/A34 | PIAS1 |
| CD4[alpha] | HLA-A25/A32 | PIAS3 |
| CD5 | HLA-A26/A34/B71/B62 | PICK1 |
| CD5.1 | HLA-A29 | PIM1 |
| CD5.2 | HLA-A3 | PIM2 |
| CD5.6 | HLA-A30/A31 | Pin1 |
| CD50 | HLA-A33/B8 | PINK1 |
| CD51 | HLA-A34/B71/A26 | PIP5K2[alpha] |
| CD51/61 | HLA-A9 | PIP5KI[gamma] |
| CD52 | HLA-A9/A25/A32 | PIR-A/B |
| CD53 | HLA-A9/A32/B13 | Pirh2 |
| CD54 | HLA-B | PIST |
| CD55 | HLA-B12 | PiTX3 |
| CD56 | HLA-B13/B62/B15 | PIWIL2 |
| CD57 | HLA-B14 | PKA RII[alpha] (pS99) |
| CD58 | HLA-B17 | PKA RII[beta] (pS114) |
| CD59 | HLA-B17/B35/B44 | PKA2[beta] |
| CD59a | HLA-B21/B70/B55 | PKAR2 |
| CD6 | HLA-B27/B44/B47 | PKA[gamma] |
| CD60b | HLA-B35/B57/B75/B77 | PKC |
| CD61 | HLA-B44/B75/B17 | PKCq |
| CD62E | HLA-B48/B60 | PKC[alpha] |
| CD62L | HLA-B5/B49/B56 | PKC[alpha] (pT497) |
| CD62P | HLA-B7 | PKC[alpha] (pT638) |
| CD63 | HLA-B8 | PKC[beta] |
| CD64 | HLA-B8/B14 | PKC[beta]2 |
| CD64 a,b alloantigens | HLA-BC | PKC[gamma] |
| CD64.1 | HLA-Bw4/A9/A32 | PKC[delta] |
| CD65 | HLA-Bw6 | PKC[epsilon] |
| CD65 (CD65 sialylated) | HLA-Bw6/B77 | PKC[zeta] |
| CD66 | HLA-class I free chain | PKC[theta] |
| CD66a | HLA-D | PKC[eta] |
| CD66a/b/c/e | HLA-DM | PKN |
| CD66a/b/c/d | HLA-DO | PKN2 |
| CD66a/c/d/e | HLA-DP | PKR |
| CD66a/c/e | HLA-DQ | PKX1 |
| CD66a/e | HLA-DQ/DR | PLA2G1B |
| CD66b | HLA-DQ1/DQ3 | Placental alkaline phosphatase |
| CD66c | HLA-DQ1/DR7 | Placental Protein 14 |
| CD66c/e | HLA-DQ3 | Plakophilin 3 |
| CD66e | HLA-DQ6 | Plastin L |
| CD66f | HLA-DQ7 | Platelet |
| CD68 | HLA-DQA1 | PLAU |
| CD69 | HLA-DQB1 | PLC[gamma]1 |
| CD7 | HLA-DQw1 | PLC[gamma]1 (pY783) |
| CD70 | HLA-DR | PLC[gamma]2 |

TABLE 3-continued

Cell surface markers for use with the hydrogel beads described herein.

| | | |
|---|---|---|
| CD70b | HLA-DR/DP | PLC[gamma]2 (pY759) |
| CD71 | HLA-DR/DP/DQ | Plectin |
| CD72 | HLA-DR1 | Pleiotrophin |
| CD72 a, b, c alloantigens | HLA-DR11 | PlexinA1 |
| CD72 b, c alloantigens | HLA-DR3/DR6 | PlexinB2 |
| CD72.1 | HLA-4 | PLGF |
| CD73 | HLA-DR7 | PLK1 |
| CD74 | HLA-DR7/DR[beta] | PLK1 Phospho (Thr210) |
| CD75 | HLA-DR8/DR12 | PLK4 |
| CD77 | HLA-DR9 | PLSCR1 |
| CD78 | HLA-DRA | PLVAP |
| CD79a | HLA-DR[beta] | PLZF |
| CD79b | HLA-DR[beta]3 | PMCA(1-4) |
| CD8 | HLA-E | PMCA4 |
| CD80 | HLA-G | PMEL17/SILV |
| CD81 | HLCS | PMN |
| CD82 | HLF | PMP70 |
| CD83 | HLXB9 | PMS2 |
| CD84 | HMG14 | PNAd |
| CD85 | HMG17 | PNPH |
| CD85a | HMG4 | Podocalyxin |
| CD85d | HMGB1 | Podoplanin |
| CD85g | HMGB2 | POKEMON |
| CD85h | HMOX1 | Polyhistidine Tag |
| CD85j | HMOX2 | PON1 |
| CD85k | HNF4[alpha] | PON3 |
| CD86 | hnRNPA1 | PP2A[alpha] |
| CD87 | hnRNPC1/C2 | PP2A[alpha][beta] |
| CD88 | hnRNPD | PPM1A |
| CD89 | hnRNPK | PPP1A |
| CD8[alpha] | hnRNPL | PPP5C |
| CD8[alpha].1 | hnRNPU | PPP6C |
| CD8[alpha].2 | hnRNPUL1 | PR3 |
| CD8[beta] | Homing Receptor | PRA1 |
| CD9 | HOXB4 | PRC1 |
| CD90.1 | HOXB5 | Pre-BCR |
| CD90.2 | HP1[alpha] | Pre-T Cell Receptor [alpha] Chain |
| CD90.9 | Hpa1 | Prealbumin |
| CD91 | HPa2 | Presenilin1 |
| CD91[alpha] | HPD | Presenilin2 |
| CD91[beta] | HPd1 | Prion protein PrP |
| CD93 | HPd2 | PRKRA |
| CD94 | HPi1 | PRLR |
| CD95 | HPi2 | PRMT1 |
| CD96 | HPi3 | PRMT5 |
| CD97 | HPi4 | pro Relaxin 1/2 |
| CD98 | HPR1 | pro Relaxin 2 |
| CD98hc | HPRT1 | Profilin1 |
| CD99 | HPV16 E1/E4 | Progesteron Receptor |
| CD99R | HPx1 | Prohibitin |
| Coagulation Factor VII | DSCAM-L1 | Eph Receptor A5 |
| CXCL1/2/3 | FLRT1 | Ephrin B2 |
| DDR2 | Frizzled-6 | CD316 |
| DPCR1 | Glypican1 | Kremen1 |
| Dipeptidyl peptidase 6 | IGSF4B | Eph Receptor B1 |
| Epithelial membrane protein 3 | IL-1R9 | PlexinB3 |
| Endoglycan | BAZ2B | DMBT1 |
| Calgranulin C | BRD4 | FcRn |
| FATP2 | Kell | LIMPII |
| FATP5 | Kremen2 | MUCDHL |
| FcRLB | LAX1 | Patched1 |
| GLP-2R | CD85c | SLC39A4 |
| GLUT3 | MIF | IGSF4A |
| Glypican6 | Neprilysin2 | PRAT4B |
| GPR-22 | OBCAM | HHV8-ORF74 |
| GPR-37 | PlexinC1 | 4E-BP1 Phospho (Thr36/45) |
| GPR-37L1 | RGM-B | 4E-BP1 Phospho (Thr69) |
| INSRR | Wilms' Tumor protein 1 | DCAR1 |
| LINGO1 | Xg | Von Hippel-Lindau |
| LINGO2 | DCBLD2 | Isotype Control |
| mGluR2 | ASAM | Granzyme M |
| mGluR7 | Desmocollin1 | REA Isotype Control |
| MMP25 | Frizzled-3 | CD300LG |

TABLE 3-continued

Cell surface markers for use with the hydrogel beads described herein.

| | | |
|---|---|---|
| Neuromedin B Receptor | MMP24 | MR1 |
| NRAGE | TOR | CD327 |
| Osteoactivin | WNT3a | B7-H6 |
| Porimin | Glypican5 | CLEC4G |
| Prokineticin Receptor 1 | Jagged1/Jagged2 | BATF3 |
| Prominin2 | Pax3 | IL-38 |
| Semaphorin 3A | CELSR2 | Monocarboxylic Acid Transporter 1 |
| SLAP-130 | Cyclin D1/D2 | MC5R |
| Somatostatin Receptor 5 | PlexinA2 | TCF7 |
| SCARF1 | TAFA5 | TM4SF1 |
| STAMP2 | FR4 | GPR-49 (CRL Region) |
| TAFA3 | CD315 | CD156a |
| TAFA4 | NKG2I | ADAM33 |
| TM4SF18 | RAMP2 | ADAMTS13 |
| Tuberous Sclerosis 1 | TNFRH3 | CCL16 |
| TCF8 | Biotin | CXCL17 |
| CMG2 | GPVI | Deltex1 |
| IL-17D Receptor | MS4A4B | FBXO15 |
| Macrophage Stimulating Protein Receptor | PIR-B | GPR34 |
| Siglec-11 | Semaphorin 4F | GPRC5A |
| Syndecan3 | IL-1F6 | Proinsulin |
| TGF-[beta]R3 | CD39L3 | JAK1 |
| CD85e | Contactin 3 | MEP1A |
| SOX7 | CLEC4B | Hypocretin receptor 2 |
| Activin A Receptor Type IA | MC3R | p70S6K |
| Carbohydrate Sulfotransferase 15 | PGRP-L | RAE-1[epsilon] |
| CD300b | PLET1 | STRA6 |
| CELSR3 | ADAM9 | Fc[gamma]RIIA |
| Coagulation Factor II | AMIGO3 | Insulin R/IGF-I R Heterotetramer |
| DC-SCRIPT | CD99-L2 | SPARCL1 |
| CD79[alpha]cy | CD92 | XBP1 |
| Prokineticin 1 | SULT1A1 | XBP1 (COOH terminus) |
| Prokineticin 2 | SULT1A3/SULT1A4 | XBPs |
| Prolactin | SULT1C2 | XCL1 |
| ProMBP1 | SULT2A1 | XIAP |
| Prostaglandin D2 Receptor | SUMO1 | XPC |
| Prostaglandin dehydrogenase 1 | SUMO2 | XPNPEP3 |
| Prostaglandin E Receptor EP3 | SUMO3 | XRCC2 |
| Prostate Cell Surface Antigen | SUN1 | XTP4 |
| Prostate Specific Antigen | Supperssor of Fused | YAP1 |
| Prostatic Acid Phosphatase | SUPT16H | YB1 |
| Proteasome 20S C2 | Survivin | YES1 |
| Proteasome 20S [alpha]2 | Survivin Phospho (Thr34) | YY! |
| Proteasome 20S [alpha]3 | SV40 Large T and Small t Antigens | ZAP-70 |
| Proteasome 20S [alpha]5 | SWC1a | ZAP-70 (pY292) |
| Proteasome 20S [alpha]6 | SWC6 | ZAP-70 (pY319) |
| Proteasome 20S [alpha]7 | SYBL1 | ZAP-70 (pY319)/ Syk (pY352) |
| Proteasome 20S [alpha]1/2/3/5/6/7 | Syk | ZBP-1 |
| Protein A | Syk (pY348) | ZIPK |
| Protein G | Synapsin I | ZO-1 (Mid) |
| Protein Kinase D2 | Synapsin II | ZONAB (Mid) |
| Protein Phosphatase 1 [beta] | Synaptojanin2 | Zyxin |
| Protein phosphotase inhibitor 1 | Synaptophysin | IL-33R |
| Protein S | Syndecan4 | Globo H |
| Proteinase Activated Receptor 4 | SynGAP | CCL8 |
| Prothrombin | Synip | Siglec-G |
| PSA-NCAM | Syntaxin | CD307e |
| PSD95 | Syntaxin6 | CLEC6 |

TABLE 3-continued

Cell surface markers for use with the hydrogel beads described herein.

| | | |
|---|---|---|
| Pseudomonas Aerugionsa | Syntrophin | Snail1 |
| PSMA | SYWC | SMAD1 (pS463/pS465)/ |
| | | SMAD8 (pS465/pS467) |
| PSMD14 | T cells (pan reactive) | SMAD2 (pS465/pS467)/ |
| | | SMAD3 (pS423/pS425) |
| Psoriasin | T Lymphocytes | GSK-3[beta] (pY216) |
| PTAFR | T- and B-Cell Activation Antigen | NKX6.1 |
| PTBP1 | T7 tag | FAK (pY397) |
| PTEN | TAB1 | Btk (pY223)/Itk (pY180) |
| PTGER2 | TACE | ERK3 |
| PTGER4 | TACI | CD276[beta] |
| PTHLH | TAF172 | MCP-3 |
| PTK7 | TAF250 | FcÂμR |
| PTP1B | TAG72 | CD238 |
| PTP4A2 | Talin1 | beta2 Microglobulin [b, c] |
| PTPS | Talin2 | Nucleostemin |
| PTP[mu] | Tamm Horsfall (Uromucoid) | GPR-49 (Central LRR) |
| PTRH2 | TANK1 | GPR-49 (N-Terminal) |
| PU.1 | TAP1 | Phospholipase C [beta]4 |
| PU60 | TAP2 | coilin |
| PUMA | TARDBP | HNF1[beta] |
| PUMA[gamma] | TARP | Trinitrophenal |
| Pumilio1 | Tartrate-resistant acid phosphatase | Annexin VII |
| Pumilio2 | TAS1R1 | CD301a |
| PCR | Tau | CD301b |
| PYCARD | TBA1B | mTOR (pS2448) |
| Pygopus2 | Tbet | PI16 |
| Pyk2 | TBK1 (pS172) | MSC (W5C5) |
| Pyk2 (pY402) | TBX1 | LAMP5 |
| Pyruvate Dehydrogenase E1[alpha] | TC10 | GPR-19 |
| Pyruvate Dehydrogenase E2 | TCF3 | FPRL2 |
| Pyruvate Dehydrogenase E2/E3bp | TCF7L1 | CXCL5 |
| q2 | TCF7L2 | PAR2 |
| Qa1(b) | TCL1 | PDGF-R[alpha] |
| Qa2 | TCP1[alpha] | ULBP6 |
| RAB11A | TCP1[beta] | ULBP2/5/6 |
| RAB25 | TCR | IL-17B Receptor |
| RAB27A | TCR DO11.10 | ULBP3 |
| RAB4 | TCR HY | Arginase 1 |
| RAB5a | TCR V[alpha]11 | Alkaline Phosphatase |
| RAB9 | TCR V[alpha]11.1/11.2b, d | ULBP3 |
| Rac1 | TCR V[alpha]2 | TrkB |
| Rac1/Cdc42 | TCR V[alpha]24 | Osteocalcin |
| RAD17 | TCR V[alpha]24-J[alpha]18 | IL-22R[alpha]1 |
| RAD17 Phospho (Ser645) | TCR V[alpha]3.2 | APJ |
| RAD23A | TCR V[alpha]3.2b, c | IFN-[alpha]/[beta] Receptor Subunit 2 |
| RAD51 | TCR V[alpha]7.2 | FGFR3 |
| RAD54 | TCR V[alpha]8 | SR-A1 |
| RAD9A | TCR V[alpha]8.3 | Rae-1 (pan) |
| Radixin | TCR V[beta]1 | CXCL12 |
| RAE-1[gamma] | TCR V[beta]10a | TREM2 |
| RAE-1[delta] | TCR V[beta]10b | Brachyury |
| RAF1 | TCR V[beta]11 | CLEC5A |
| RAGE | TCR V[beta]12 | Integrin [alpha]7 |
| RAIDD | TCR V[beta]12b | Mer |
| Rainbow Trout Ig | TCR V[beta]13 | XCR1 |
| RalBP1 | TCR V[beta]13.1 | AML2 |
| RanBP9 | TCR V[beta]13.2 | von Willebrands factor A2 |
| RanGAP1 | TCR V[beta]13.6 | MMP7 |
| RAP1A/RAP1B | TCR V[beta]14 | GLP-1R |
| RAP1GAP | TCR V[beta]16 | FR1 |
| Raptor | TCR V[beta]17 | IL-1RAcP |
| RAR[alpha] | TCR V[beta]17[alpha] | Claudin-6 |
| RAS | TCR V[beta]18 | Leptin Receptor |
| RASGAP | TCR V[beta]2 | Caherin 6 |
| RASGRF1 | TCR V[beta]20 | IL-1R type II |
| RASSF1A | TCR V[beta]21.3 | Nectin4 |
| Rb | TCR V[beta]22 | Delta like protein 3 |

TABLE 3-continued

Cell surface markers for use with the hydrogel beads described herein.

| Col1 | Col2 | Col3 |
|---|---|---|
| Rb (a.a. 332-344) | TCR V[beta]23 | ChemR23 |
| Rb (pS780) | TCR V[beta]3 | GPR-39 |
| Rb (pS780pS811) | TCR V[beta]4 | CD158b2 |
| RbAp46 | TCR V[beta]5 | IL-10R[alpha] |
| RbAp48 | TCR V[beta]5.1 | LRIG1 |
| RBC | TCR V[beta]5.1/5.2 | Neuropilin2 |
| RBC (Polyclonal Rabbit) | TCR V[beta]5.2 | IL-10R[beta] |
| RBM35A | TCR V[beta]5.3 | IL-18R[beta] |
| RBP4 | TCR V[beta]6 | GPR-44 |
| RBX1 | TCR V[beta]7 | Eph Receptor B2 |
| RCC1 | TCR V[beta]7.1 | Glypican3 |
| RcRL6 | TCR V[beta]7.2 | IFN-[gamma]R2 |
| Red Blood Cell | TCR V[beta]8 | IL-17C Receptor |
| Relaxin 1 | TCR V[beta]8.1/8.2 | BMPR1B |
| Relaxin 1/2 | TCR V[beta]8.2 | IL-31RA |
| Relaxin 2 | TCR V[beta]8.2/8.3 | OCIL |
| RelB | TCR V[beta]8.2/8.4 | Frizzled-7 |
| RELM[beta] | TCR V[beta]8.3 | IL-26 |
| RELT | TCR V[beta]8.5 | GPR-15 |
| Renin | TCR V[beta]9 | PlexinD1 |
| RENT1 | TCR V[gamma]1.1 | CD158 |
| Reptin | TCR V[gamma]1.1/[gamma]1.2 | FPR1 |
| Repulsive Guidance Molecule C | TCR V[gamma]2 | HBEGF |
| Resistin | TCR V[gamma]3 | Vitamin D3 |
| REST | TCR V[gamma]9 | PlexinB1 |
| Ret | TCR V[delta]1 | Somatostatin Receptor 2 |
| Reticular Fibroblasts and Reticular Fibres | TCR V[delta]2 | OV-6 |
| Reticulon1A | TCR V[delta]4 | CXCL16 |
| Reticulum Cells | TCR V[delta]6.3/2 | Siglec-E |
| Retinoblastoma 1 | TCR [alpha] | EDG5 |
| RFLAT1 | TCR [alpha][beta] | Ninjurin-1 |
| RFP | TCR [beta] | Integrin [alpha]9 |
| RGS6 | TCR [gamma][delta] | MHC Class II (I-Ed/j/k/p/r/u/v) |
| RGS7 | TCR [zeta] | ThB |
| RGS9 | TCTP | MAP-2 (2a & 2b) |
| RHEB | TdT | IgM [mu]-chain |
| Rho | Tec | MHC Class I (H-2b/p) |
| RhoA | TEF1 | MHC Class I (H-2bs/p/q/d/u/r) |
| RHOC | TEM8 | MHC Class I (H-2s/f) |
| RhoGAP | Tenascin C | CDw60 |
| RhoGDI | TER119 | Bad Phospho (Ser112) |
| RIAM | TERF2 | Caspase 3 Cleaved (Asp175) |
| RICTOR | Terminal-Deoxynucleotidyl Transferase | Chk1 Phospho (Ser345) |
| RIG1 | TERT | Chk2 Phospho (Thr68) |
| RIP1 | Tertanectin | Cyclin D1 Phospho (Thr286) |
| RIP2 | TFF3 | cFos Phospho (Ser32) |
| Rituximab | TFIIB | FosB |
| RLA DQ | TGF-[beta] | GSK-3[beta] (pSer9) |
| RLA DR | TGF-[beta]1 | Histone H3 Acetylated (Lys9) |
| RNA polymerase II | TGF-[beta]3 | HS1 Phospho (Tyr397) |
| RNA polymerase II CTD repeat YSPTSPS | TGF-[beta]R1 | Hsp27 Phospho (Ser82) |
| RNASE-L | TGF-[beta]R2 | ID3 |
| RNASE1 | TGN38 | CD221[beta] |
| RNF144B | TGN46 | Phospho-IRAK4 (Thr345/Ser346) |
| RNF168 | THAP11 | Phospho-cJun (Ser73) |
| RNF36 | THEMIS | S6 (pS240/pS244) |
| RNPEP | Thioredoxin | Syk (pY525/pY526) |
| ROCK1 | Thioredoxin Reductase 1 | C23 |
| ROR1 | ThPOK | Hemoglobin [beta] |
| ROR2 | Thrombin Receptor | CD221[alpha] |
| ROR[alpha] | Thrombocyte | p27 |
| ROR[gamma] | Thrombospondin | cJun Phospho (Ser63) |
| ROS | Thymidine Kinase 1 | PPAR[gamma] |
| RPA32/RPA2 | Thyroglobulin | ENPP1 |
| RPA70 | TIA-1 | PILR[alpha] |
| RPS6 | TIAM2 | PILR[beta] |

TABLE 3-continued

Cell surface markers for use with the hydrogel beads described herein.

| | | |
|---|---|---|
| RSF1 | Tie1 | Twist1 |
| RSK1 p90 | Tie2 (pY1102) | Cadherin M |
| RSK2 | Tie2 (pY992) | CD302 |
| RSK3 | TIF1[beta] Phospho (Ser473) | CD66d |
| RSK4 | TIGIT | CLEC14A |
| RT1A | Tim1 | CD242 |
| RT1Aa | Tim2 | Syndecan2 |
| RT1Aa,b | Tim3 | IL-32[alpha] |
| RT1Aa,b,l | Tim3 Fc Fusion Protein | CDO |
| RT1Ac | Tim4 | Cryptic |
| RT1Au | Tim50 | Endothelin B Receptor |
| RT1B | Timeless | FR3 |
| RT6.1 | TIMP1 | IGSF3 |
| RT6.2 | TIMP2 | CD85f |
| Ryanodine Receptor | TIP49A | Matriptase |
| RYK | TIRAP | MCEMP1 |
| RyR | TIS11b | mGluR4 |
| S-Tag | TL1A | Stabilin1 |
| S100A1 | TLK1 | Stabilin2 |
| S100A10 | TLR11 | Cadherin 13 |
| S100A13 | TLR12 | GPR-109A |
| S100A4 | CD285 | TSPAN8 |
| S100A6 | TLR7 | Reg1A |
| S100A9 | TLR8 | Cadherin 12 |
| S100[alpha] | TMEFF2 | ECE1 |
| S100[alpha]2 | TMPS2 | FABP5 |
| S100[beta] | TMSA | IGSF4C |
| S6 (pS235/pS236) | TMTSP | Trem-like 1 |
| S6 (pS240) | TNAP | Activin A Receptor Type IIA |
| S6 (pS244) | TNAP3 | ALK7 |
| S6K | TNF-[alpha] | BCAM |
| SAA4 | TNF-[beta] | BLAME |
| Sall4 | TNFR Related Protein | CEACAM4 |
| *Salmonella Paratyphi* A | TNPO3 | Claudin-3 |
| *Salmonella Typhimurium* | Tollip | CLP24 |
| Salmonid Ig (H and L chain) | TOMM20 | CRHR1 |
| Salmonid Ig (H chain) | TOMM22 | DC-STAMP |
| SAM68 | TOP1 | Eph Receptor B3 |
| SAMD2 | TOP2A | FATP4 |
| SAP | TOP2B | FcRL1 |
| SARA | TORC2 | FcRL2 |
| SATB1 | Torsin A | FcRL3 |
| SATB2 | TOX | FSH-R |
| SC5A5 | TPH1 | Gi24 |
| SC6A4 | TPPP | Histamine H1 Receptor |
| SCAI | TPTE | Neu5Gc |
| SCD1 | TR11B | Lin28A |
| Scramblase1 | TRA-1-60 | IL-22[alpha] |
| SCY1-like 3 | TRA-1-60R | ATM (pSer1981) |
| SDF1 | TRA-1-81 | Integrin [alpha]8 |
| SDF1[alpha] | TRA-2-49 | Integrin [beta]7 |
| SDHA | TRA-2-54 | Integrin [beta]8 |
| SDHB | TRADD | CD158k |
| Secretory component | TRAF2 | KOR |
| Securin | TRAF4 | CD85i |
| SELP | TRAF5 | LRIG3 |
| Sema4A | TRAF6 | LRP4 |
| Sema7A | TRAM2 | MMP16 |
| SENP1 | Transferrin | MS4A4A |
| SEPP1 | Transglutaminase | NAALADase-like 2 |
| SERCA2 | Transglutaminase2 | Neuropeptide Y receptor type 1 |
| SerpinB1 | Transketolase | Oncostatin M Receptor [beta] |
| SerpinB2 | TRAP1 | MS4A3 |
| SerpinB6 | TRAPPC2 | PEAR1 |
| Sestrin1 | TRAP[alpha] | PEDF Receptor |
| SFRP2 | Trem-like 2 | PlexinA4 |
| SGK1 | Trem-like 4 | Protocadherin1 |
| SHC1 | TRIB2 | ROBO2 |
| *Shigella Boydii* | TRIB3 | ROBO4 |
| SHIP1 | TRIM | EDG8 |
| SHP1 | TRIM25 | Scavenger receptor A5 |
| SHP2 | TRIM29 | Semaphorin 4A |
| SHP2 (pY542) | TRK | Semaphorin 4B |

TABLE 3-continued

Cell surface markers for use with the hydrogel beads described herein.

| | | |
|---|---|---|
| SIAH2 | TrkA | Semaphorin 6A |
| SIGIRR | TrkC | Siglec-16 |
| Siglec-10 | Trop2 | Somatostatin Receptor 3 |
| Siglec-8 | Tropomyosin 1 | STING |
| Siglec-9 | TROY | GPBAR1 |
| Siglec-F | TRPC6 | TM4SF4 |
| Siglec-H | TRPM2 | TMEM87A |
| SIK2 | TRPM8 | TSPAN2 |
| SIRT1 | TRX1 | VEGF-R1, 2, 3 |
| SIRT2 | Trypanosoma brucei Major Lysosomal Protein | ADAM15 |
| SIRT3 | Trypanosoma brucei procyclin (EP) | Calreticulin2 |
| SIRT5 | Trypanosoma congolense procyclin | Complement Factor H-related 4 |
| SIT1 | Trypanosoma cruzi LPG | CXCL6 |
| SIX2 | TSC2 Phospho (Ser664) | CD158a/h/b2/f/g |
| SKP1A | TSC2 Phospho (Thr1462) | Ea52-68 peptide bound to I-Ab |
| SLA-DR | TSG101 | HLA-Bw4 |
| Slan | TSHR | ATF1 Phospho (Ser63) |
| SLC1A3 | TSLP | Epiregulin |
| SLC1A7 | TSLP Receptor | FATP1 |
| SLC22A1 | TSPO | Fibromodulin |
| SLC22A5 | TTF1 | Furin |
| SLC26A6 | Tubb3 | Galanin |
| SLC26A7 | Tuberin | IL-11 |
| SLC30A4 | Tubulin [alpha] | CD306 |
| SLC39A11 | Tubulin [alpha]1B | MFG-E8 |
| SLC4A3 | Tubulin [alpha]4a | MINA |
| SLC6A19 | Tubulin [alpha]3E | Oct4A |
| SLC6A6 | Tubulin [alpha]8 | OLIG1, 2, 3 |
| SLC7A10 | Tubulin [beta] | Oncostatin M |
| SLC7A14 | Tubulin [beta] class III | Semaphorin 3E |
| SLC7A3 | Tubulin [beta]4 | Slug |
| SLC7A8 | Tubulin [gamma] | SOX3 |
| SLC8A2 | tumor antigens of epithelial origin | STYK1 |
| SLC9A6 | Twist2 | LTBP1 |
| SLP76 | TXNIP | TIMP3 |
| SLP76 (pY128) | TYK2 | VAP-B |
| SM22[alpha] | TYMS | WNT9a |
| SMAC | Tyro2 | 5HT2C |
| SMAC3 | Tyrosinase | AATK |
| SMAD1 | Tyrosine Hydroxylase | ACLP |
| SMAD1 (pS463/465) | UACA | ADAMTS15 |
| SMAD1/5 | UBA52 | alpha 1B Adrenoreceptor |
| SMAD1/9 | UBC9 | APLP1 |
| SMAD2 | UBE2 | Fluorescein/Oregon Green |
| SMAD2/3 (pS465/467) DELETE | UBE2L3 | RXR-[beta] |
| SMAD3 | UBE2L6 | L3MBTL3 |
| SMAD4 | UBE2M | CCL1 |
| SMAD5 | UBE2N | PRDM4 |
| SMAD6 | UBF | ACTH |
| SMC1 | UBF1 | PDZ binding kinase |
| SMC1L1 | Ubiquitin | HuC/HuD neuronal protein |
| SMN | UBK63 | TDRD3 |
| Smoothelin | UCH37 | EP300 |
| SMURF2 | UCK | Carbonic Anhydrase VI |
| SNAP25 | UCP2 | Cholecystokinin A Receptor |
| SNX1 | UCP3 | CCL23 |
| SOAT1 | UFM1 | CD1e |
| SOCS1 | ULBP1 | Chondrolectin |
| SOCS2 | ULBP2 | Chordin-Like 2 |
| SOCS3 | ULBP4 | Claudin-10b |
| SOCS4 | ULK3 | Claudin-11 |
| SOD2 | UNC5A | Claudin-12 |
| Sodium Potassium ATPase | UNC5B | Claudin-17 |
| Sonic Hedgehog | UNG | CLEC2A |
| Sortilin | uPA | Spi-B |
| SOSC3 | UQCRC1 | TRAM |
| SOX1 | UQCRC2 | Carboxypeptidase E |
| SOX10 | Urm1 | Islet Cell Autoantigen 1 |

TABLE 3-continued

Cell surface markers for use with the hydrogel beads described herein.

| | | |
|---|---|---|
| SOX17 | URP2 | Patched2 |
| SOX18 | USF1 | ST8SIA2 |
| SOX2 | USP11 | AML1 (pS249) |
| SOX2 (COOH terminus) | USP13 | AMPK[beta]1 (pS182) |
| SOX2 (NH2 terminus) | USP22 | BRF1/2 |
| SOX9 | USP28 | Histone H3 Phospho (Thr11) |
| SP-D | USP7 | MEK1 (pT286) |
| Sp1 | TUF1 | MMP16 |
| Sp3 | V5 tag | MNK Phospho (T197/T202) |
| Spectrin [alpha]1 | VAMP5/8 | NUMB |
| SPHK1 | VAP1 | Hsp27 Phospho (Ser78) |
| Spt16 | VASA | PKC[theta] (pT538) |
| Src (pY418) | VASP | SIRT1 (pS47) |
| SREBP1 | VAV1 | ZAP-70 (pY493) |
| ssDNA | VAV2 | ZAP-70 (pY315/pY319) |
| SSEA3 | VAV3 | sRAGE |
| SSEA4 | VDAC1 | mCherry |
| SSEA5 | VEGF | PI 3 Kinase regulatory subunit [alpha] |
| SSH3BP1 | VEGF-120 | TIMP4 |
| SSR2 | VEGF-A | SRC |
| SSR5 | VEGF-R1 | ZAP-70 (pY493) |
| SSRP1 | VELIS-3 | TSC2 Phospho (S939) |
| SSX2IP | VGLU1 | RagC |
| Stat1 | Villin | SHIP2 |
| Stat1 (N-Terminus) | Vimentin | MKK4 (pS257) |
| Stat1 (pS727) | Vinculin | CD79a (pY182) |
| Stat1 (pY701) | Viperin | TRAF1 |
| Stat1[alpha] | VIPR1 | EVI1 |
| Stat2 | Vitamin D Binding protein | SRC3 |
| Stat3 | Vitamin D Receptor | SOX11 |
| Stat3 (pS727) | Vitronectin | IL-17F homodimer |
| Stat3 (pY707) | VMAT2 | CCRL1 |
| Stat4 | vMyb/cMyb | FOXP2 |
| Stat4 (pY693) | von Willebrands factor | IFNAR2 |
| Stat5 | VRK1 | REA Control |
| Stat5 (pY694) | VSV-G tag | CD228 |
| Stat5a | WAPL | Muc-13 |
| Stat5b | WASP | P2X7R |
| Stat6 | WC14 | Btk (pY223/Itk (pY180) |
| Stat6 (pY641) | WC15 | CD248 |
| Stathmin/Op18 Phopho (Ser16) | wCD44 | GILT |
| Stathmin1 | WIP (pS488) | Recoverin |
| Stefin B | WNT1 | Cardiac Troponin I |
| Stem Cell Factor | WNT16 | PTF1[alpha] |
| STIM1 | WNT2 | NKX2.2 |
| STK3 | WNT5B | HLA-B7/B27 |
| STK33 | WNT6 | Myosin light chain 2a |
| STK39 | WSTF | Myosin light chain 2v |
| STOM | WWOX | Epithelial Antigen |
| STRO1 | Xanthine Oxidase | |

In another embodiment, the disclosure relates to a population of hydrogel beads, each hydrogel bead comprising: a) a polymerized monomer and a bifunctional monomer; and b) a pre-determined quantity of protein antigen bound to the hydrogel bead. In some embodiments, the quantity of protein antigen in each hydrogel bead varies by less than 30%, 20%, 10%, 5%, or 2%. In some embodiments, the protein antigen binds to a commercial cell stain.

In another embodiment, the protein antigen exhibits at least 75%, at least 80%, at least 85%, at least 90%, at least 95%, at least 98%, or 100% identity to CD34 (e.g., human CD34).

In some embodiments, the protein antigen exhibits at least 75%, at least 80%, at least 85%, at least 90%, at least 95%, at least 98%, or 100% identity to CD45 (e.g., human CD45).

In some embodiments, the protein antigen exhibits at least 75%, at least 80%, at least 85%, at least 90%, at least 95%, at least 98%, or 100% identity to Gln26 to Lys577 of UniProtKB Accession P08575, or SEQ ID NO: 2. In some embodiments, the protein antigen exhibits at least 75%, at least 80%, at least 85%, at least 90%, at least 95%, at least 98%, or 100% identity to any of SEQ ID NO: 2-9. In some embodiments, the protein antigen exhibits at least 75%, at least 80%, at least 85%, at least 90%, at least 95%, at least 98%, or 100% identity to SEQ ID NO: 10.

In some embodiments, the protein antigen exhibits at least 75%, at least 80%, at least 85%, at least 90%, at least 95%, at least 98%, or 100% identity to Ser32 to Thr290 of UniProtKB Accession P28906, or SEQ ID NO: 1.

In some embodiments, the biomarker(s) are attached to a matrix of the hydrogel bead via a linker. The biomarker may be covalently linked to the matrix (e.g., via a covalent linker, or direct covalent conjugation), or non-covalently linked to the matrix (e.g., via a tag that non-covalently binds to a binder on the matrix, such as biotin—streptavidin). In some embodiments, the matrix of the hydrogel bead is formed by the polymerized monomer and/or bifunctional monomer.

As noted in other parts of this document, in some embodiments, the present disclosure provides for hydrogel beads with various predetermined levels of CD34 and CD45 biomarkers, which can be used as controls for a variety of assays (e.g., flow cytometry). In such embodiments, populations of hydrogels are designed to mimic corresponding animal cell populations. Thus, in some embodiments, the populations of hydrogel beads are configured with appropriate CD34 and/or CD45 biomarkers (or extra cellular domains thereof) that approximate the concentration of those biomarkers in various animal cell populations. In some embodiments, approximate concentration of biomarkers is evaluated by the hydrogel bead's ability to generate a similar level of signal from various label markers (e.g., by having substantially similar MFIs).

In some embodiments, the hydrogel beads are capable of producing a signal for any of the recited biomarkers that is substantially similar to the comparable signal from a target cell. As used herein, the term "signal" refers to any measurable signal from the presence of a biomarker, whether inherent to the biomarker itself, or achievable through one or more labeling methods (e.g., fluorescence from an antibody-fluorophore conjugate targeting the biomarker).

Thus, in some embodiments, the biomarkers in the hydrogel beads of the present disclosure exhibit an MFI of 1000, 2000, 3000, 4000, 5000, 6000, 7000, 8000, 9000, 10000, 15000, 20000, 25000, 30000, 35000, 40000, 45000, 50000, 55000, 60000, 65000, 70000, 75000, 80000, 85000, 90000, 95000, 100000, 150000, 175000, 200000, 225000, 250000, 275000, 300000, 325000, 350000, 375000, 400000, 425000, 450000, 475000, 500000, 525000, 550000, 575000, 600000, 625000, 650000, 675000, 700000, 725000, 750000, 775000, 800000, 825000, 850000, 875000, 900000, 925000, 950000, 975000, 1000000, 1500000, 2000000, 2500000, 3000000, or 3500000, including all ranges and subranges therebetween.

In some embodiments, the hydrogel beads of the present disclosure exhibit a CD34 MFI of 1000, 2000, 3000, 4000, 5000, 6000, 7000, 8000, 9000, 10000, 15000, 20000, 25000, 30000, 35000, 40000, 45000, 50000, 55000, 60000, 65000, 70000, 75000, 80000, 85000, 90000, 95000, 100000, 150000, 175000, 200000, 225000, 250000, 275000, 300000, 325000, 350000, 375000, 400000, 425000, 450000, 475000, 500000, 525000, 550000, 575000, 600000, 625000, 650000, 675000, 700000, 725000, 750000, 775000, 800000, 825000, 850000, 875000, 900000, 925000, 950000, 975000, 1000000, 1500000, 2000000, 2500000, 3000000, or 3500000 MFI, including all ranges and subranges therebetween, as measured via any of the antibodies in Table 4.

In some embodiments, the hydrogel beads of the present disclosure exhibit a CD34 MFI of between 30,000 to 100,000, 50,000 to 80,000, or 60,000 to 70,000, as measured via any of the antibodies in Table 4.

In some embodiments, the amount of CD34 extracellular domain in the first population of the hydrogel beads is between about 100 and about 300, about 300 and about 1,000, about 1,000 and about 3,000, about 3,000 and about 10,000, about 10,000 and about 30,000, about 30,000 and about 100,000, about 100,000 and about 300,000, about 300,000 and about 1,000,000, about 1,000,000 and about 3,000,000, about 3,000,000 and about 10,000,000, about 100 and about 1,000, about 300 and about 3,000, about 1,000 and about 10,000, about 3,000 and about 30,000, about 10,000 and about 100,000, about 30,000 and about 300,000, about 100,000 and about 1,000,000, about 300,000 and about 3,000,000, about 1,000,000 and about 10,000,000, about 100 and about 3,000, about 300 and about 10,000, about 1,000 and about 30,000, about 3,000 and about 100,000, about 10,000 and about 300,000, about 30,000 and about 1,000,000, about 100,000 and about 3,000,000, about 300,000 and about 10,000,000, about 100 and about 10,000, about 300 and about 30,000, about 1,000 and about 100,000, about 3,000 and about 300,000, about 10,000 and about 1,000,000, about 30,000 and about 3,000,000, about 100,000 and about 10,000,000, about 100 and about 30,000, about 300 and about 100,000, about 1,000 and about 300,000, about 3,000 and about 1,000,000, about 10,000 and about 3,000,000, about 30,000 and about 10,000,000, about 100 and about 100,000, about 300 and about 300,000, about 1,000 and about 1,000,000, about 3,000 and about 3,000,000, about 10,000 and about 10,000,000, about 100 and about 300,000, about 300 and about 1,000,000, about 1,000 and about 3,000,000, about 3,000 and about 10,000,000, about 100 and about 1,000,000, about 300 and about 3,000,000, about 1,000 and about 10,000,000, about 100 and about 3,000,000, about 300 and about 10,000,000, or about 100 and about 10,000,000, copies for the hydrogel beads. In some embodiments, the amount of CD34 extracellular domain in each hydrogel bead of the first population is within this range.

In some embodiments, the amount of CD34 extracellular domain in the first population of the hydrogel beads is about 100 to about 1,000 copies. In some embodiments, the amount of CD34 extracellular domain in the first population of the hydrogel beads is about 250 to about 2,500 copies. In some embodiments, the amount of CD34 extracellular domain in the first population of the hydrogel beads is about 500 to about 5,000 copies. In some embodiments, the amount of CD34 extracellular domain in the first population of the hydrogel beads is about 1,000 to about 10,000 copies. In some embodiments, the amount of CD34 extracellular domain in the first population of the hydrogel beads is about 2,500 to about 25,000 copies. In some embodiments, the amount of CD34 extracellular domain in the first population of the hydrogel beads is about 5,000 to about 50,000 copies. In some embodiments, the amount of CD34 extracellular domain in the first population of the hydrogel beads is about 10,000 to about 100,000 copies. In some embodiments, the amount of CD34 extracellular domain in the first population of the hydrogel beads is about 25,000 to about 250,000 copies. In some embodiments, the amount of CD34 extracellular domain in the first population of the hydrogel beads is about 50,000 to about 500,000 copies. In some embodiments, the amount of CD34 extracellular domain in the first population of the hydrogel beads is about 100,000 to about 1,000,000 copies. In some embodiments, the amount of CD34 extracellular domain in the first population of the hydrogel beads is about 250,000 to about 2,500,000 copies. In some embodiments, the amount of CD34 extracellular domain in the first population of the hydrogel beads is about 500,000 to about 5,000,000 copies. In some embodiments, the amount of CD34 extracellular domain in the first population of the hydrogel beads is about 1,000,000 to about 10,000,000 copies.

In some embodiments, the amount of CD34 extracellular domain in the second population of the hydrogel beads is no more than 3, no more than 10, no more than 30, no more than 100, no more than 300, no more than 1,000, no more than 3,000, no more than 10,000, no more than 30,000, no more than 100,000, no more than 300,000, no more than 1,000,000, or no more than 3,000,000, copies. In some embodiments, the amount of CD34 extracellular domain in the second population of the hydrogel beads is no more than 3 copies. In some embodiments, the amount of CD34 extracellular domain in the second population of the hydrogel beads is no more than 10 copies. In some embodiments, the amount of CD34 extracellular domain in the second population of the hydrogel beads is no more than 30 copies. In some embodiments, the amount of CD34 extracellular domain in the second population of the hydrogel beads is no more than 100 copies. In some embodiments, the amount of CD34 extracellular domain in the second population of the hydrogel beads is no more than 300 copies. In some embodiments, the amount of CD34 extracellular domain in the second population of the hydrogel beads is no more than 1,000 copies. In some embodiments, the amount of CD34 extracellular domain in the second population of the hydrogel beads is no more than 3,000 copies. In some embodiments, the amount of CD34 extracellular domain in the second population of the hydrogel beads is no more than 10,000 copies. In some embodiments, the amount of CD34 extracellular domain in the second population of the hydrogel beads is no more than 30,000 copies. In some embodiments, the amount of CD34 extracellular domain in the second population of the hydrogel beads is no more than 100,000 copies. In some embodiments, the amount of CD34 extracellular domain in the second population of the hydrogel beads is no more than 300,000 copies. In some embodiments, the amount of CD34 extracellular domain in the second population of the hydrogel beads is no more than 1,000,000 copies. In some embodiments, the amount of CD34 extracellular domain in the second population of the hydrogel beads is no more than 3,000,000 copies.

In some embodiments, the amount of CD34 extracellular domain in the first population of the hydrogel beads is about 100 to about 1,000 copies for each of the hydrogel beads. In some embodiments, the amount of CD34 extracellular domain in the first population of the hydrogel beads is about 250 to about 2,500 copies for each of the hydrogel beads. In some embodiments, the amount of CD34 extracellular domain in the first population of the hydrogel beads is about 500 to about 5,000 copies for each of the hydrogel beads. In some embodiments, the amount of CD34 extracellular domain in the first population of the hydrogel beads is about 1,000 to about 10,000 copies for each of the hydrogel beads. In some embodiments, the amount of CD34 extracellular domain in the first population of the hydrogel beads is about 2,500 to about 25,000 copies for each of the hydrogel beads. In some embodiments, the amount of CD34 extracellular domain in the first population of the hydrogel beads is about 5,000 to about 50,000 copies for each of the hydrogel beads. In some embodiments, the amount of CD34 extracellular domain in the first population of the hydrogel beads is about 10,000 to about 100,000 copies for each of the hydrogel beads. In some embodiments, the amount of CD34 extracellular domain in the first population of the hydrogel beads is about 25,000 to about 250,000 copies for each of the hydrogel beads. In some embodiments, the amount of CD34 extracellular domain in the first population of the hydrogel beads is about 50,000 to about 500,000 copies for each of the hydrogel beads. In some embodiments, the amount of CD34 extracellular domain in the first population of the hydrogel beads is about 100,000 to about 1,000,000 copies for each of the hydrogel beads. In some embodiments, the amount of CD34 extracellular domain in the first population of the hydrogel beads is about 250,000 to about 2,500,000 copies for each of the hydrogel beads. In some embodiments, the amount of CD34 extracellular domain in the first population of the hydrogel beads is about 500,000 to about 5,000,000 copies for each of the hydrogel beads. In some embodiments, the amount of CD34 extracellular domain in the first population of the hydrogel beads is about 1,000,000 to about 10,000,000 copies for each of the hydrogel beads.

In some embodiments, the amount of CD34 extracellular domain in the second population of the hydrogel beads is no more than 3, no more than 10, no more than 30, no more than 100, no more than 300, no more than 1,000, no more than 3,000, no more than 10,000, no more than 30,000, no more than 100,000, no more than 300,000, no more than 1,000,000, or no more than 3,000,000, copies for each of the hydrogel beads. In some embodiments, the amount of CD34 extracellular domain in the second population of the hydrogel beads is no more than 3 copies for each of the hydrogel beads. In some embodiments, the amount of CD34 extracellular domain in the second population of the hydrogel beads is no more than 10 copies for each of the hydrogel beads. In some embodiments, the amount of CD34 extracellular domain in the second population of the hydrogel beads is no more than 30 copies for each of the hydrogel beads. In some embodiments, the amount of CD34 extracellular domain in the second population of the hydrogel beads is no more than 100 copies for each of the hydrogel beads. In some embodiments, the amount of CD34 extracellular domain in the second population of the hydrogel beads is no more than 300 copies for each of the hydrogel beads. In some embodiments, the amount of CD34 extracellular domain in the second population of the hydrogel beads is no more than 1,000 copies for each of the hydrogel beads. In some embodiments, the amount of CD34 extracellular domain in the second population of the hydrogel beads is no more than 3,000 copies for each of the hydrogel beads. In some embodiments, the amount of CD34 extracellular domain in the second population of the hydrogel beads is no more than 10,000 copies for each of the hydrogel beads. In some embodiments, the amount of CD34 extracellular domain in the second population of the hydrogel beads is no more than 30,000 copies for each of the hydrogel beads. In some embodiments, the amount of CD34 extracellular domain in the second population of the hydrogel beads is no more than 100,000 copies for each of the hydrogel beads. In some embodiments, the amount of CD34 extracellular domain in the second population of the hydrogel beads is no more than 300,000 copies for each of the hydrogel beads. In some embodiments, the amount of CD34 extracellular domain in the second population of the hydrogel beads is no more than 1,000,000 copies for each of the hydrogel beads. In some embodiments, the amount of CD34 extracellular domain in the second population of the hydrogel beads is no more than 3,000,000 copies for each of the hydrogel beads.

In some embodiments, the hydrogel beads of the present disclosure exhibit a CD45 MFI of 1000, 2000, 3000, 4000, 5000, 6000, 7000, 8000, 9000, 10000, 15000, 20000, 25000, 30000, 35000, 40000, 45000, 50000, 55000, 60000, 65000, 70000, 75000, 80000, 85000, 90000, 95000, 100000, 150000, 175000, 200000, 225000, 250000, 275000, 300000, 325000, 350000, 375000, 400000, 425000, 450000, 475000, 500000, 525000, 550000, 575000, 600000, 625000, 650000, 675000, 700000, 725000, 750000, 775000, 800000, 825000, 850000, 875000, 900000, 925000, 950000, 975000, 1000000, 1500000, 2000000, 2500000, 3000000, or 3500000 MFI, including all ranges and subranges therebetween, as measured via any of the antibodies in Table 4.

In some embodiments, the hydrogel beads of the present disclosure exhibit a CD45 MFI of between 300,000 to 1,000,000, 600,000 to 900,000, or 70,000 to 85,000, as measured via any of the antibodies in Table 4.

In some embodiments, the amount of CD45 extracellular domain in the first population and/or the second population of the hydrogel beads is between about 100 and about 300, about 300 and about 1,000, about 1,000 and about 3,000, about 3,000 and about 10,000, about 10,000 and about 30,000, about 30,000 and about 100,000, about 100,000 and about 300,000, about 300,000 and about 1,000,000, about 1,000,000 and about 3,000,000, about 3,000,000 and about 10,000,000, about 100 and about 1,000, about 300 and about 3,000, about 1,000 and about 10,000, about 3,000 and about 30,000, about 10,000 and about 100,000, about 30,000 and about 300,000, about 100,000 and about 1,000,000, about 300,000 and about 3,000,000, about 1,000,000 and about 10,000,000, about 100 and about 3,000, about 300 and about 10,000, about 1,000 and about 30,000, about 3,000 and about 100,000, about 10,000 and about 300,000, about 30,000 and about 1,000,000, about 100,000 and about 3,000,000, about 300,000 and about 10,000,000, about 100 and about 10,000, about 300 and about 30,000, about 1,000 and about 100,000, about 3,000 and about 300,000, about 10,000 and about 1,000,000, about 30,000 and about 3,000,000, about 100,000 and about 10,000,000, about 100 and about 30,000, about 300 and about 100,000, about 1,000 and about 300,000, about 3,000 and about 1,000,000, about 10,000 and about 3,000,000, about 30,000 and about 10,000,000, about 100 and about 100,000, about 300 and about 300,000, about 1,000 and about 1,000,000, about 3,000 and about 3,000,000, about 10,000 and about 10,000,000, about 100 and about 300,000, about 300 and about 1,000,000, about 1,000 and about 3,000,000, about 3,000 and about 10,000,000, about 100 and about 1,000,000, about 300 and about 3,000,000, about 1,000 and about 10,000,000, about 100 and about 3,000,000, about 300 and about 10,000,000, or about 100 and about 10,000,000, copies for the hydrogel beads. In some embodiments, the amount of CD45 extracellular domain in each hydrogel bead of the first population is within this range.

In some embodiments, the amount of CD45 extracellular domain in the first population and/or the second population of the hydrogel beads is about 100 to about 1,000 copies. In some embodiments, the amount of CD45 extracellular domain in the first population and/or the second population of the hydrogel beads is about 250 to about 2,500 copies. In some embodiments, the amount of CD45 extracellular domain in the first population and/or the second population of the hydrogel beads is about 500 to about 5,000 copies. In some embodiments, the amount of CD45 extracellular domain in the first population and/or the second population of the hydrogel beads is about 1,000 to about 10,000 copies. In some embodiments, the amount of CD45 extracellular domain in the first population and/or the second population of the hydrogel beads is about 2,500 to about 25,000 copies. In some embodiments, the amount of CD45 extracellular domain in the first population and/or the second population of the hydrogel beads is about 5,000 to about 50,000 copies. In some embodiments, the amount of CD45 extracellular domain in the first population and/or the second population of the hydrogel beads is about 10,000 to about 100,000 copies. In some embodiments, the amount of CD45 extracellular domain in the first population and/or the second population of the hydrogel beads is about 25,000 to about 250,000 copies. In some embodiments, the amount of CD45 extracellular domain in the first population and/or the second population of the hydrogel beads is about 50,000 to about 500,000 copies. In some embodiments, the amount of CD45 extracellular domain in the first population and/or the second population of the hydrogel beads is about 100,000 to about 1,000,000 copies. In some embodiments, the amount of CD45 extracellular domain in the first population and/or the second population of the hydrogel beads is about 250,000 to about 2,500,000 copies. In some embodiments, the amount of CD45 extracellular domain in the first population and/or the second population of the hydrogel beads is about 500,000 to about 5,000,000 copies. In some embodiments, the amount of CD45 extracellular domain in the first population and/or the second population of the hydrogel beads is about 1,000,000 to about 10,000,000 copies.

In some embodiments, the amount of CD45 extracellular domain in the first population and/or the second population of the hydrogel beads is about 100 to about 1,000 copies for each of the hydrogel beads. In some embodiments, the amount of CD45 extracellular domain in the first population and/or the second population of the hydrogel beads is about 250 to about 2,500 copies for each of the hydrogel beads. In some embodiments, the amount of CD45 extracellular domain in the first population and/or the second population of the hydrogel beads is about 500 to about 5,000 copies for each of the hydrogel beads. In some embodiments, the amount of CD45 extracellular domain in the first population and/or the second population of the hydrogel beads is about 1,000 to about 10,000 copies for each of the hydrogel beads. In some embodiments, the amount of CD45 extracellular domain in the first population and/or the second population of the hydrogel beads is about 2,500 to about 25,000 copies for each of the hydrogel beads. In some embodiments, the amount of CD45 extracellular domain in the first population and/or the second population of the hydrogel beads is about 5,000 to about 50,000 copies for each of the hydrogel beads. In some embodiments, the amount of CD45 extracellular domain in the first population and/or the second population of the hydrogel beads is about 10,000 to about 100,000 copies for each of the hydrogel beads. In some embodiments, the amount of CD45 extracellular domain in the first population and/or the second population of the hydrogel beads is about 25,000 to about 250,000 copies for each of the hydrogel beads. In some embodiments, the amount of CD45 extracellular domain in the first population and/or the second population of the hydrogel beads is about 50,000 to about 500,000 copies for each of the hydrogel beads. In some embodiments, the amount of CD45 extracellular domain in the first population and/or the second population of the hydrogel beads is about 100,000 to about 1,000,000 copies for each of the hydrogel beads. In some embodiments, the amount of CD45 extracellular domain in the first population and/or the second population of the hydrogel beads is about 250,000 to about 2,500,000 copies for each of the hydrogel beads. In some embodiments, the amount of CD45 extracellular domain in the first population and/or the second population of the hydrogel beads is about 500,000 to about 5,000,000 copies for each of the hydrogel beads. In some embodiments, the amount of CD45 extracellular domain in the first population and/or the second population of the hydrogel beads is about 1,000,000 to about 10,000,000 copies for each of the hydrogel beads.

In some embodiments, the hydrogel beads in the first population exhibit between about 10% and about 400% of the CD34 signal exhibited on a target cell, when comparably labeled. In some embodiments, the hydrogel beads in the first population exhibit between about 10% and about 400% of the CD45 signal exhibited by a target cell, when comparably labeled. In some embodiments, the hydrogel beads in the first population exhibit between about 10% and about 50%, about 10% and about 70%, about 10% and about 100%, about 10% and about 120%, about 10% and about 150%, about 10% and about 200%, about 10% and about 250%, about 10% and about 300%, about 10% and about 400%, about 20% and about 50%, about 20% and about 70%, about 20% and about 100%, about 20% and about 120%, about 20% and about 150%, about 20% and about 200%, about 20% and about 250%, about 20% and about 300%, about 20% and about 400%, about 30% and about 50%, about 30% and about 70%, about 30% and about 100%, about 30% and about 120%, about 30% and about 150%, about 30% and about 200%, about 30% and about 250%, about 30% and about 300%, about 30% and about 400%, about 40% and about 50%, about 40% and about 70%, about 40% and about 100%, about 40% and about 120%, about 40% and about 150%, about 40% and about 200%, about 40% and about 250%, about 40% and about 300%, about 40% and about 400%, about 50% and about 70%, about 50% and about 100%, about 50% and about 120%, about 50% and about 150%, about 50% and about 200%, about 50% and about 250%, about 50% and about 300%, about 50% and about 400%, about 60% and about 70%, about 60% and about 100%, about 60% and about 120%, about 60% and about 150%, about 60% and about 200%, about 60% and about 250%, about 60% and about 300%, about 60% and about 400%, about 70% and about 100%, about 70% and about 120%, about 70% and about 150%, about 70% and about 200%, about 70% and about 250%, about 70% and about 300%, about 70% and about 400%, about 80% and about 100%, about 80% and about 120%, about 80% and about 150%, about 80% and about 200%, about 80% and about 250%, about 80% and about 300%, about 80% and about 400%, about 90% and about 100%, about 90% and about 120%, about 90% and about 150%, about 90% and about 200%, about 90% and about 250%, about 90% and about 300%, about 90% and about 400%, about 100% and about 120%, about 100% and about 150%, about 100% and about 200%, about 100% and about 250%, about 100% and about 300%, about 100% and about 400%, about 120% and about 150%, about 120% and about 200%, about 120% and about 250%, about 120% and about 300%, about 120% and about 400%, about 150% and about 200%, about 150% and about 250%, about 150% and about 300%, or about 150% and about 400%, of CD34 and/or CD45 signal exhibited by a target cell when comparably labeled, including all ranges and subranges therebetween. In some embodiments, each of the hydrogel beads in the first population exhibit such CD34 and/or CD45 signal when comparably labeled.

In some embodiments, the disclosure provides a second population of hydrogel beads each comprising a cell surface biomarker profile comprising a CD45 extracellular domain but a lower level of CD34 extracellular domain compared to the first population of hydrogel beads. In some embodiments, the hydrogel beads in the second population comprises no more than 10% of CD34 signal exhibited by the first population of hydrogel beads, when comparably labeled. In some embodiments, the hydrogel beads in the second population exhibit no more than 0.1%, no more than 0.2%, no more than 0.3%, no more than 0.5%, no more than 0.7%, no more than 1%, no more than 2%, no more than 3%, no more than 5%, or no more than 7%, of the CD34 signal exhibited by the first population of hydrogel beads, when comparably labeled. In some embodiments, the cell surface biomarker profile of each of the hydrogel beads in the second population does not exhibit any above-background CD34 signal. In some embodiments, each of the hydrogel beads in the second population exhibit such CD34 signal when comparably labeled.

In some embodiments, the hydrogel beads in the second population exhibits between about 10% and about 400% of the CD45 signal exhibited by a target cell, when comparably labeled. In some embodiments, the hydrogel beads in the second population exhibits between about 10% and about 50%, about 10% and about 70%, about 10% and about 100%, about 10% and about 120%, about 10% and about 150%, about 10% and about 200%, about 10% and about 250%, about 10% and about 300%, about 10% and about 400%, about 20% and about 50%, about 20% and about 70%, about 20% and about 100%, about 20% and about 120%, about 20% and about 150%, about 20% and about 200%, about 20% and about 250%, about 20% and about 300%, about 20% and about 400%, about 30% and about 50%, about 30% and about 70%, about 30% and about 100%, about 30% and about 120%, about 30% and about 150%, about 30% and about 200%, about 30% and about 250%, about 30% and about 300%, about 30% and about 400%, about 40% and about 50%, about 40% and about 70%, about 40% and about 100%, about 40% and about 120%, about 40% and about 150%, about 40% and about 200%, about 40% and about 250%, about 40% and about 300%, about 40% and about 400%, about 50% and about 70%, about 50% and about 100%, about 50% and about 120%, about 50% and about 150%, about 50% and about 200%, about 50% and about 250%, about 50% and about 300%, about 50% and about 400%, about 60% and about 70%, about 60% and about 100%, about 60% and about 120%, about 60% and about 150%, about 60% and about 200%, about 60% and about 250%, about 60% and about 300%, about 60% and about 400%, about 70% and about 100%, about 70% and about 120%, about 70% and about 150%, about 70% and about 200%, about 70% and about 250%, about 70% and about 300%, about 70% and about 400%, about 80% and about 100%, about 80% and about 120%, about 80% and about 150%, about 80% and about 200%, about 80% and about 250%, about 80% and about 300%, about 80% and about 400%, about 90% and about 100%, about 90% and about 120%, about 90% and about 150%, about 90% and about 200%, about 90% and about 250%, about 90% and about 300%, about 90% and about 400%, about 100% and about 120%, about 100% and about 150%, about 100% and about 200%, about 100% and about 250%, about 100% and about 300%, about 100% and about 400%, about 120% and about 150%, about 120% and about 200%, about 120% and about 250%, about 120% and about 300%, about 120% and about 400%, about 150% and about 200%, about 150% and about 250%, about 150% and about 300%, or about 150% and about 400%, of the CD45 signal exhibited by a target cell when comparably labeled, including all ranges and subranges therebetween. In some embodiments, each of the hydrogel beads in the second population exhibit such CD45 signal when comparably labeled.

In some embodiments, the CD34 signal exhibited by the hydrogel beads in the second population is lower than the CD34 signal exhibited by the hydrogel beads in the first population, when comparably labeled. In some embodiments, the hydrogel beads in the second population exhibit no more than 10% of the CD34 signal exhibited by a target cell when comparably labeled. In some embodiments, the hydrogel beads in the second population exhibit no more than 50%, no more than 40%, no more than 30%, no more than 20%, or no more than 10%, of the CD34 signal exhibited by the target cell, when comparably labeled. In some embodiments, the hydrogel beads in the second population exhibit no more than 0.1%, no more than 0.2%, no more than 0.3%, no more than 0.5%, no more than 0.7%, no more than 1%, no more than 2%, no more than 3%, no more than 5%, or no more than 7%, of the CD34 signal exhibited by the target cell, when comparably labeled.

In some embodiments, the CD34 and/or CD45 extracellular domains present on the cell surface of the target cell is the median amount of CD34 and/or CD45 extracellular domains present on the surface of cells in a leukopack enriched in CD34+ cells using regimen H treatment. In some embodiments, the CD34 and/or CD45 signal exhibited by the target cell is the median amount of CD34 and/or CD45 signal exhibited by cells in a leukopack enriched in CD34+ cells using regimen H treatment, when comparably labeled. In another embodiment, the present disclosure provides a means for determining the resolution and/or sensitivity of an intracellular protein quantification assay. Hydrogel beads, in one embodiment, encapsulate known amounts of protein, at various concentrations, and subsequently stained with the appropriate protein antibody. Fluorescence is measured for the various beads to determine the sensitivity and/or dynamic range of the assay. The fluorescence values can then be compared to the values obtained from cells in a sample, to determine whether a target cell is present and whether it contains the intracellular protein, and the amount of the protein.

In one embodiment, individual hydrogel beads are tuned to have at least one optical property substantially similar to a circulating tumor cell or a fetal cell, present in maternal blood. The individual beads are embedded with known quantities of a biomolecule of interest. The beads are used to generate a standard curve for a biomolecule detection assay for the particular cell type.

In some embodiments, the hydrogel particle is formed by polymerizing at least one bifunctional monomer and after formation, the hydrogel particle includes one or more functional groups that can be used for further attachment of a cell surface marker, an epitope binding region of a cell surface marker, a fluorescent dye, or combination thereof. The free functional group, in one embodiment, is an amine group, a carboxyl group, a hydroxyl group or a combination thereof. Depending on the functionalization desired, it is to be understood that multiple bifunctional monomers can be used, for example, to functionalize the particle using different chemistries and with different molecules.

A hydrogel particle can be functionalized with any fluorescent dye known in the art, including fluorescent dyes listed in The MolecularProbes® Handbook—A Guide to Fluorescent Probes and Labeling Technologies, incorporated herein by reference in its entirety for all purposes. Functionalization can be mediated by a compound comprising a free amine group, e.g. allylamine, which can be incorporated into a bifunctional monomer used to form the hydrogel, as discussed above.

Non-limiting examples of known fluorescent dyes that can be used to functionalize the surface of a particle described herein include: 6-carboxy-4',5'-dichloro-2',7'-dimethoxyfluorescein succinimidylester; 5-(6)-carboxyeosin; 5-carboxyfluorescein; 6-carboxyfluorescein; 5-(6)-carboxyfluorescein; S-carboxyfluorescein-bis-(5-carboxymethoxy-2-nitrobenzyl)ether, β-alanine-carboxamide, or succinimidyl ester; 5-carboxyfluoresceinsuccinimidyl ester; 6-carboxyfluorescein succinimidyl ester; 5-(6)-carboxyfluorescein succinimidyl ester; 5-(4,6-dichlorotriazinyl) amino fluorescein; 2', 7'-difluoro fluorescein; eosin-5-isothiocyanate; erythrosin5-isothiocyanate; 6-(fluorescein-5-carboxamido) hexanoic acid or succinimidyl ester; 6-(fluorescein-5-(6)-carboxamido)hexanoic acid or succinimidylester; fluorescein-S-EX succinimidyl ester; fluorescein-5-isothiocyanate; fluorescein-6-isothiocyanate; Oregon Green® 488 carboxylic acid, or succinimidyl ester; Oregon Green® 488 isothiocyanate; Oregon Green® 488-X succinimidyl ester; Oregon Green® 500 carboxylic acid; Oregon Green® 500 carboxylic acid, succinimidylester or triethylammonium salt; Oregon Green® 514 carboxylic acid; Oregon Green® 514 carboxylic acid or succinimidyl ester; Rhodamine Green™ carboxylic acid, succinimidyl ester or hydrochloride; Rhodamine Green™ carboxylic acid, trifluoroacetamide or succinimidylester; Rhodamine Green™-X succinimidyl ester or hydrochloride; RhodolGreen™ carboxylic acid, N,O-bis-(trifluoroacetyl) or succinimidylester; bis-(4-carboxypiperidinyl) sulfone rhodamine or di(succinimidylester); 5-(6)carboxynaphtho fluorescein,5-(6)-carboxynaphthofluorescein succinimidyl ester; 5-carboxyrhodamine 6G hydrochloride; 6-carboxyrhodamine6Ghydrochloride, 5-carboxyrhodamine 6G succinimidyl ester; 6-carboxyrhodamine 6G succinimidyl ester; 5-(6)-carboxyrhodamine 6G succinimidyl ester; 5-carboxy-2',4',5',7'-tetrabromosulfonefluorescein succinimidyl esteror bis-(diisopropylethylammonium) salt; 5-carboxytetramethylrhodamine; 6-carboxytetramethylrhodamine; 5-(6)-carboxytetramethylrhodamine; 5-carboxytetramethylrhodamine succinimidyl ester; 6-carboxytetramethylrhodaminesuccinimidyl ester; 5-(6)-carboxytetramethylrhodamine succinimidyl ester; 6-carboxy-X-rhodamine; 5-carboxy-X-rhodamine succinimidyl ester; 6-carboxy-Xrhodamine succinimidyl ester; 5-(6)-carboxy-X-rhodaminesuccinimidyl ester; 5-carboxy-X-rhodamine triethylammonium salt; Lissamine™ rhodamine B sulfonyl chloride; malachite green; isothiocyanate; NANOGOLD® mono(sulfosuccinimidyl ester); QSY® 21 carboxylic acid or succinimidyl ester; QSY® 7 carboxylic acid or succinimidyl ester; Rhodamine Red™-X succinimidyl ester; 6-(tetramethylrhodamine-5-(6)-carboxamido) hexanoic acid; succinimidyl ester; tetramethylrhodamine-5-isothiocyanate; tetramethylrhodamine-6-isothiocyanate; tetramethylrhodamine-5-(and-6)-isothiocyanate; Texas Red® sulfonyl; Texas Red® sulfonyl chloride; Texas Red®-X STP ester or sodium salt; Texas Red®-X succinimidyl ester; Texas Red®-X succinimidyl ester; and X-rhodamine-5-(6) isothiocyanate.

Other examples of fluorescent dyes for use with the particles described herein include, but are not limited to, BODIPY® dyes commercially available from Invitrogen, including, but not limited to BODIPY® FL; BODIPY® TMR STP ester; BODIPY® TR-X STP ester; BODIPY® 630/650-X STPester; BODIPY® 650/665-X STP ester; 6-dibromo-4,4-difluoro-5,7-dimethyl-4-bora-3a,4a-diaza-s-indacene-3-propionic acid or succinimidyl ester; 4,4-difluoro-4-bora-3a,4a-diaza-s-indacene-3,5-dipropionic acid; 4,4-difluoro-5,7-dimethyl-4-bora-3a,4a-diaza-s-indacene-3-pentanoicacid; 4,4-difluoro-5,7-dimethyl-4-bora3a,4a-diaza-s-indacene-3-pentanoicacid or succinimidyl ester; 4,4-difluoro-5,7-dimethyl-4-bora-3a, 4a-diaza-s-indacene-3propionic acid; 4,4-difluoro-5,7-dimethyl-4-bora-3a,4a-diaza-s-indacene-3-propionic acid succinimidyl ester; 4,4difluoro-5,7-dimefhyl-4-bora-3a,4a-diaza-s-indacene-3propionic acid; sulfosuccinimidyl ester, or sodium salt; 6-((4,4-difluoro-5,7-dimethyl-4-bora-3a,4a-diaza-s-indacene-3propionyl)amino) hexanoic acid; 6-((4,4-difluoro-5,7-dimethyl-4-bora-3a,4a-diaza-s-indacene-3-propionyl) amino) hexanoic acid or succinimidyl ester; N-(4, 4-difluoro-5,7-dimethyl-4-bora-3a,4a-diaza-s-indacene-3- propionyl) cysteic acid, succinimidyl ester, or triethylammonium salt; 6-4,4-difluoro-1,3-dimethyl-5-(4-methoxyphenyl)-4-bora-3a,4a-4,4-difluoro-5,7-diphenyl-4-bora-3a, 4a-diaza-s-indacene-3-propionic acid; 4,4-difluoro-5,7-diphenyl-4-bora3a,4a-diaza-s-indacene-3-propionic acid, or succinimidyl ester; 4,4-difluoro-5-phenyl-4-bora-3a,4a-diaza-s-indacene-3-propionic acid, or succinimidyl ester; 6-((4,4-difluoro-5-phenyl-4-bora-3a,4a-diaza-s-indacene-3-propionyl)amino) hexanoic acid or succinimidyl ester; 4,4-difluoro-5-(4-phenyl-1,3butadienyl)-4-bora-3a,4a-diaza-s-indacene-3-propionicacidor succinimidyl ester; 4,4-difluoro-5-(2-pyrrolyl)-4-bora-3a,4a-diaza-s-indacene-3-propionic acid or succinimidyl ester; 6-(((4,4-difluoro-5-(2-pyrrolyl)-4-bora-3a,4a-diaza-s-indacene-3-yl)styryloxy) acetyl)aminohexanoic acid or succinimidyl ester; 4,4-difluoro-5-styryl-4-bora-3 a, 4a-diaza-s-indacene-3-propionic acid; 4, 4-difluoro-5-styryl-4-bora-3a,4a-diaza-s-indacene-3-propionic acid or succinimidyl ester; 4,4-difluoro-1,3,5,7-tetramethyl-4-bora-3a,4a-diaza-s-indacene-8-propionic acid; 4,4-difluoro-1,3,5,7-tetramethyl-4bora-3a, 4a-diaza-s-indacene-8-propionic acid or succinimidyl ester; 4,4-difluoro-5-(2-thienyl)-4-bora-3a,4a-diaza-s-indacene-3-propionic acid or succinimidyl ester; 6-(((4-(4,4-difluoro-5-(2-thienyl)-4-bora-3a,4a-diaza-s-indacene-3-yl)phenoxy) acetyl)amino)hexanoic acid or succinimidyl ester; and 6-(((4,4-difluoro-5-(2-thienyl)-4-bora-3a,4a-diaza-s-indacene-3-yl)styryloxy)acetyl) aminohexanoic acid or succinimidyl ester.

Fluorescent dyes for derivatization of the surface of one or more hydrogel particles in one embodiment, include, but are not limited to, Alexa fluor dyes commercially available from Invitrogen, including but not limited to Alexa Fluor®350 carboxylic acid; Alexa Fluor®430 carboxylic acid; Alexa Fluor®488 carboxylic acid; Alexa Fluor®532 carboxylic acid; Alexa Fluor® 546 carboxylic acid; Alexa Fluor®555 carboxylic acid; Alexa Fluor®568 carboxylic acid; Alexa Fluor®594 carboxylic acid; Alexa Fluor®633 carboxylic acid; Alexa Fluor®64 7 carboxylic acid; Alexa Fluor®660 carboxylic acid; and Alexa Fluor®680 carboxylic acid. In another embodiment, fluorescent dyes for use with the hydrogel particles and methods described herein include cyanine dyes commercially available from Amersham-Pharmacia Biotech, including, but not limited to Cy3 NHS ester; Cy 5 NHS ester; Cy5.5 NHSester; and Cy7 NHS ester.

It is within the ordinary skill in the art to select a suitable dye or dyes based on the desired spectral excitation and emission properties of the hydrogel particle.

Compositions Comprising the First and the Second Population of Hydrogel Beads

In some embodiments, the disclosure provides compositions comprising both the first population and the second population of hydrogel beads of the disclosure.

In some embodiments, the active portion of the composition further comprises a third population of hydrogel beads (e.g., those that contain a third cell surface biomarker but do not contain any CD45 or CD34 extracellular domains). In some other embodiments, the active portion of the composition consists of the first population and the second population of hydrogel beads of the disclosure.

In some embodiments, the first population and the second population of hydrogel beads together comprise at least 80%, at least 85%, at least 90%, at least 95%, at least 96%, at least 97%, at least 98%, at least 99%, at least 99.5%, or 100% of the number of hydrogel beads in the active portion of the composition. In some embodiments, during the manufacturing process and/or extended storage, a small fraction of the hydrogel beads may not be labeled with the target biomarker profile (e.g., with the amount of a biomarker falling outside of the specified range). This is one of the reasons why, in some embodiments, the first population and the second population of hydrogel beads together may comprise less than the entire active portion of the composition. In some embodiments, the first population and the second population of hydrogel beads together may comprise between about 50% and about 55%, between about 55% and about 60%, between about 60% and about 65%, between about 65% and about 70%, between about 70% and about 75%, between about 75% and about 80%, between about 80% and about 85%, between about 85% and about 90%, between about 90% and about 95%, between about 95% and about 97%, between about 97% and about 98%, between about 98% and about 99%, or between about 99% and 100%, of the active portion of the composition.

Hydrogel Beads as Cell Mimics for Cell Population without CD34 Enrichment

In some embodiments, the ratio of the number of the first population of hydrogel beads to the number of the second population of hydrogel beads is no more than 1, no more than 0.5, no more than 0.3, no more than 0.2, no more than 0.1, no more than 0.07, no more than 0.05, no more than 0.03, no more than 0.02, no more than 0.018, no more than 0.017, no more than 0.016, no more than 0.015, no more than 0.01, no more than 0.005, or no more than 0.001. In some embodiments, the ratio of the number of the first population of hydrogel beads to the number of the second population of hydrogel beads is no more than 0.0183.

In some embodiments, the ratio of the number of the first population of hydrogel beads to the number of the second population of hydrogel beads is between about 1 and about 0.5, between about 0.5 and about 0.2, between about 0.2 and about 0.1, between about 0.1 and about 0.05, between about 0.05 and about 0.02, between about 0.02 and about 0.015, between about 0.015 and about 0.01, between about 0.01 and about 0.005, between about 0.005 and about 0.002, or between about 0.002 and about 0.001, including all ranges and subranges therebetween. In some embodiments, the ratio of the number of the first population of hydrogel beads to the number of the second population of hydrogel beads is between about 0.0183 and about 0.0142.

In some embodiments, the first population of the hydrogel beads comprises between 0.1-30%, between 0.2-15%, between 0.3-10%, between 0.5-6%, between 1-3%, or between 1.2-2% of the number of hydrogel beads in the active portion of the composition, including all ranges and subranges therebetween. In some embodiments, the first population of the hydrogel beads comprises between 1-3% of the number of hydrogel beads in the active portion of the composition. In some embodiments, the second population of the hydrogel beads comprises between 40-99.9%, between 50-99%, between 60-99%, between 70-99%, between 80-99%, between 90-99%, or between 95-99%, of the number of hydrogel beads in the active portion of the composition, including all ranges and subranges therebetween. In some embodiments, the second population of the hydrogel beads comprises between 97-99% of the number of hydrogel beads in the active portion of the composition. In some embodiments, the first population of the hydrogel beads comprises between 1-3% of the number of hydrogel beads in the active portion of the composition, and the second population of the hydrogel beads comprises between 97-99% of the number of hydrogel beads in the active portion of the composition. In some embodiments, the first population of the hydrogel beads comprises between 1.4-

1.8% of the number of hydrogel beads in the active portion of the composition, and the second population of the hydrogel beads comprises between 98.2-98.6% of the number of hydrogel beads in the active portion of in the composition. In some embodiments, the combination of the first population and the second population of hydrogel beads together comprise at least 80%, at least 85%, at least 90%, at least 95%, at least 96%, at least 97%, at least 98%, at least 99%, at least 99.5%, or 100% of the number of hydrogel beads in the active portion of the composition.

Hydrogel Beads as Cell Mimics for CD34 Enriched Cell Population

In some embodiments, the ratio of the number of the first population of hydrogel beads to the number of the second population of hydrogel beads is at least 1, at least 2, at least 5, at least 7, at least 8, at least 9, at least 10, at least 11, at least 12, at least 13, at least 14, at least 15, at least 16, at least 17, at least 18, at least 19, at least 20, at least 25, at least 30, at least 50, at least 70, or at least 100. In some embodiments, the ratio of the number of the first population of hydrogel beads to the number of the second population of hydrogel beads is at least 9.

In some embodiments, the ratio of the number of the first population of hydrogel beads to the number of the second population of hydrogel beads is between about 1 and about 2, between about 2 and about 5, between about 5 and about 8, between about 8 and about 10, between about 10 and about 12, between about 12 and about 15, between about 15 and about 20, between about 20 and about 50, between about 50 and about 100, including all ranges and subranges therebetween. In some embodiments, the ratio of the number of the first population of hydrogel beads to the number of the second population of hydrogel beads is between about 9 and about 19.

In some embodiments, the first population comprises between 10%-99%, between 20%-99%, between 30%-99%, between 40%-99%, between 50%-99%, between 60%-99%, between 70%-99%, between 80%-99%, or between 90%-99%, of the number of hydrogel beads in the active portion of the composition, including all ranges and subranges therebetween. In some embodiments, the first population comprises between 70%-95%, between 80%-95%, or between 90%-95% of the number of hydrogel beads in the active portion of the composition, including all ranges and subranges therebetween. In some embodiments, the first population comprises between 80%-95% of the number of hydrogel beads in the active portion of the composition. In some embodiments, the second population comprises between 1-90%, between 1-80%, between 1-70%, between 1-60%, between 1-50%, between 1-40%, between 1-30%, between 1-20%, between 1-10%, or between 1-5%, of the number of hydrogel beads in the active portion of the composition, including all ranges and subranges therebetween. In some embodiments, the second population comprises between 5-90%, between 5-70%, between 5-50%, between 5-30%, or between 5-20%, of the number of hydrogel beads in the active portion of the composition, including all ranges and subranges therebetween. In some embodiments, the second population comprises between 5-20% of the number of hydrogel beads in the active portion of the composition. In some embodiments, the second population comprises between 5-10% of the number of hydrogel beads in the active portion of the composition. In some embodiments, the first population comprises between 80-95% of the number of hydrogel beads in the active portion of the composition, and the second population comprises between 5-20% of the number of hydrogel beads in the active portion of the composition. In some embodiments, the first population comprises between 90-95% of the number of hydrogel beads in the active portion of the composition, and the second population comprises between 5-10% of the number of hydrogel beads in the active portion of the composition. In some embodiments, the combination of the first population and the second population of hydrogel beads together comprise at least 80%, at least 85%, at least 90%, at least 95%, at least 96%, at least 97%, at least 98%, at least 99%, at least 99.5%, or 100% of the number of hydrogel beads in the active portion of the composition.

Kits and Compositions

In some aspects, the present disclosure provides kits comprising one or more quantitation hydrogel particles as disclosed herein. In some embodiments, the kit comprises and instructions/reagents for attaching such molecules as desired.

In some aspects, the kits comprise at least two compositions: a first composition containing hydrogel beads as cell mimics for cell population without CD34 enrichment, and a second composition containing hydrogel beads as cell mimics for CD34 enriched cell population, as described supra. In some embodiments, these two compositions are stored in separate containers of the kit a first container and a second container, respectively. In some embodiments, the first container (with cells mimics for cell population without CD34 enrichment) comprises about $5 \times 10^5$ to about $2 \times 10^6$ beads, and the second container (with cell mimics for CD34 enriched cell population) comprises about $2.5 \times 10^5$ beads. In some embodiments, the ratio of (b) the total number of the first and second populations of hydrogel beads in the first container and (b) the total number of the first and second populations of hydrogel beads in the second container is between about 1 and about 10, between about 2 and about 8, between about 3 and about 6, or about 4, including all ranges and subranges therebetween.

Methods

In some aspects, the disclosure provides methods of calibrating a device for detecting a target cell in a population of cells, comprising sampling a composition or kit of the disclosure, and calibrating the device based on at least one property of the hydrogel beads of the composition or kit. In some embodiments, the device is a cytometer. In some embodiments, the target cell is a CD34-expressing cell. In some embodiments, the composition comprises both the first population and the second population of hydrogel beads of the disclosure. In some embodiments, the sampling comprises sampling at least two different compositions of the disclosure, wherein these different compositions contain different ratios of the first population versus the second population of hydrogel beads. In some embodiments, the calibration is based on at least one optical property of the hydrogel beads.

In some embodiments, the disclosure provides methods of enriching target cells, comprising sampling a composition or kit of the disclosure and forming a selection scheme based on at least one property of the hydrogel beads of the composition or kit, and selecting the target cells in a population of cells based on the selection scheme. In some embodiments, the method uses a cytometer to enrich target cells. In some embodiments, the selection scheme comprises a gating scheme. In some embodiments, the composition comprises both the first population and the second population of hydrogel beads of the disclosure. In some embodiments, the sampling comprises sampling at least two different compositions of the disclosure, wherein these different compositions contain different ratios of the first population versus the second population of hydrogel beads. In some embodiments, the target cells comprise CD34-expressing cells. In some embodiments, the at least one property comprises at least one optical property of the hydrogel beads.

In some embodiments, the method comprises sampling the population of cells and obtaining a cell comprising the at least one property of the cell (e.g., an optical property). In some embodiments, the method comprises forming a gating scheme based on the at least one property of the cell (e.g., an optical property).

In some embodiments, the at least one optical property comprises FSC, SSC, fluorescence intensity of CD45, fluorescence intensity of CD34, or any combination thereof. In some embodiments, the at least one optical property comprises at least two, at least three, or all of the optical properties of FSC, SSC, fluorescence intensity of CD45, and fluorescence intensity of CD34. In some embodiments, the at least one optical property comprises the fluorescence intensity of CD45 and the fluorescence intensity of CD34.

In some embodiments, the CD34-expressing cell expresses a diminished amount of CD45. In some embodiments, the CD34-expressing cell is a CD34-expressing stem cell.

FURTHER NUMBER EMBODIMENTS

Further numbered embodiments of the invention are provided as follows:

Embodiment 1. A composition comprising a first population of hydrogel beads comprising:
 a) a polymerized monomer and a bifunctional monomer; and
 b) a cell surface biomarker profile comprising:
  i) CD34 and CD45 extracellular domains.

Embodiment 2. The composition of Embodiment 1, comprising a second population of hydrogel beads comprising:
 c) a polymerized monomer and a bifunctional monomer; and
 d) a cell surface biomarker profile comprising:
  i) CD45 extracellular domain, but lacking a CD34 extracellular domain.

Embodiment 3. The composition of Embodiment 1, comprising a second population of hydrogel beads comprising:
 c) a polymerized monomer and a bifunctional monomer; and
 d) a cell surface biomarker profile comprising:
  i) CD45 extracellular domain,
wherein the hydrogel beads in the second population comprises no more than 10% of the median number of CD34 extracellular domain comprised in the first population of hydrogel beads.

Embodiment 3.1. The composition of Embodiment 1, comprising a second population of hydrogel beads comprising: c) a polymerized monomer and a bifunctional monomer; and d) a cell surface biomarker profile comprising: i) CD45 extracellular domain, wherein each of the hydrogel beads in the second population comprises no more than 10% of the median number of CD34 extracellular domain comprised in the first population of hydrogel beads.

Embodiment 4. The composition of Embodiment 3 or 3.1, wherein the hydrogel beads in the second population comprises no more than 0.1%, no more than 0.2%, no more than 0.3%, no more than 0.5%, no more than 0.7%, no more than 1%, no more than 2%, no more than 3%, no more than 5%, or no more than 7%, of the median number of CD34 extracellular domain comprised in the first population of hydrogel beads.

Embodiment 4.1. The composition of Embodiment 3 or 3.1, wherein each of the hydrogel beads in the second population comprises no more than 0.1%, no more than 0.2%, no more than 0.3%, no more than 0.5%, no more than 0.7%, no more than 1%, no more than 2%, no more than 3%, no more than 5%, or no more than 7%, of the median number of CD34 extracellular domain comprised in the first population of hydrogel beads.

Embodiment 5. The composition of any one of Embodiments 1-4.1, wherein the hydrogel beads in the first population comprises between about 10% and about 400% of the amount of CD45 extracellular domain present on the cell surface of a target cell.

Embodiment 5.1. The composition of any one of Embodiments 1-4.1, wherein each of the hydrogel beads in the first population comprises between about 10% and about 400% of the amount of CD45 extracellular domain present on the cell surface of a target cell.

Embodiment 6. The composition of Embodiment 5, wherein the hydrogel beads in the first population comprises between about 10% and about 300%, about 20% and about 400%, about 20% and about 300%, about 20% and about 200%, or about 50% and about 200%, of the amount of CD45 extracellular domain present on the cell surface of a target cell.

Embodiment 6.1. The composition of Embodiment 5.1, wherein each of the hydrogel beads in the first population comprises between about 10% and about 300%, about 20% and about 400%, about 20% and about 300%, about 20% and about 200%, or about 50% and about 200%, of the amount of CD45 extracellular domain present on the cell surface of a target cell.

Embodiment 7. The composition of any one of Embodiments 1-6.1, wherein the hydrogel beads in the first population comprises between about 10% and about 400% of the amount of CD34 extracellular domain present on the cell surface of a target cell.

Embodiment 7.1. The composition of any one of Embodiments 1-6.1, wherein each of the hydrogel beads in the first population comprises between about 10% and about 400% of the amount of CD34 extracellular domain present on the cell surface of a target cell.

Embodiment 8. The composition of Embodiment 7, wherein the hydrogel beads in the first population comprises between about 10% and about 300%, about 20% and about 400%, about 20% and about 300%, about 20% and about 200%, or about 50% and about 200%, of the amount of CD34 extracellular domain present on the cell surface of a target cell.

Embodiment 8.1. The composition of Embodiment 7.1, wherein each of the hydrogel beads in the first population comprises between about 10% and about 300%, about 20% and about 400%, about 20% and about 300%, about 20% and about 200%, or about 50% and about 200%, of the amount of CD34 extracellular domain present on the cell surface of a target cell.

Embodiment 9. The composition of any one of Embodiments 2-8.1, wherein the hydrogel beads in the second population comprises between about 10% and about 400% of the amount of CD45 extracellular domain present on the cell surface of a target cell.

Embodiment 9.1. The composition of any one of Embodiments 2-8.1, wherein each of the hydrogel beads in the second population comprises between about 10% and about 400% of the amount of CD45 extracellular domain present on the cell surface of a target cell.

Embodiment 10. The composition of Embodiment 9, wherein the hydrogel beads in the second population comprises between about 10% and about 300%, about 20% and about 400%, about 20% and about 300%, about 20% and about 200%, or about 50% and about 200%, of the amount of CD45 extracellular domain present on the cell surface of a target cell.

Embodiment 10.1. The composition of Embodiment 9.1, wherein each of the hydrogel beads in the second population comprises between about 10% and about 300%, about 20% and about 400%, about 20% and about 300%, about 20% and about 200%, or about 50% and about 200%, of the amount of CD45 extracellular domain present on the cell surface of a target cell.

Embodiment 11. The composition of any one of Embodiments 2-10.1, wherein the hydrogel beads in the second population comprises no more than 10% of the amount of CD34 extracellular domain present on the cell surface of a target cell.

Embodiment 11.1. The composition of any one of Embodiments 2-10.1, wherein each of the hydrogel beads in the second population comprises no more than 10% of the amount of CD34 extracellular domain present on the cell surface of a target cell.

Embodiment 12. The composition of Embodiment 11, wherein the hydrogel beads in the second population comprises no more than 0.1%, no more than 0.2%, no more than 0.3%, no more than 0.5%, no more than 0.7%, no more than 1%, no more than 2%, no more than 3%, no more than 5%, or no more than 7%, of the amount of CD34 extracellular domain present on the cell surface of a target cell.

Embodiment 12.1. The composition of Embodiment 11.1, wherein each of the hydrogel beads in the second population comprises no more than 0.1%, no more than 0.2%, no more than 0.3%, no more than 0.5%, no more than 0.7%, no more than 1%, no more than 2%, no more than 3%, no more than 5%, or no more than 7%, of the amount of CD34 extracellular domain present on the cell surface of a target cell.

Embodiment 13. The composition of any one of Embodiments 5-12.1, wherein the amount of CD34 and/or CD45 extracellular domains present on the cell surface of the target cell is the median amount of CD34 and/or CD45 extracellular domains present on the surface of cells in a leukopack enriched in CD34+ cells using regimen H treatment.

Embodiment 14. The composition of any one of Embodiments 5-13, wherein the target cell is a hematopoietic stem cell.

Embodiment 15. The composition of any one of Embodiments 5-14, wherein the target cell is a CD45dim-positive (CD45dim+) and CD34-positive (CD34+) stem cell.

Embodiment 16. The composition of any one of Embodiments 5-15, wherein the target cell is a lymphocyte cell.

Embodiment 17. The composition of any one of Embodiments 5-16, wherein the amount of the CD45 and/or CD34 extracellular domains present in the hydrogel and/or on the cell surface is measured based on the fluorescence intensity using flow cytometry.

Embodiment 18. The composition of Embodiment 17, wherein the fluorescence intensity of CD45 extracellular domain is measured using a fluorophore labeled CD45-specific binding molecule, and/or wherein the fluorescence intensity of CD34 extracellular domain is measured using a fluorophore labeled CD34-specific binding molecule.

Embodiment 19. The composition of Embodiment 18, wherein the binding molecule comprises a monoclonal antibody or antigen binding fragment thereof.

Embodiment 20. The composition of any one of Embodiments 18-19, wherein the CD34-specific binding molecule is selected from: a phycoerythrin (PE) labeled anti-CD34 antibody clone 8G12, a phycoerythrin (PE) labeled anti-CD34 antibody clone AC136, an allophycocyanin (APC) labeled anti-CD34 antibody clone 4H11, and a Brilliant™ Violet 421 (BV421) labeled anti-CD34 antibody clone 581.

Embodiment 21. The composition of any one of Embodiments 18-20, wherein the CD45-specific binding molecule is selected from: a fluorescein isothiocyanate (FITC) labeled anti-CD45 antibody clone 2D1, a PerCP-Cyanine® 5.5 (PerCP-Cy5.5) labeled anti-CD45 antibody clone 2D1, a phycoerythrin (PE) labeled anti-CD45 antibody clone MEM-28, and a BD Horizon™ V500 labeled anti-CD45 antibody clone HI30.

Embodiment 22. The composition of any one of Embodiments 18-21, wherein the combination of the CD34-specific binding molecule and the CD45-specific binding molecule are selected from one of the panels in Table 4; optionally, wherein the combination is panel 1 in Table 4.

Embodiment 23. The composition of any one of Embodiments 1-22, wherein the biomarker(s) are attached to a matrix of the hydrogel bead via a linker.

Embodiment 24. The composition of any one of Embodiments 1-23, wherein the biomarker(s) are covalently attached to a matrix of the hydrogel bead.

Embodiment 25. The composition of any one of Embodiments 1-23, wherein the biomarker(s) are non-covalently attached to a matrix of the hydrogel bead.

Embodiment 26. The composition of any one of Embodiments 1-25, wherein the hydrogel beads of the first and/or second populations have a (mean) diameter of between about 1 m and about 40 µm, between about 20 µm and about 30 µm, between about 3 µm and about 20 m, or about 4-10 µm.

Embodiment 27. The composition of any one of Embodiments 2-26, wherein an active portion of the composition comprises or consists of the first and second population of hydrogel beads.

Embodiment 28. The composition of Embodiment 27: wherein the first population comprises between 1-3% of the number of hydrogel beads in the active portion of the composition.

Embodiment 29. The composition of any one of Embodiments 27-28: wherein the second population comprises between 50-99% of the number of hydrogel beads in the active portion of the composition; wherein any remainder in the active portion of the composition comprises hydrogel beads lacking CD34 and lacking CD45.

Embodiment 30. The composition of Embodiment 27 or 28: wherein the second population comprises between 97-99% of the number of hydrogel beads in the active portion of the composition; wherein any remainder in the active portion of the composition comprises hydrogel beads lacking CD34 and lacking CD45.

Embodiment 31. The composition of Embodiment 27 or 28: wherein the first population comprises between 1-3% of the number of hydrogel beads in the active portion of the composition; and wherein the second population comprises between 97-99% of the number of hydrogel beads in the active portion of the composition.

Embodiment 32. The composition of Embodiment 27 or 28: wherein the first population comprises between 1.4-1.8% of the number of hydrogel beads in the active portion of the composition; and wherein the second population comprises between 98.2-98.6% of the number of hydrogel beads in the active portion of in the composition.

Embodiment 33. The composition of any one of Embodiments 27-32, wherein the first population and the second population of hydrogel beads together comprise at least 80%, at least 85%, at least 90%, at least 95%, at least 96%, at least 97%, at least 98%, at least 99%, at least 99.5%, or 100% of the number of hydrogel beads in the active portion of the composition.

Embodiment 34. The composition of any one of Embodiments 2-33, wherein the ratio of the number of the first population of hydrogel beads to the number of the second population of hydrogel beads is no more than 1, no more than 0.5, no more than 0.3, no more than 0.2, no more than 0.1, no more than 0.07, no more than 0.05, no more than 0.03, no more than 0.02, no more than 0.018, no more than 0.017, no more than 0.016, no more than 0.015, no more than 0.01, no more than 0.005, or no more than 0.001.

Embodiment 35. The composition of Embodiment 34, wherein the ratio of the number of the first population of hydrogel beads to the number of the second population of hydrogel beads is no more than 0.0183.

Embodiment 36. The composition of any one of Embodiments 2-35, wherein the ratio of the number of the first population of hydrogel beads to the number of the second population of hydrogel beads is between about 1 and about 0.5, between about 0.5 and about 0.2, between about 0.2 and about 0.1, between about 0.1 and about 0.05, between about 0.05 and about 0.02, between about 0.02 and about 0.015, between about 0.015 and about 0.01, between about 0.01 and about 0.005, between about 0.005 and about 0.002, or between about 0.002 and about 0.001, including all ranges and subranges therebetween.

Embodiment 37. The composition of Embodiment 36, wherein the ratio of the number of the first population of hydrogel beads to the number of the second population of hydrogel beads is between about 0.0183 and about 0.0142.

Embodiment 38. The composition of Embodiment 27: wherein the first population comprises between 10%-95% of the number of hydrogel beads in the active portion of the composition.

Embodiment 39. The composition of Embodiment 27: wherein the first population comprises between 80%-95% of the number of hydrogel beads in the active portion of the composition.

Embodiment 40. The composition of any one of Embodiments 27 and 38-39: wherein the second population comprises between 5-90% of the number of hydrogel beads in the active portion of the composition; wherein any remainder in the active portion of the composition comprises hydrogel beads lacking CD34 or CD45.

Embodiment 41. The composition of any one of Embodiments 27 and 38-39: wherein the second population comprises between 5-20% of the number of hydrogel beads in the active portion of the composition.

Embodiment 42. The composition of Embodiment 27: wherein the first population comprises between 80-95% of the number of hydrogel beads in the active portion of the composition; and wherein the second population comprises between 5-20% of the number of hydrogel beads in the active portion of the composition.

Embodiment 43. The composition of Embodiment 27: wherein the first population comprises between 90-95% of the number of hydrogel beads in the active portion of the composition; and wherein the second population comprises between 5-10% of the number of hydrogel beads in the active portion of the composition.

Embodiment 44. The composition of any one of Embodiments 27 and 38-43, wherein the first population and the second population of hydrogel beads together comprise at least 80%, at least 85%, at least 90%, at least 95%, at least 96%, at least 97%, at least 98%, at least 99%, at least 99.5%, or 100% of the number of hydrogel beads in the active portion of the composition.

Embodiment 45. The composition of any one of Embodiments 2-27 and 38-44, wherein the ratio of the number of the first population of hydrogel beads to the number of the second population of hydrogel beads is at least 1, at least 2, at least 5, at least 7, at least 8, at least 9, at least 10, at least 11, at least 12, at least 13, at least 14, at least 15, at least 16, at least 17, at least 18, at least 19, at least 20, at least 25, at least 30, at least 50, at least 70, or at least 100.

Embodiment 46. The composition of Embodiment 45, wherein the ratio of the number of the first population of hydrogel beads to the number of the second population of hydrogel beads is at least 9.

Embodiment 47. The composition of any one of Embodiments 2-27 and 38-46, wherein the ratio of the number of the first population of hydrogel beads to the number of the second population of hydrogel beads is between about 1 and about 2, between about 2 and about 5, between about 5 and about 8, between about 8 and about 10, between about 10 and about 12, between about 12 and about 15, between about 15 and about 20, between about 20 and about 50, between about 50 and about 100, including all ranges and subranges therebetween.

Embodiment 48. The composition of Embodiment 47, wherein the ratio of the number of the first population of hydrogel beads to the number of the second population of hydrogel beads is between about 9 and about 19.

Embodiment 49. A kit comprising:
  a first container, comprising the composition of any one of Embodiments 28-37; and
  a second container, comprising the composition of any one of Embodiments 38-48.

Embodiment 50. The kit of Embodiment 49, wherein the first container comprises at least 2, 3, 4, 5, 6, 7, 8 or more times the hydrogel beads than the second container.

Embodiment 51. The kit of Embodiment 49 or 50, wherein the first container comprises about 5×105 to about 2×106 beads and the second container comprises about 1×105 to about 4×105 beads.

Embodiment 52. The kit of any one of Embodiments 49-51, wherein the first container comprises about 1×106 beads and the second container comprises about 2.5×105 beads.

Embodiment 53. The kit of any one of Embodiments 49-52, wherein the ratio of (a) the total number of the first and second populations of hydrogel beads in the first container and (b) the total number of the first and second populations of hydrogel beads in the second container is between about 1 and about 10, between about 2 and about 8, between about 3 and about 6, or about 4, including all ranges and subranges therebetween.

Embodiment 54. The composition or kit of any one of Embodiments 1-53, wherein the CD34 and CD45 cell surface markers each comprise a fluorophore.

Embodiment 55. The composition or kit of any one of Embodiments 1-54, wherein the CD34 and CD45 cell surface markers each comprise a different fluorophore.

Embodiment 56. The composition or kit of Embodiments 54 or 55, wherein each fluorophore is independently selected from any one of: peridinin chlorophyll protein-cyanine 5.5 dye (PerCP-Cy5.5); phycoerythrin-cyanine7 (PE Cy7); allophycocyanin-cyanine 7 (APC-Cy7); fluorescein isothiocyanate (FJTC); phycoerythrin (PE); allophyscocyanin (APC); 6-carboxy-4',5'-dichloro-2',7'-dimethoxyfluorescein succinimidylester; 5-(and-6)-carboxyeosin; 5-carboxyfluorescein; 6 carboxyfluorescein; 5-(and-6)-carboxyfluorescein; S-carboxyfluorescein-bis-(5-carboxymethoxy-2-nitrobenzyl) ether,-alanine-carboxamide, or succinimidyl ester; 5-carboxy fluorescein succinimidyl ester; 6-carboxyfluorescein succinimidyl ester; 5-(and-6)-carboxyfluorescein succinimidyl ester; 5-(4,6-dichlorotriazinyl) amino fluorescein; 2',7'-difluoro fluorescein; eosin-5-isothiocyanate; erythrosin5-isothiocyanate; 6-(fluorescein-5-carboxamido) hexanoic acid or succinimidyl ester; 6-(fluorescein-5-(and-6)-carboxamido) hexanoic acid or succinimidylester; fluorescein-S-EX succinimidyl ester; fluorescein-5-isothiocyanate; fluorescein-6-isothiocyanate; OregonGreen® 488 carboxylic acid, or succinimidyl ester; Oregon Green® 488 isothiocyanate; Oregon Green® 488-X succinimidyl ester; Oregon Green® 500 carboxylic acid; Oregon Green® 500 carboxylic acid, succinimidylester or triethylammonium salt; Oregon Green® 514 carboxylic acid; Oregon Green® 514 carboxylic acid or succinimidyl ester; RhodamineGreen™ carboxylic acid, succinimidyl ester or hydrochloride; Rhodamine Green™ carboxylic acid, trifluoroacetamide or succinimidylester; Rhodamine Green™-X succinimidyl ester or hydrochloride; RhodolGreen™ carboxylic acid, N,O-bis-(trifluoroacetyl) or succinimidylester; bis-(4-carboxypiperidinyl) sulfonerhodamine or di(succinimidylester); 5-(and-6)carboxynaphtho fluorescein,5-(and-6)carboxynaphthofluorescein succinimidyl ester; 5-carboxyrhodamine 6G hydrochloride; 6-carboxyrhodamine 6G hydrochloride, 5-carboxyrhodamine 6G succinimidyl ester; 6-carboxyrhodamine 6G succinimidyl ester; 5-(and-6)-carboxyrhodamine6G succinimidyl ester; 5-carboxy-2',4',5',7'-tetrabromosulfonefluorescein succinimidyl esteror bis-(diisopropylethylammonium) salt; 5-carboxytetramethylrhodamine; 6-carboxytetramethylrhodamine; 5-(and-6)-carboxytetramethylrhodamine; 5-carboxytetramethylrhodamine succinimidyl ester; 6-carboxytetramethylrhodaminesuccinimidyl ester; 5-(and-6)-carboxytetramethylrhodamine succinimidyl ester; 6-carboxy-X-rhodamine; 5-carboxy-X-rhodamine succinimidyl ester; 6-carboxy-X-rhodamine succinimidyl ester; 5-(and-6)-carboxy-X-rhodamine succinimidyl ester; 5-carboxy-X-rhodamine triethylammonium salt; Lissamine™ rhodamine B sulfonyl chloride; malachite green; isothiocyanate; NANOGOLD® mono(sulfosuccinimidyl ester); QSY® 21carboxylic acid or succinimidyl ester; QSY® 7 carboxylic acid or succinimidyl ester; Rhodamine Red™-X succinimidyl ester; 6-(tetramethylrhodamine-5-(and-6)-carboxamido) hexanoic acid; succinimidyl ester; tetramethylrhodamine-5-isothiocyanate; tetramethylrhodamine-6-isothiocyanate; tetramethylrhodamine-5-(and-6)-isothiocyanate; Texas Red® sulfonyl; Texas Red® sulfonyl chloride; Texas Red®-X STP ester or sodium salt; Texas Red®-X succinimidyl ester; Texas Red®-X succinimidyl ester; X-rhodamine-5-(and-6) isothiocyanate, BODIPY® FL; BODIPY® TMR STP ester; BODIPY® TR-X STP ester; BODIPY® 630/650-X STPester; BODIPY® 650/665-X STP ester; 6-dibromo-4,4-difluoro-5,7-dimethyl-4-bora-3a, 4a-diaza-s-indacene-3-propionic acid succinimidyl ester; 4,4-difluoro-4-bora-3a,4a-diaza-s-indacene-3,5-dipropionic acid; 4,4-difluoro-5,7-dimethyl-4-bora-3a,4a-diaza-s-indacene-3-pentanoicacid; 4,4-difluoro-5,7-dimethyl-4-bora3a,4a-diaza-s-indacene-3-pentanoicacid succinimidyl ester; 4,4-difluoro-5,7-dimefhyl-4-bora-3a,4a-diaza-s-indacene-3propionic acid; 4,4-difluoro-5,7-dimethyl-4-bora-3a, 4adiaza-s-indacene-3-propionic acid succinimidyl ester; 4,4-difluoro-5,7-dimefhyl-4-bora-3a,4a-diaza-s-indacene-3propionic acid; sulfosuccinimidyl ester or sodium salt; 6-((4,4-difluoro-5,7-dimethyl-4-bora-3a,4a-diaza-s-indacene-3propionyl)amino)hexanoic acid; 6-((4,4-difluoro-5, 7 dimethyl-4-bora-3a,4a-diaza-s-indacene-3-propionyl) amino)hexanoic acid or succinimidyl ester; N-(4,4-difluoro-5,7-dimethyl-4-bora-3a,4a-diaza-s-indacene-3-propionyl) cysteic acid, succinimidyl ester or triethylammonium salt; 6-4,4-difluoro-1,3-dimethyl-5-(4-methoxyphenyl)-4-bora-3a,4a-4,4-difluoro-5,7-diphenyl-4-bora-3a,4a-diaza-sindacene-3-propionic acid; 4,4-difluoro-5,7-diphenyl-4-bora-3a,4a-diaza-s-indacene-3-propionic acid succinimidyl ester; 4, 4-difluoro-5-phenyl-4-bora-3a, 4a-diaza-s-indacene-3-propionic acid; succinimidyl ester; 6-((4, 4-difluoro-5-phenyl-4-bora-3a,4a-diaza-s-indacene-3-propionyl)amino) hexanoic acid or succinimidyl ester; 4,4-difluoro-5-(4-phenyl-1,3butadienyl)-4-bora-3a,4a-diaza-s-indacene-3-propionic acid succinimidyl ester; 4, 4-difluoro-5-(2-pyrrolyl)-4-bora-3a,4a-diaza-s-indacene-3-propionic acid succinimidyl ester; 6-(((4,4-difluoro-5-(2-pyrrolyl)-4-bora-3a,4a-diaza-s-indacene-3-yl)styryloxy)acetyl)aminohexanoic acid or succinimidyl ester; 4,4-difluoro-5-styryl-4-bora-3a, 4a-diaza-s-indacene-3-propionic acid; 4,4-difluoro-5-styryl-4-bora-3a, 4a-diaza-sindacene-3-propionic acid; succinimidyl ester; 4,4-difluoro-1,3,5,7-tetramethyl-4-bora-3a,4a-diaza-s-indacene-8-propionic acid; 4,4-difluoro-1,3,5,7-tetramethyl-4-bora-3a,4a-diaza-sindacene-8-propionic acid succinimidyl ester; 4,4-difluoro-5-(2-thienyl)-4-bora-3a,4a-diazasindacene-3-propionic acid succinimidyl ester; 6-(((4-(4,4-difluoro-5-(2-thienyl)-4-bora-3a,4a-diazas-indacene-3-yl) phenoxy)acetyl)amino)hexanoic acid or succinimidyl ester; and 6-(((4,4-difluoro-5-(2-thienyl)-4-bora-3a,4a-diaza-s-indacene-3-yl)styryloxy)acetyl) aminohexanoic acid or succinimidyl ester, Alexa Fluor®350 carboxylic acid; Alexa Fluor®430 carboxylic acid; Alexa Fluor® 488 carboxylic acid; Alexa Fluor®532 carboxylic acid; Alexa Fluor®546 carboxylic acid; Alexa Fluor®555 carboxylic acid; Alexa Fluor®568 carboxylic acid; Alexa Fluor®594 carboxylic acid; Alexa Fluor®633 carboxylic acid; Alexa Fluor®64 7 carboxylic acid; Alexa Fluor® 660 carboxylic acid; Alexa Fluor®680 carboxylic acid, Cy3 NHS ester; Cy 5 NHS ester; Cy5.5 NHS ester; and Cy7 NHS ester.

Embodiment 57. The composition or kit of any one of Embodiments 54-56, wherein the fluorophores are conjugated to an antibody or fragment thereof that is bound to an epitope within the polymer beads.

Embodiment 58. The composition or kit of any one of Embodiments 1-57, wherein the CD34 is from *H. sapiens*.

Embodiment 59. The composition or kit of any one of Embodiments 1-58, wherein the CD45 is from *H. sapiens*.

Embodiment 60. The composition or kit of any one of Embodiments 1-59, wherein the CD34 extracellular domain comprises Ser32-Thr290 of uniprot P28906, or a sequence comprising at least 70%, 75%, 80%, 85%, 90%, 95%, or 97.5% identity with SEQ ID NO: 1.

Embodiment 61. The composition or kit of any one of Embodiments 1-60, wherein the CD45 extracellular domain comprises Gln26-Lys577 of uniprot P08575, or a sequence comprising at least 70%, 75%, 80%, 85%, 90%, 95%, or 97.5% identity with any one of SEQ ID NO: 2-9.

Embodiment 62. The composition or kit of any one of Embodiments 1-61, wherein the CD45 extracellular domain comprises a sequence comprising at least 70%, 75%, 80%, 85%, 90%, 95%, or 97.5% identity with SEQ ID NO: 10.

Embodiment 63. The composition or kit of any one of Embodiments 1-62, wherein the hydrogel beads exhibit at least one optical property that is substantially similar to the corresponding optical property of a target cell.

Embodiment 64. The composition or kit of Embodiment 63, wherein the at least one optical property comprises side scatter.

Embodiment 65. The composition or kit of Embodiment 63, wherein the at least one optical property comprises forward scatter.

Embodiment 66. The composition or kit of Embodiment 63, wherein the at least one optical property comprises side scatter and forward scatter.

Embodiment 67. The composition or kit of any one of Embodiments 63-66, wherein the target cell is a hematopoietic stem cell.

Embodiment 68. The composition or kit of any one of Embodiments 63-66, wherein the target cell is a lymphocyte cell.

Embodiment 69. A method of calibrating a cytometer for detection of a CD34-expressing and/or CD45-expressing cell in a population of cells, comprising sampling a composition or kit of any one of Embodiments 1-68, and calibrating the cytometer based on at least one optical property of the hydrogel beads of the composition.

Embodiment 70. The method of Embodiment 69, further comprising sampling the population of cells and obtaining a cell comprising the at least one optical property.

Embodiment 71. The method of any one of Embodiments 69-70, wherein the method comprises forming a gating scheme based on the at least one optical property.

Embodiment 72. A method of enriching CD34-expressing cells, comprising sampling a composition or kit of any one of Embodiments 1-68 and forming a gating scheme based on at least one optical property of the hydrogel beads of the composition, and selecting CD34-expressing cells in a population of cells based on the gating scheme.

Embodiment 73. The method of any one of Embodiments 69-72, wherein the CD34-expressing cell expresses a diminished amount of CD45.

Embodiment 74. The method of any one of Embodiments 69-73, wherein the CD34-expressing cell is a CD34-expressing stem cell.

Embodiment 75. The method of any one of Embodiments 69-74, wherein the at least one optical property comprises FSC, SSC, median fluorescence intensity (MFI) of CD45, MFI of CD34, or any combination thereof.

EXAMPLES

Example 1: Generation of Hydrogel Beads

Hydrogel beads were prepared to substantially match the SSC and FSC of lymphocytes. The method used to prepare the hydrogel beads was as follows. Photomasks for UV lithography were sourced from CADart Services Inc. and were designed using AutoCad (AutoDesk, Inc.). SU-8 photo resist (Microchem, Inc.) was photo crosslinked on " " silicon wafers using a collimated UV light source (OAI, Inc.) to create masters for microfluidic device fabrication. PDMS (polydimethylsiloxane, Sigma Aldrich, Inc.) was prepared and formed using standard published methods for soft lithography and microfluidic device fabrication (See, McDonald J C, et al., 2000, Electrophoresis 21:27-40).

Droplets were formed using flow-focusing geometry where two oil channels focus a central stream of aqueous monomer solution to break off droplets in a water-in-oil emulsion. A fluorocarbon-oil (Novec 7500 3M, Inc.) was used as the outer, continuous phase liquid for droplet formation. To stabilize droplets before polymerization, a surfactant was added at 0.5% w/w to the oil phase (ammonium carboxylate salt of Krytox 157 FSH, Dupont). To make the basic polyacrylamide gel bead, a central phase of an aqueous monomer solution containing N-acrylamide (1-20% w/v), a cross-linker (N,N'-bisacrylamide, 0.05-1% w/v), an accelerator, and ammonium persulfate (1% w/v) was used. An accelerator, (N,N,N',N'-Tetramethylethylenediamine (2% vol %)) was added to the oil-phase in order to trigger hydrogel bead polymerization after droplet formation.

Several co-monomers were added to the basic gel formulation to add functionality. Allyl-amine provided primary amine groups for secondary labeling after gel formation. The forward scatter was modulated by adjusting the refractive index of the gel by adding co-monomers allyl acrylate and allyl methacrylate. Side scattering of the droplets was tuned by adding a colloidal suspension of silica nanobeads and/or PMMA (poly(methyl methacrylate)) beads (100 nm) to the central aqueous phase prior to polymerization.

Stoichiometric multiplexing of the hydrogel beads was achieved by utilizing co-monomers containing chemically orthogonal side groups (amine, carboxyl, maleimide, epoxide, alkyne, etc.) for secondary labeling.

Droplets were formed at an average rate of 5 kHz and were collected in the fluorocarbon oil phase. Polymerization was completed at 50° C. for 30 minutes, and the resulting hydrogel beads were washed from the oil into an aqueous solution.

Example 2: Generation and Visualization of Hydrogel Beads

Figure 1B:
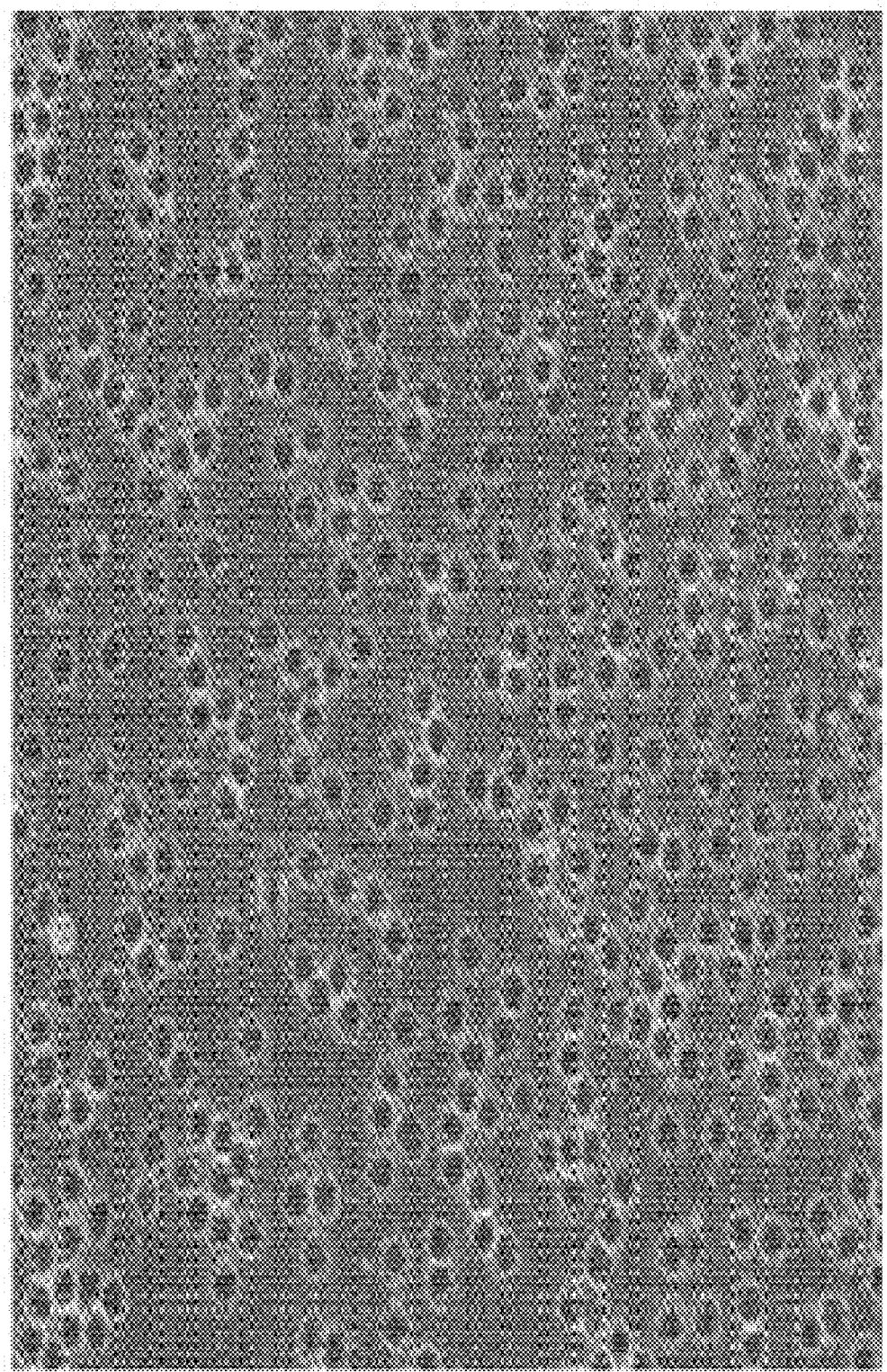
Figure 1C:
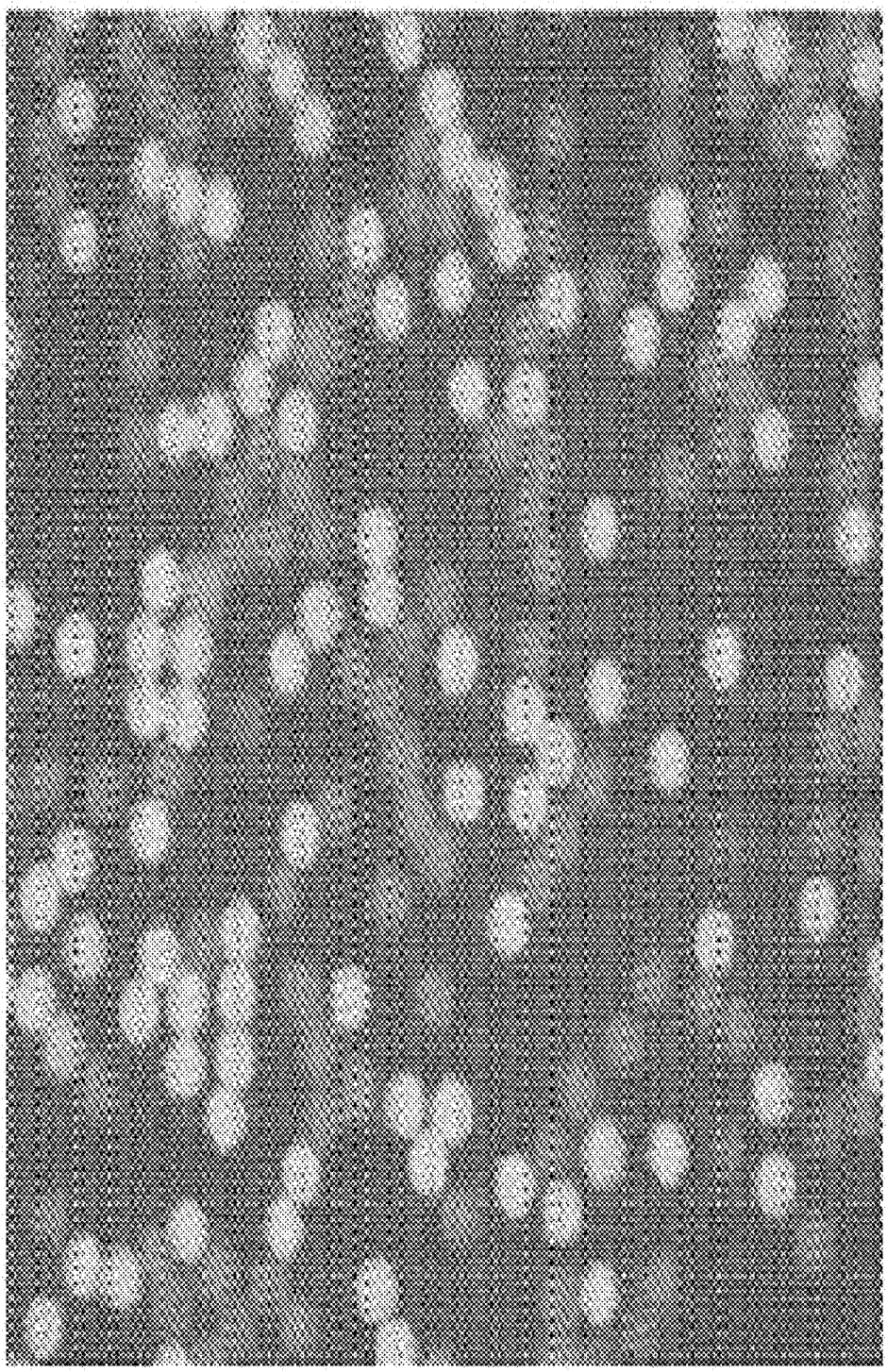

Water containing 5% acrylamide, 0.25% bisacrylamide, 0.05% allyl amine, and 0.1% ammonium persulfate was flowed through a center channel and focused by oil containing 0.1% TEMED through a 10 micron nozzle to produce 10 μm hydrogel beads, shown in FIG. 1A. Following polymerization, the beads were washed in water, shown in FIG. 1B, and conjugated to dyes of interest. The fluorescent hydrogel beads were visualized with fluorescence microscopy, shown in FIG. 1C.

Example 3: Multidimensional Tuning of Hydrogel Bead Optical Properties

Figure 2B:
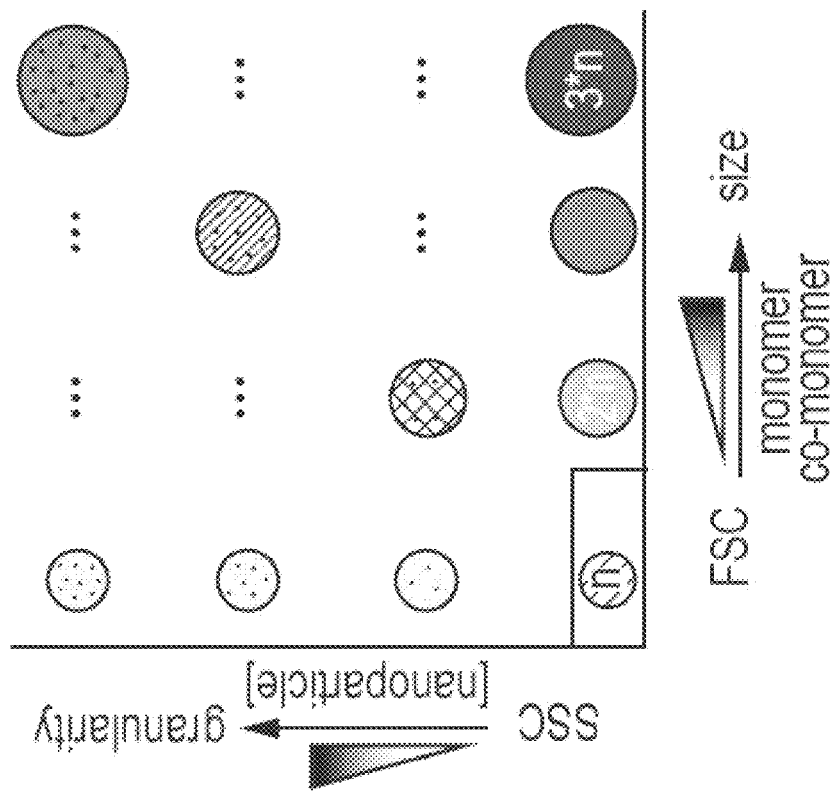
FIG. 2A-2C illustrates the use of hydrogel beads of the disclosure as calibrants for cell types displaying a variety of optical scattering properties.
Figure 2A:
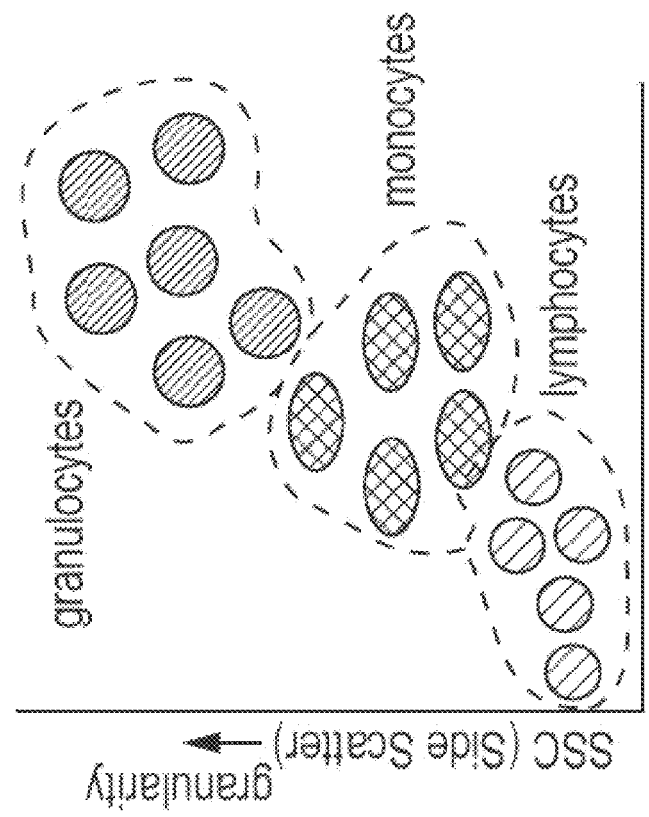
Figure 2C:
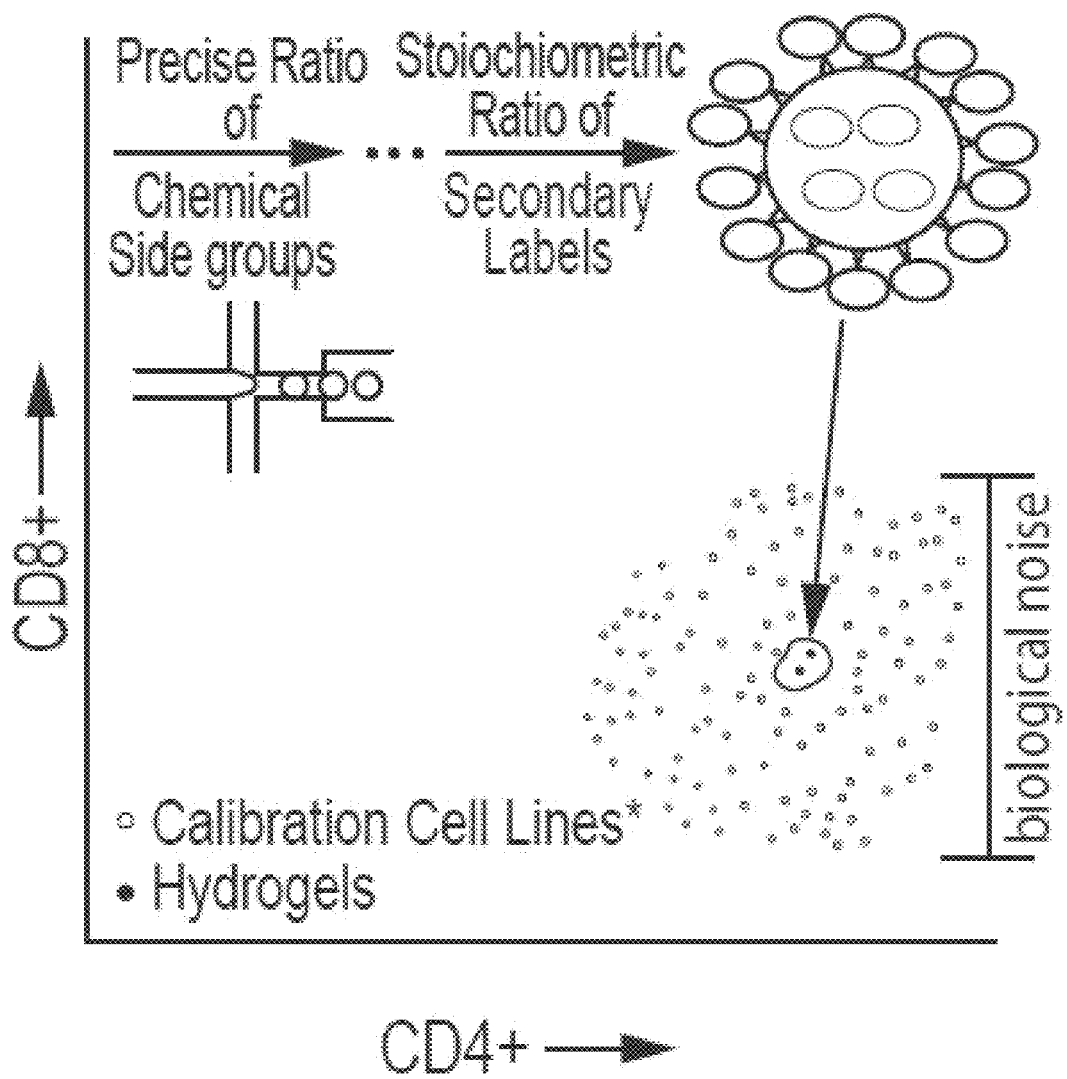

As depicted in FIG. 2A-2C, hydrogel beads are tuned in multiple dimensions to match specific cell types unlike polystyrene beads. Cells are deconvolved using combinations of optical parameters such as FSC and SSC (FIG. 2A) or secondary markers. Hydrogel beads are tuned to match the SSC and FSC of specific cell types unlike polystyrene beads (brown) which are limited in size (FSC) and side scattering (FIG. 2B). Hydrogel beads are further functionalized with stoichiometrically tuned ratios of specific chemical side-groups and secondary labels allowing the cell type to be precisely matched without suffering from biological noise as fixed cell lines do (FIG. 2C).

Example 4: CD45 and CD34 Cell Mimics as Enrichment Controls

Cell mimics of CD45dim-positive (CD45dim+) and CD34-positive (CD34+) stem cells were prepared for use in generating gating schemes for phenotypic characterization of stem cells pre- and post-enrichment. The cell mimics for use as pre-enrichment controls contained a first mixture of 98.5% CD45dim+ hydrogel beads (i.e., hydrogel beads of the present disclosure comprising only the CD45 cell surface marker), and 1.5% CD45dim+/CD34+ hydrogel beads (i.e., hydrogel beads of the present disclosure comprising both the CD45 and CD34 cell surface markers). This first mixture is referred to herein as "CD34 Lo" cell mimics. The cell mimics for use as post-enrichment controls contained a second mixture of 10% CD45dim+ hydrogel beads (i.e., hydrogel beads of the present disclosure comprising only the CD45 cell surface marker), and 90% CD45dim+/CD34+ hydrogel beads (i.e., hydrogel beads of the present disclosure comprising both the CD45 and CD34 cell surface markers). This second mixture is referred to herein as "CD34 Hi" cell mimics). The preparation of the CD34 Lo and CD34 Hi cell mimics was as follows.

To generate CD45dim+ hydrogel beads, a population of hydrogel beads prepared as described in Examples 1-3 was functionalized with human CD45 extracellular domain (huCD45 ECD). The huCD45 ECD corresponded to amino acid residues 26 to 577 of huCD45 according to UniProt accession No P08575.

To generate CD45dim+/CD34+ hydrogel beads, a population of hydrogel beads prepared as described in Examples 1-3 was functionalized with huCD45 ECD as above, and human CD34 extracellular domain (huCD34 ECD). The huCD34 ECD corresponded to amino acid residues 32 to 290 of huCD34 according to UniProt accession No P28906.

The hydrogel beads were functionalized with a level of huCD45 ECD and huCD34 ECD that yielded an MFI comparable to a biologically relevant samples. The CD34 Lo and CD34 Hi cell mimics were prepared by mixing CD45dim+ hydrogel beads and CD45dim+/CD34+ hydrogel beads at the ratios indicated above.

Three lots of lyophilized hydrogel bead mixtures representing the CD34 Lo and CD34 Hi cell mimics prepared as described above were provided in storage vials. Three vials from each lot were tested. Vials of CD34 Lo cell mimics were prepared to contain about 1×10$^6$ hydrogel beads and vials of CD34 Hi cell mimics were prepared to contain about 0.25×10$^6$ hydrogel beads. The vials were tapped down to ensure that all lyophilizate was collected at the bottom of the vial. 500 µL of 1×PBS buffer was added, with care not to contact/disturb the lyophilizate until the pellet had been soaked in the buffer. The mixture was gently pipetted up and down to mix and ensure that all contents were fully dissolved before proceeding with transfer to an Eppendorf tube or a FACS tube.

Another 500 µL of 1×PBS buffer was added to rinse the vial of any remaining material and transferred to the same tube. The tube was centrifuged at 500×g for 5 minutes and the supernatant was removed without disturbing the pellet of beads.

Four antibody panels were evaluated as shown in Table 4. An appropriate amount of staining antibody in 100 µL of staining buffer was added and the mixture, in accordance with the stain's manufacturer instructions and was vortexed on high for 3 seconds to mix thoroughly.

The mixture was incubated at room temperature in the dark for 15-30 minutes. To wash the beads, 1 mL of 1×PBS was added to the tube and which was then vortexed, followed by centrifugation at 500×g for 5 min. Supernatant was removed without disturbing the pellet of beads, and the wash was repeated to prevent non-specific binding.

TABLE 4

| Panels of anti-CD45 and anti-CD34 antibodies | | |
| --- | --- | --- |
| Panel | Antibody | Clone |
| 1 | CD34-PE | 8G12 |
|   | CD45-FITC | 2D1 |
| 2 | CD34-PE | AC136 |
|   | CD45-PerCPCy5.5 | 2D1 |
| 3 | CD34-APC | 4H11 |
|   | CD45-PE | MEM-28 |
| 4 | CD34-BV421 | 581 |
|   | CD45-V500 | HI30 |

Figure 3A:
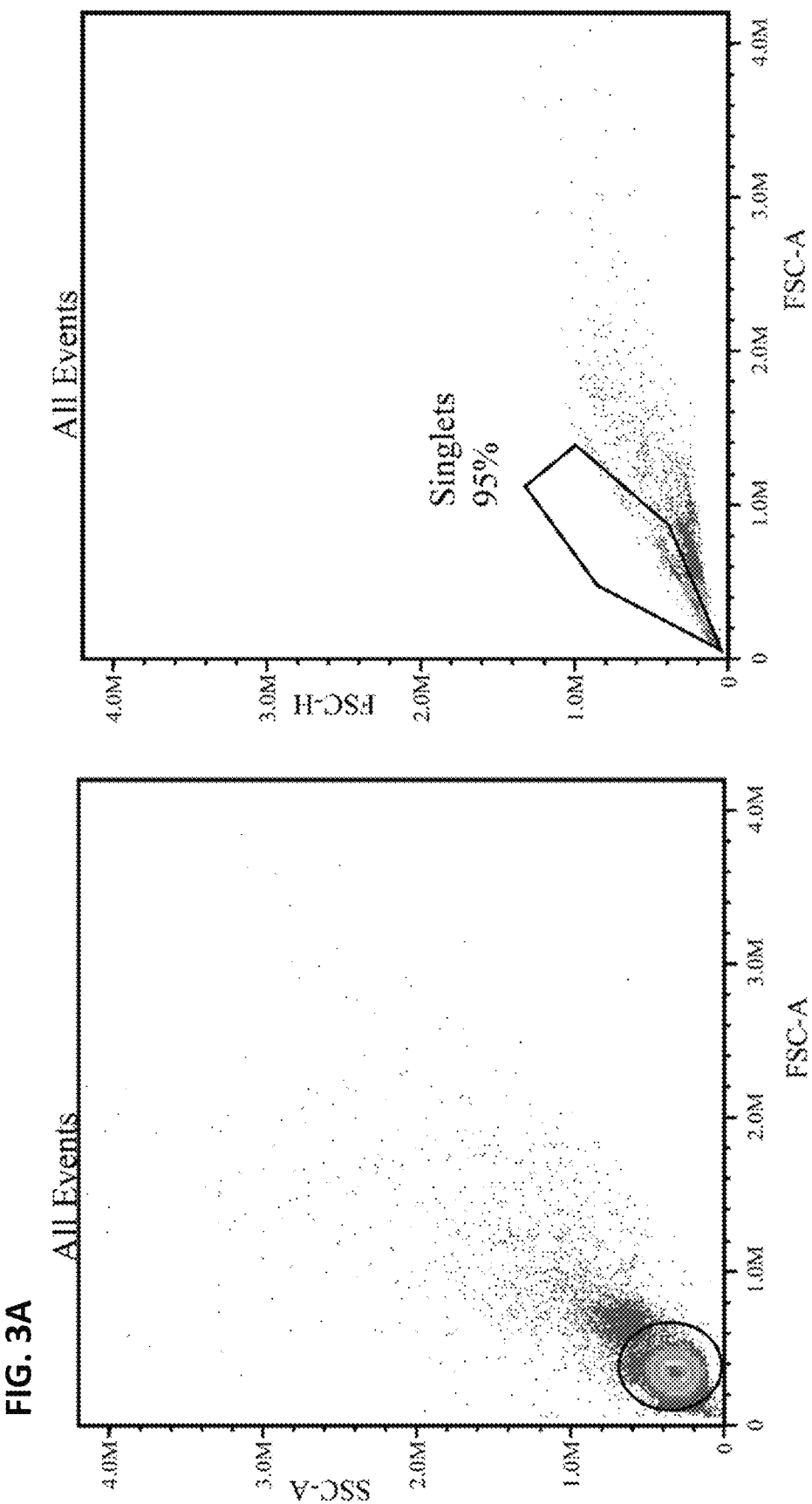
FIG. 3A provides a flow cytometry gating scheme generated using an exemplary mixture of hydrogel beads described herein prepared as a control for a population of CD34+ cells pre-enrichment. The exemplary mixture contains a proportion of CD45dim-positive (CD45dim+) hydrogel beads to CD45dim+/CD34-positive (CD34+) hydrogel beads of about 99:1 (referred to herein as "CD34 Low" or "CD34 Lo" cell mimics).
Figure 3A:
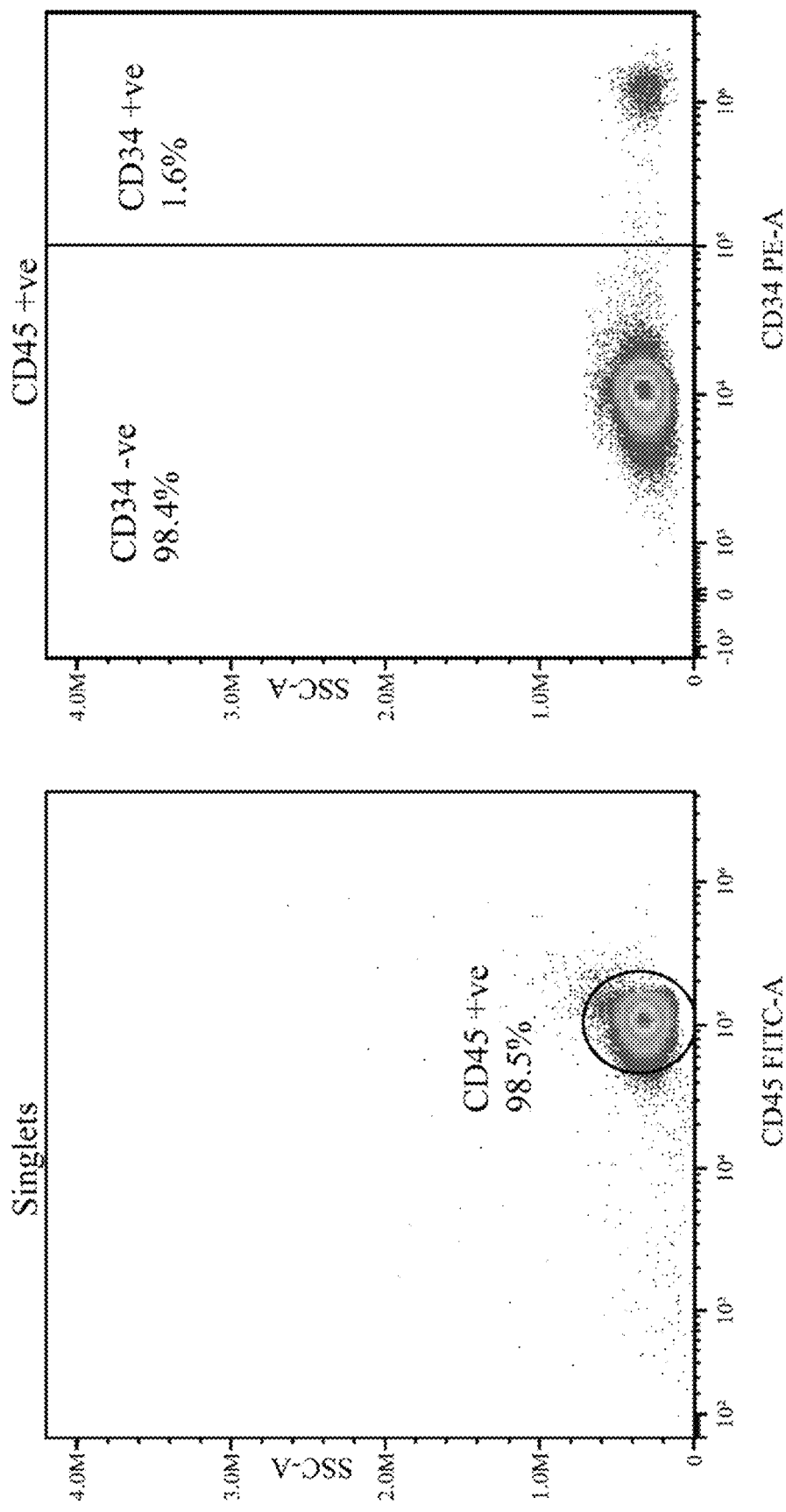
Figure 3B:
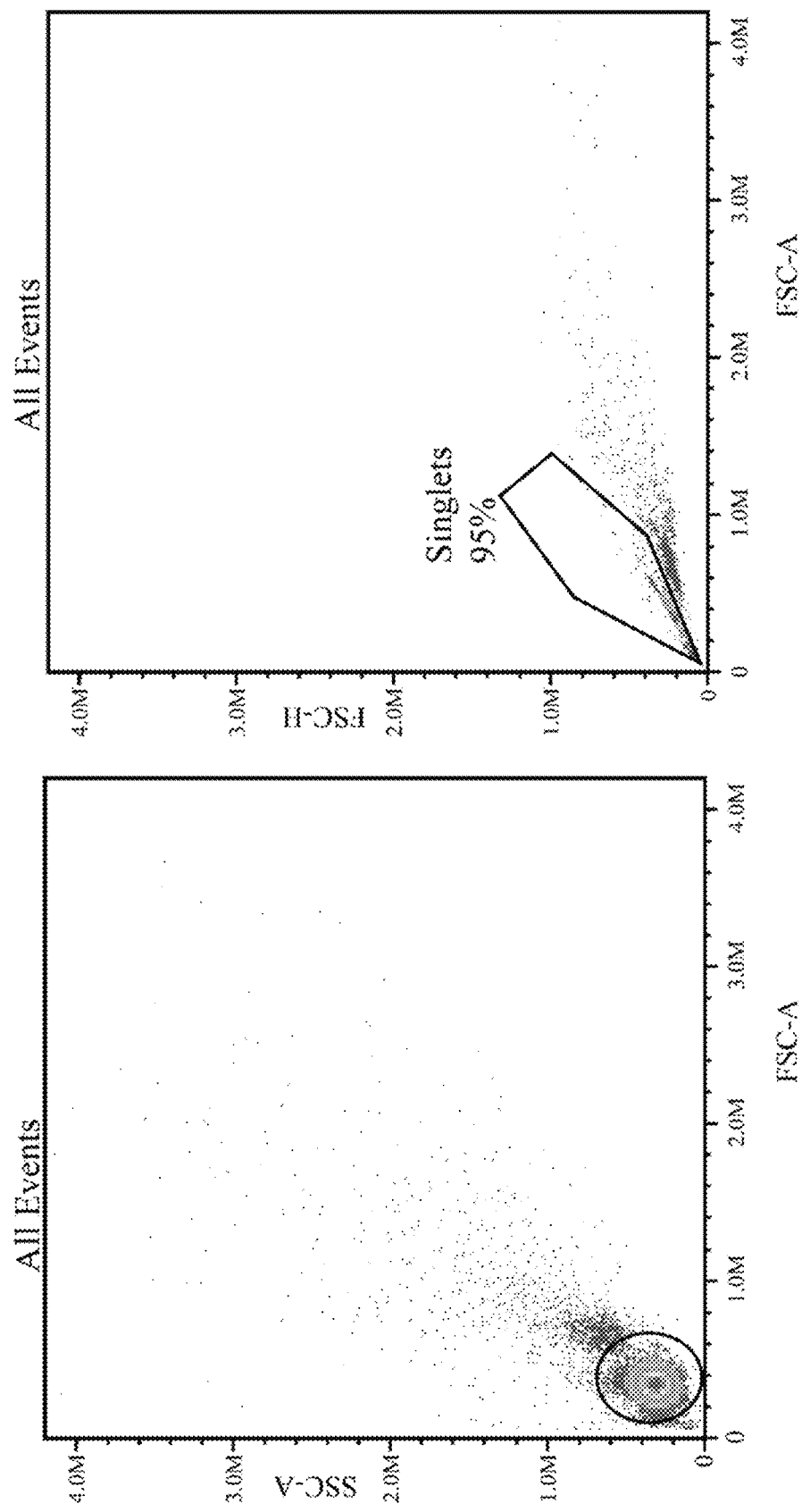
FIG. 3B provides a flow cytometry gating scheme generated using an exemplary mixture of hydrogel beads described herein prepared as a control for a population of CD34+ cells post-enrichment. The exemplary mixture contains a proportion of CD45dim+ hydrogel beads to CD45dim+/CD34+ hydrogel beads of about 1:9 (referred to herein as "CD34 High" or "CD34 Hi" cell mimics).
Figure 3B:
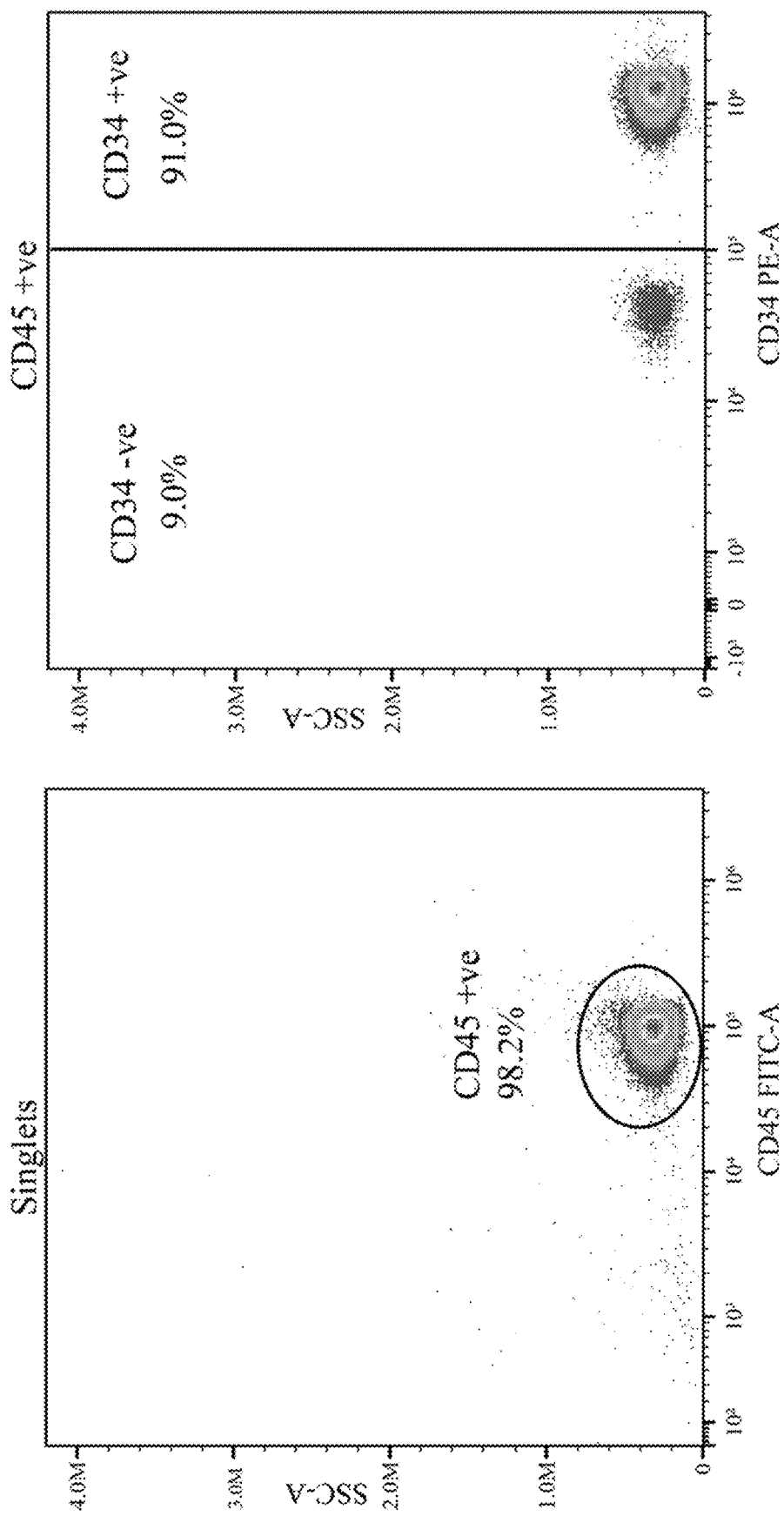

The labeled cell mimics were analyzed on two different flow cytometers (Cytek Aurora and BD Lyric). A sequential gating strategy according to the ISHAGE guidelines was applied to select the cell mimic population (see Sutherland D R, et al J Hematother. (1996) 5:213-26; Keeney M, et al International Society of Hematotherapy and Graft Engineering. Cytometry. (1998) 34:61-70; Whitby A, et al., Cytometry B Clin Cytom. (2012) 82B:9-17). A representative gating scheme generated using the CD34 Lo or CD34 Hi populations labeled with panel 1 and measured on the Cytek Aurora is shown in FIGS. 3A-3B respectively. Side scatting and forward scattering data was gated on functionalized hydrogel beads present as singlets. Data collected from the singlet population was analyzed for anti-CD45 labeling to gate on a population of CD45 positive beads. Data collected from the CD45 positive bead population was analyzed for anti-CD34 labeling and threshold gate was set to distinguish a CD34+ and CD34-negative bead population. The proportion of beads in the CD34 Hi and CD34 Lo cell mimics populations averaged across the three lots exhibited low inter-lot variability.

Example 5: Flow Cytometry Analysis of Biological Samples Using CD34 Lo and CD34 Hi Cell Mimics Gating schemes generated using CD34 Lo and CD34 Hi populations were applied to biological samples. The biological samples evaluated included (i) immobilized leukopacks that contain a population of CD34+ cells pre-enrichment and have a relatively low CD34+ cells percentage of total cells, and (ii) immobilized leukopacks that were enriched in CD34+ cells using regimen H treatment.

Figure 4A:
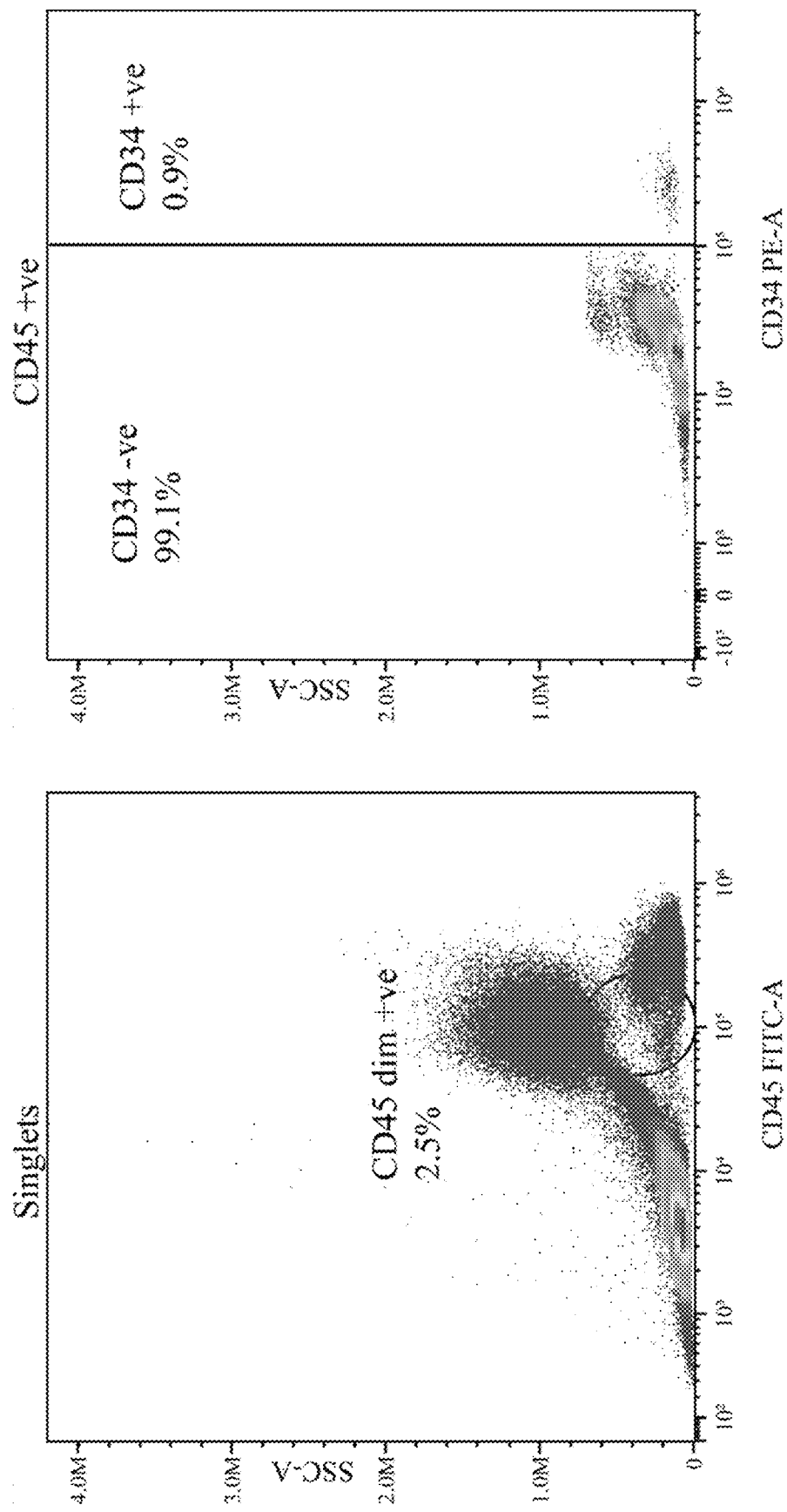
FIG. 4A provides representative analysis of immobilized leukopaks generated on a Cytek Aurora using a gating scheme prepared using CD34 Lo cell mimics. Shown is a plot of singlet cells analyzed for the CD45dim+ population and a plot of CD45dim+ cells analyzed for percentage of CD34+ cells.
Figure 4B:
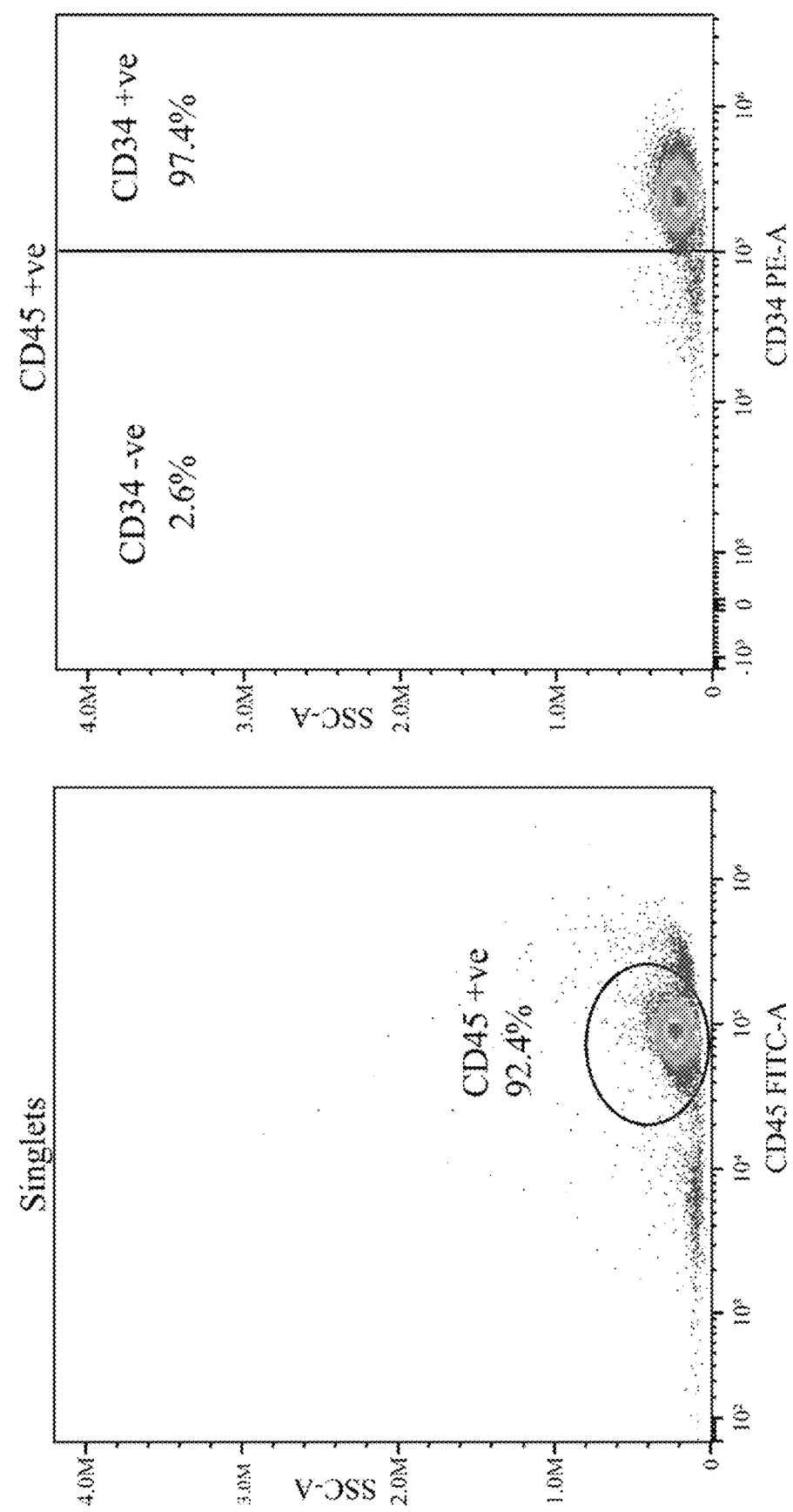
FIG. 4B provides representative analysis of a stably CD34+ cell line on a Cytek Aurora using a gating scheme prepared using CD34 Hi cell mimics. Shown is a plot of singlet cells analyzed for the CD45dim+ population and a plot of CD45dim+ cells analyzed for percentage of CD34+ cells.

The biological samples were labeled using panel 1 at the same time as labeling of the CD34 Lo and CD34 Hi cell mimics. Data was collected on a Cytek Aurora and gating was performed as described in Example 4. Shown in FIG. 4A is analysis of the pre-enrichment sample using a gating scheme generated with the CD34 Lo cell mimics, which identified CD45dim+ cells as 2.5% of the total singlet population and CD34+ cells as 0.9% of the CD45dim+ population. Shown in FIG. 4B is analysis of the post-enrichment sample using a gating scheme generated with the CD34 Hi cell mimics, which identified CD45dim+ cells as 92.4% of total singlet cells and CD34+ cells as 97.4% of total CD45dim+ cells. These data demonstrate the CD34 Lo and CD34 Hi cell mimics are suitable pre-enrichment and post-enrichment controls for analysis of CD34+ cell populations, but without requiring use of biological samples that introduce cost, handling, and safety concerns.

All, documents, patents, patent applications, publications, product descriptions, and protocols which are cited throughout this application are incorporated herein by reference in their entireties for all purposes. This document explicitly incorporates the following U.S. and PCT patent applications in their entireties for all purposes: US 2022/0178810; US 2020/0400546; US 2021/0341469; US 2021/0231552; US 2020/0400546; PCT/US2023/06668; and PCT/US2023/067893.

The embodiments illustrated and discussed in this specification are intended only to teach those skilled in the art the best way known to the inventors to make and use inventions of the present disclosure. Modifications and variation of the above-described embodiments of the present disclosure are possible without departing from the spirit of the inventions, as appreciated by those skilled in the art in light of the above teachings. It is therefore understood that, within the scope of the claims and their equivalents, inventions of the present disclosure may be practiced otherwise than as specifically described.

The invention claimed is:

1. A composition comprising a first population of hydrogel beads comprising:
   a) a polymerized monomer and a bifunctional monomer; and
   b) a cell surface biomarker profile comprising:
      i) a CD34 extracellular domain and a CD45 extracellular domain,
   wherein the CD34 extracellular domain comprises a sequence comprising at least 90% identity with SEQ ID NO: 1, and the CD45 extracellular domain comprises a sequence comprising at least 90% identity with SEQ ID NO: 10.

2. The composition of claim 1, comprising a second population of hydrogel beads comprising:
   c) a polymerized monomer and a bifunctional monomer; and
   d) a cell surface biomarker profile comprising:
      i) the CD45 extracellular domain, but lacking the CD34 extracellular domain.

3. The composition of claim 1, comprising a second population of hydrogel beads comprising:
   c) a polymerized monomer and a bifunctional monomer; and
   d) a cell surface biomarker profile comprising:
      i) the CD45 extracellular domain,
   wherein the second population of hydrogel beads comprises no more than 10% of a median number of the CD34 extracellular domain comprised in the first population of hydrogel beads.

4. The composition of claim 3, wherein the second population of hydrogel beads comprises no more than 1% of the median number of the CD34 extracellular domain comprised in the first population of hydrogel beads.

5. The composition of claim 3, wherein the second population hydrogel beads comprises (i) between about 10% and about 400% of an amount of the CD45 extracellular domain present on the cell surface of a target cell, and (ii) no more than 10% of an amount of the CD34 extracellular domain present on the cell surface of the target cell.

6. The composition of claim 3, wherein the first population of hydrogel beads or second population of hydrogel beads has a mean bead diameter of between about 1 μm and about 40 μm.

7. The composition of claim 3, wherein an active portion of the composition comprises or consists of the first and second population of hydrogel beads.

8. The composition of claim 3:
wherein a number of hydrogel beads of the first population of hydrogel beads is between 1-3% of a total number of hydrogel beads in the composition; and
wherein a number of hydrogel beads of the second population of hydrogel beads is between 97-99% of the total number of hydrogel beads in the composition.

9. A kit comprising:
a first container, comprising a first composition comprising:
a) a first population of hydrogel beads, comprising:
   i) a polymerized monomer and a bifunctional monomer; and
   ii) a cell surface biomarker profile comprising a CD34 extracellular domain and a CD45 extracellular domain, wherein the CD34 extracellular domain comprises a sequence comprising at least 90% identity with SEQ ID NO: 1,and the CD45 extracellular domain comprises a sequence comprising at least 90% identity with SEQ ID NO: 10;
b) a second population of hydrogel beads comprising:
   i) a polymerized monomer and a bifunctional monomer; and
   ii) a cell surface biomarker profile comprising the CD45 extracellular domain,
wherein the second population of hydrogel beads comprises no more than 10% of a median number of the CD34 extracellular domain comprised in the first population of hydrogel beads, wherein a number of hydrogel beads of the first population of hydrogel beads in the first composition is between 1-3% of a total number of hydrogel beads in the first composition; and a number of hydrogel beads of the second population of hydrogel beads in the first composition is between 97-99% of the total number of hydrogel beads in the first composition; and
a second container, comprising a second composition, comprising the first population of hydrogel beads and the second population of hydrogel beads, wherein a number of hydrogel beads of the first population of hydrogel beads in the second composition is between 80-95% of a total number of hydrogel beads in the second composition, and wherein a number of hydrogel beads of the second population of hydrogel beads in the second composition is between 5-20% of the total number of hydrogel beads in the second composition.

10. The kit of claim 9, wherein the first container comprises about $5 \times 10^5$ to about $2 \times 10^6$ beads and the second container comprises about $1 \times 10^5$ to about $4 \times 10^5$ beads.

11. The composition of claim 3:
wherein the first population comprises between 80-95% of a number of hydrogel beads in an active portion of the composition; and
wherein the second population comprises between 5-20% of the number of hydrogel beads in the active portion of the composition.

12. The composition of claim 3, wherein the ratio of a number of hydrogel beads of the first population of hydrogel beads to a number of hydrogel beads of the second population of hydrogel beads is between about 0.0183 and about 0.0142.

13. The composition of claim 3, wherein the ratio of a number of hydrogel beads of the first population of hydrogel beads to a number of hydrogel beads of the second population of hydrogel beads is between about 9 and about 19.

14. The composition of claim 1, wherein the first population of hydrogel beads comprises (i) between about 10% and about 400% of an amount of the CD45 extracellular domain present on the cell surface of a target cell, and (ii) between about 10% and about 400% of an amount of the CD34 extracellular domain present on the cell surface of the target cell.

15. The composition of claim 14, wherein the amount of the CD34 extracellular domain or the CD45 extracellular domain present on the cell surface of the target cell is a median amount of the CD34 extracellular domain or the CD45 extracellular domain present on cell surface of cells in a leukopack enriched in CD34+ cells using regimen H treatment.

16. The composition of claim 14, wherein the target cell is a CD45dim-positive (CD45dim+) and CD34-positive (CD34+) stem cell.

17. The composition of claim 14, wherein the amount of the CD45 extracellular domain or the CD34 extracellular domain present in the hydrogel beads or on the cell surface is measured based on a fluorescence intensity using flow cytometry.

18. The composition of claim 17, wherein the fluorescence intensity of the CD45 extracellular domain is measured using a fluorophore labeled CD45-specific binding molecule, or wherein the fluorescence intensity of the CD34 extracellular domain is measured using a fluorophore labeled CD34-specific binding molecule, wherein the fluorophore labeled CD45-specific binding molecule or the fluorophore labeled CD34-specific binding molecule comprises a monoclonal antibody or antigen binding fragment thereof.

19. The composition of claim 18, wherein the fluorophore labeled CD34-specific binding molecule is selected from: a phycoerythrin (PE) labeled anti-CD34 antibody clone 8G12, a phycoerythrin (PE) labeled anti-CD34 antibody clone AC136, an allophycocyanin (APC) labeled anti-CD34 antibody clone 4H11, and a BV421 labeled anti-CD34 antibody clone 581, and wherein the CD45-specific binding molecule is selected from: a fluorescein isothiocyanate (FITC) labeled anti-CD45 antibody clone 2D1, a PerCP-Cy5.5 labeled anti-CD45 antibody clone 2D1, a phycoerythrin (PE) labeled anti-CD45 antibody clone MEM-28, and a V500 labeled anti-CD45 antibody clone HI30.

20. The composition of claim 19, wherein the combination of the CD34-specific binding molecule and the CD45-specific binding molecule are selected from:
(a) the fluorophore labeled CD34-specific binding molecule is anti-CD34-PE clone 8G12 and the fluorophore labeled CD45-specific binding molecule is anti-CD45-FITC clone 2D1;
(b) the fluorophore labeled CD34-specific binding molecule is anti-CD34-PE clone AC136 and the fluorophore labeled CD45-specific binding molecule is anti-CD45-PerCPCy5.5 clone 2D1;
(c) the fluorophore labeled CD34-specific binding molecule is anti-CD34-APC clone 4H11 and the fluorophore labeled CD45-specific binding molecule is anti-CD45-PE clone MEM-28; or
(d) the fluorophore labeled CD34-specific binding molecule is anti-CD34-BV421 clone 581 and the fluorophore labeled CD45-specific binding molecule is anti-CD45-V500 clone HI30.

21. The composition of claim 1, wherein one or more biomarkers of the cell surface biomarker proile are covalently attached to a matrix of a hydrogel bead of the first population of hydrogel beads.

22. The composition of claim 1, wherein the CD34 extracellular domain and the CD45 extracellular domain each comprises a different fluorophore.

23. The composition of claim 1, wherein the first population of hydrogel beads exhibits at least one optical property that is substantially similar to a corresponding optical property of a target cell, wherein the at least one optical property comprises side scatter or forward scatter, and wherein the target cell is a hematopoietic stem cell or a lymphocyte cell.

24. A method of calibrating a cytometer for detection of a CD34-expressing or CD45-expressing cell in a population of cells, comprising sampling the composition of claim 3, and calibrating the cytometer based on at least one optical property of the hydrogel beads of the composition.

25. The method of claim 24, further comprising sampling the population of cells and obtaining a cell comprising the at least one optical property, wherein the at least one optical property comprises median fluorescence intensity (MFI) of CD45, MFI of CD34, or a combination thereof.

26. The method of claim 24, wherein the method comprises forming a gating scheme based on the at least one optical property, wherein the at least one optical property comprises median fluorescence intensity (MFI) of CD45, MFI of CD34, or a combination thereof.

27. The method of claim 24, wherein the CD34-expressing cell expresses a diminished amount of CD45.

28. A method of enriching a population of CD34-expressing cells, comprising sampling the composition of claim 3 and forming a gating scheme based on at least one optical property of the hydrogel beads of the composition, and selecting the population of CD34-expressing cells in a population of cells based on the gating scheme, wherein the at least one optical property comprises median fluorescence intensity (MFI) of CD45, MFI of CD34, or a combination thereof.

* * * * *

```
                         SEQUENCE LISTING

Sequence total quantity: 12
SEQ ID NO: 1              moltype = AA   length = 259
FEATURE                   Location/Qualifiers
source                    1..259
                          mol_type = protein
                          organism = Homo sapiens
SEQUENCE: 1
SLDNNGTATP ELPTQGTFSN VSTNVSYQET TTPSTLGSTS LHPVSQHGNE ATTNITETTV    60
KFTSTSVITS VYGNTNSSVQ SQTSVISTVF TTPANVSTPE TTLKPSLSPG NVSDLSTTST   120
SLATSPTKPY TSSSPILSDI KAEIKCSGIR EVKLTQGICL EQNKTSSCAE FKKDRGEGLA   180
RVLCGEEQAD ADAGAQVCSL LLAQSEVRPQ CLLLVLANRT EISSKLQLMK KHQSDLKKLG   240
ILDFTEQDVA SHQSYSQKT                                                 259

SEQ ID NO: 2              moltype = AA   length = 552
FEATURE                   Location/Qualifiers
source                    1..552
                          mol_type = protein
                          organism = Homo sapiens
SEQUENCE: 2
QSPTPSPTGL TTAKMPSVPL SSDPLPTHTT AFSPASTFER ENDFSETTTS LSPDNTSTQV    60
SPDSLDNASA FNTTGVSSVQ TPHLPTHADS QTPSAGTDTQ TFSGSAANAK LNPTPGSNAI   120
SDVPGERSTA STFPTDPVSP LTTTLSLAHH SSAALPARTS NTTITANTSD AYLNASETTT   180
LSPSGSAVIS TTTIATTPSK PTCDEKYANI TVDYLYNKET KLFTAKLNVN ENVECGNNTC   240
TNNEVHNLTE CKNASVSISH NSCTAPDKTL ILDVPPGVEK FQLHDCTQVE KADTTICLKW   300
KNIETFTCDT QNITYRFQCG NMIFDNKEIK LENLEPEHEY KCDSEILYNN HKFTNASKII   360
KTDFGSPGEP QIIFCRSEAA HQGVITWNPP QRSFHNFTLC YIKETEKDCL NLDKNLIKYD   420
LQNLKPYTKY VLSLHAYIIA KVQRNGSAAM CHFTTKSAPP SQVWNMTVSM TSDNSMHVKC   480
RPPRDRNGPH ERYHLEVEAG NTLVRNESHK NCDFRVKDLQ YSTDYTFKAY FHNGDYPGEP   540
FILHHSTSYN SK                                                        552

SEQ ID NO: 3              moltype = AA   length = 391
FEATURE                   Location/Qualifiers
source                    1..391
                          mol_type = protein
                          organism = Homo sapiens
SEQUENCE: 3
QSPTPSPTDA YLNASETTTL SPSGSAVIST TTIATTPSKP TCDEKYANIT VDYLYNKETK    60
LFTAKLNVNE NVECGNNTCT NNEVHNLTEC KNASVSISHN SCTAPDKTLI LDVPPGVEKF   120
QLHDCTQVEK ADTTICLKWK NIETFTCDTQ NITYRFQCGN MIFDNKEIKL ENLEPEHEYK   180
CDSEILYNNH KFTNASKIIK TDFGSPGEPQ IIFCRSEAAH QGVITWNPPQ RSFHNFTLCY   240
IKETEKDCLN LDKNLIKYDL QNLKPYTKYV LSLHAYIIAK VQRNGSAAMC HFTTKSAPPS   300
QVWNMTVSMT SDNSMHVKCR PPRDRNGPHE RYHLEVEAGN TLVRNESHKN CDFRVKDLQY   360
STDYTFKAYF HNGDYPGEPF ILHHSTSYNS K                                   391

SEQ ID NO: 4              moltype = AA   length = 504
FEATURE                   Location/Qualifiers
source                    1..504
                          mol_type = protein
                          organism = Homo sapiens
SEQUENCE: 4
QSPTPSPTGL TTAKMPSVPL SSDPLPTHTT AFSPASTFER ENDFSETTTS LSPDNTSTQV    60
SPDSLDNASA FNTTGVSSVQ TPHLPTHADS QTPSAGTDTQ TFSGSAANAK LNPTPGSNAI   120
SDAYLNASET TTLSPSGSAV ISTTTIATTP SKPTCDEKYA NITVDYLYNK ETKLFTAKLN   180
VNENVECGNN TCTNNEVHNL TECKNASVSI SHNSCTAPDK TLILDVPPGV EKFQLHDCTQ   240
VEKADTTICL KWKNIETFTC DTQNITYRFQ CGNMIFDNKE IKLENLEPEH EYKCDSEILY   300
NNHKFTNASK IIKTDFGSPG EPQIIFCRSE AAHQGVITWN PPQRSFHNFT LCYIKETEKD   360
CLNLDKNLIK YDLQNLKPYT KYVLSLHAYI IAKVQRNGSA AMCHFTTKSA PPSQVWNMTV   420
SMTSDNSMHV KCRPPRDRNG PHERYHLEVE AGNTLVRNES HKNCDFRVKD LQYSTDYTFK   480
AYFHNGDYPG EPFILHHSTS YNSK                                           504

SEQ ID NO: 5              moltype = AA   length = 505
FEATURE                   Location/Qualifiers
source                    1..505
                          mol_type = protein
                          organism = Homo sapiens
SEQUENCE: 5
```

```
QSPTPSPTGL TTAKMPSVPL SSDPLPTHTT AFSPASTFER ENDFSETTTS LSPDNTSTQV    60
SPDSLDNASA FNTTDVPGER STASTFPTDP VSPLTTTLSL AHHSSAALPA RTSNTTITAN   120
TSDAYLNASE TTTLSPSGSA VISTTTIATT PSKPTCDEKY ANITVDYLYN KETKLFTAKL   180
NVNENVECGN NTCTNNEVHN LTECKNASVS ISHNSCTAPD KTLILDVPPG VEKFQLHDCT   240
QVEKADTTIC LKWKNIETFT CDTQNITYRF QCGNMIFDNK EIKLENLEPE HEYKCDSEIL   300
YNNHKFTNAS KIIKTDFGSP GEPQIIFCRS EAAHQGVITW NPPQRSFHNF TLCYIKETEK   360
DCLNLDKNLI KYDLQNLKPY TKYVLSLHAY IIAKVQRNGS AAMCHFTTKS APPSQVWNMT   420
VSMTSDNSMH VKCRPPRDRN GPHERYHLEV EAGNTLVRNE SHKNCDFRVK DLQYSTDYTF   480
KAYFHNGDYP GEPFILHHST SYNSK                                        505

SEQ ID NO: 6           moltype = AA  length = 486
FEATURE                Location/Qualifiers
source                 1..486
                       mol_type = protein
                       organism = Homo sapiens
SEQUENCE: 6
QSPTPSPTGV SSVQTPHLPT HADSQTPSAG TDTQTFSGSA ANAKLNPTPG SNAISDVPGE    60
RSTASTFPTD PVSPLTTTLS LAHHSSAALP ARTSNTTITA NTSDAYLNAS ETTTLSPSGS   120
AVISTTTIAT TPSKPTCDEK YANITVDYLY NKETKLFTAK LNVNENVECG NNTCTNNEVH   180
NLTECKNASV SISHNSCTAP DKTLILDVPP GVEKFQLHDC TQVEKADTTI CLKWKNIETF   240
TCDTQNITYR FQCGNMIFDN KEIKLENLEP EHEYKCDSEI LYNNHKFTNA SKIIKTDFGS   300
PGEPQIIFCR SEAAHQGVIT WNPPQRSFHN FTLCYIKETE KDCLNLDKNL IKYDLQNLKP   360
YTKYVLSLHA YIIAKVQRNG SAAMCHFTTK SAPPSQVWNM TVSMTSDNSM HVKCRPPRDR   420
NGPHERYHLE VEAGNTLVRN ESHKNCDFRV KDLQYSTDYT FKAYFHNGDY PGEPFILHHS   480
TSYNSK                                                             486

SEQ ID NO: 7           moltype = AA  length = 457
FEATURE                Location/Qualifiers
source                 1..457
                       mol_type = protein
                       organism = Homo sapiens
SEQUENCE: 7
QSPTPSPTGL TTAKMPSVPL SSDPLPTHTT AFSPASTFER ENDFSETTTS LSPDNTSTQV    60
SPDSLDNASA FNTTDAYLNA SETTTLSPSG SAVISTTTIA TTPSKPTCDE KYANITVDYL   120
YNKETKLFTA KLNVNENVEC GNNTCTNNEV HNLTECKNAS VSISHNSCTA PDKTLILDVP   180
PGVEKFQLHD CTQVEKADTT ICLKWKNIET FTCDTQNITY RFQCGNMIFD NKEIKLENLE   240
PEHEYKCDSE ILYNNHKFTN ASKIIKTDFG SPGEPQIIFC RSEAAHQGVI TWNPPQRSFH   300
NFTLCYIKET EKDCLNLDKN LIKYDLQNLK PYTKYVLSLH AYIIAKVQRN GSAAMCHFTT   360
KSAPPSQVWN MTVSMTSDNS MHVKCRPPRD RNGPHERYHL EVEAGNTLVR NESHKNCDFR   420
VKDLQYSTDY TFKAYFHNGD YPGEPFILHH STSYNSK                            457

SEQ ID NO: 8           moltype = AA  length = 438
FEATURE                Location/Qualifiers
source                 1..438
                       mol_type = protein
                       organism = Homo sapiens
SEQUENCE: 8
QSPTPSPTGV SSVQTPHLPT HADSQTPSAG TDTQTFSGSA ANAKLNPTPG SNAISDAYLN    60
ASETTTLSPS GSAVISTTTI ATTPSKPTCD EKYANITVDY LYNKETKLFT AKLNVNENVE   120
CGNNTCTNNE VHNLTECKNA SVSISHNSCT APDKTLILDV PPGVEKFQLH DCTQVEKADT   180
TICLKWKNIE TFTCDTQNIT YRFQCGNMIF DNKEIKLENL EPEHEYKCDS EILYNNHKFT   240
NASKIIKTDF GSPGEPQIIF CRSEAAHQGV ITWNPPQRSF HNFTLCYIKE TEKDCLNLDK   300
NLIKYDLQNL KPYTKYVLSL HAYIIAKVQR NGSAAMCHFT TKSAPPSQVW NMTVSMTSDN   360
SMHVKCRPPR DRNGPHERYH LEVEAGNTLV RNESHKNCDF RVKDLQYSTD YTFKAYFHNG   420
DYPGEPFILH HSTSYNSK                                                 438

SEQ ID NO: 9           moltype = AA  length = 439
FEATURE                Location/Qualifiers
source                 1..439
                       mol_type = protein
                       organism = Homo sapiens
SEQUENCE: 9
QSPTPSPTDV PGERSTASTF PTDPVSPLTT TLSLAHHSSA ALPARTSNTT ITANTSDAYL    60
NASETTTLSP SGSAVISTTT IATTPSKPTC DEKYANITVD YLYNKETKLF TAKLNVNENV   120
ECGNNTCTNN EVHNLTECKN ASVSISHNSC TAPDKTLILD VPPGVEKFQL HDCTQVEKAD   180
TTICLKWKNI ETFTCDTQNI TYRFQCGNMI FDNKEIKLEN LEPEHEYKCD SEILYNNHKF   240
TNASKIIKTD FGSPGEPQII FCRSEAAHQG VITWNPPQRS FHNFTLCYIK ETEKDCLNLD   300
KNLIKYDLQN LKPYTKYVLS LHAYIIAKVQ RNGSAAMCHF TTKSAPPSQV WNMTVSMTSD   360
NSMHVKCRPP RDRNGPHERY HLEVEAGNTL VRNESHKNCD FRVKDLQYST DYTFKAYFHN   420
GDYPGEPFIL HHSTSYNSK                                                439

SEQ ID NO: 10          moltype = AA  length = 383
FEATURE                Location/Qualifiers
source                 1..383
                       mol_type = protein
                       organism = Homo sapiens
SEQUENCE: 10
DAYLNASETT TLSPSGSAVI STTTIATTPS KPTCDEKYAN ITVDYLYNKE TKLFTAKLNV    60
NENVECGNNT CTNNEVHNLT ECKNASVSIS HNSCTAPDKT LILDVPPGVE KFQLHDCTQV   120
```

```
EKADTTICLK WKNIETFTCD TQNITYRFQC GNMIFDNKEI KLENLEPEHE YKCDSEILYN    180
NHKFTNASKI IKTDFGSPGE PQIIFCRSEA AHQGVITWNP PQRSFHNFTL CYIKETEKDC    240
LNLDKNLIKY DLQNLKPYTK YVLSLHAYII AKVQRNGSAA MCHFTTKSAP PSQVWNMTVS    300
MTSDNSMHVK CRPPRDRNGP HERYHLEVEA GNTLVRNESH KNCDFRVKDL QYSTDYTFKA    360
YFHNGDYPGE PFILHHSTSY NSK                                           383

SEQ ID NO: 11            moltype = AA  length = 385
FEATURE                  Location/Qualifiers
source                   1..385
                         mol_type = protein
                         organism = Homo sapiens
SEQUENCE: 11
MLVRRGARAG PRMPRGWTAL CLLSLLPSGF MSLDNNGTAT PELPTQGTFS NVSTNVSYQE     60
TTTPSTLGST SLHPVSQHGN EATTNITETT VKFTSTSVIT SVYGNTNSSV QSQTSVISTV    120
FTTPANVSTP ETTLKPSLSP GNVSDLSTTS TSLATSPTKP YTSSSPILSD IKAEIKCSGI    180
REVKLTQGIC LEQNKTSSCA EFKKDRGEGL ARVLCGEEQA DADAGAQVCS LLLAQSEVRP    240
QCLLLVLANR TEISSKLQLM KKHQSDLKKL GILDFTEQDV ASHQSYSQKT LIALVTSGAL    300
LAVLGITGYF LMNRRSWSPT GERLGEDPYY TENGGGQGYS SGPGTSPEAQ GKASVNRGAQ    360
ENGTGQATSR NGHSARQHVV ADTEL                                         385

SEQ ID NO: 12            moltype = AA  length = 1306
FEATURE                  Location/Qualifiers
source                   1..1306
                         mol_type = protein
                         organism = Homo sapiens
SEQUENCE: 12
MTMYLWLKLL AFGFAFLDTE VFVTGQSPTP SPTGLTTAKM PSVPLSSDPL PTHTTAFSPA     60
STFERENDFS ETTTSLSPDN TSTQVSPDSL DNASAFNTTG VSSVQTPHLP THADSQTPSA    120
GTDTQTFSGS AANAKLNPTP GSNAISDVPG ERSTASTFPT DPVSPLTTTL SLAHHSSAAL    180
PARTSNTTIT ANTSDAYLNA SETTTLSPSG SAVISTTTIA TTPSKPTCDE KYANITVDYL    240
YNKETKLFTA KLNVNENVEC GNNTCTNNEV HNLTECKNAS VSISHNSCTA PDKTLILDVP    300
PGVEKFQLHD CTQVEKADTT ICLKWKNIET FTCDTQNITY RFQCGNMIFD NKEIKLENLE    360
PEHEYKCDSE ILYNNHKFTN ASKIIKTDFG SPGEPQIIFC RSEAAHQGVI TWNPPQRSFH    420
NFTLCYIKET EKDCLNLDKN LIKYDLQNLK PYTKYVLSLH AYIIAKVQRN GSAAMCHFTT    480
KSAPPSQVWN MTVSMTSDNS MHVKCRPPRD RNGPHERYHL EVEAGNTLVR NESHKNCDFR    540
VKDLQYSTDY TFKAYFHNGD YPGEPFILHH STSYNSKALI AFLAFLIIVT SIALLVVLYK    600
IYDLHKKRSC NLDEQQELVE RDDEKQLMNV EPIHADILLE TYKRKIADEG RLFLAEFQSI    660
PRVFSKFPIK EARKPFNQNK NRYVDILPYD YNRVELSEIN GDAGSNYINA SYIDGFKEPR    720
KYIAAQGPRD ETVDDFWRMI WEQKATVIVM VTRCEEGNRN KCAEYWPSME EGTRAFGDVV    780
VKINQHKRCP DYIIQKLNIV NKKEKATGRE VTHIQFTSWP DHGVPEDPHL LLKLRRRVNA    840
FSNFFSGPIV VHCSAGVGRT GTYIGIDAML EGLEAENKVD VYGYVVKLRR QRCLMVQVEA    900
QYILIHQALV EYNQFGETEV NLSELHPYLH NMKKRDPPSE PSPLEAEFQR LPSYRSWRTQ    960
HIGNQEENKS KNRNSNVIPY DYNRVPLKHE LEMSKESEHD SDESSDDDSD SEEPSKYINA   1020
SFIMSYWKPE VMIAAQGPLK ETIGDFWQMI FQRKVKVIVM LTELKHGDQE ICAQYWGEGK   1080
QTYGDIEVDL KDTDKSSTYT LRVFELRHSK RKDSRTVYQY QYTNWSVEQL PAEPKELISM   1140
IQVVKQKLPQ KNSSEGNKHH KSTPLLIHCR DGSQQTGIFC ALLNLLESAE TEEVVDIFQV   1200
VKALRKARPG MVSTFEQYQF LYDVIASTYP AQNGQVKKNN HQEDKIEFDN EVDKVKQDAN   1260
CVNPLGAPEK LPEAKEQAEG SEPTSGTEGP EHSVNGPASP ALNQGS                 1306
```